(12) United States Patent
Yano et al.

(10) Patent No.: US 9,111,441 B2
(45) Date of Patent: Aug. 18, 2015

(54) CONTROL DEVICE, CONTROL SYSTEM AND CONTROL METHOD

(75) Inventors: Ai Yano, Kawasaki (JP); Ryuichi Matsukura, Kawasaki (JP); Jun Kakuta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1010 days.

(21) Appl. No.: 13/113,362

(22) Filed: May 23, 2011

(65) Prior Publication Data

US 2011/0221623 A1 Sep. 15, 2011

Related U.S. Application Data

(63) Continuation of application No. PCT/JP2008/071625, filed on Nov. 28, 2008.

(51) Int. Cl.
| | |
|---|---|
| H04L 17/02 | (2006.01) |
| G09B 21/00 | (2006.01) |
| G05B 11/01 | (2006.01) |
| G08C 19/16 | (2006.01) |
| H04N 5/44 | (2011.01) |
| G08C 19/28 | (2006.01) |

(Continued)

(52) U.S. Cl.
CPC ............... *G08C 19/28* (2013.01); *G08C 17/02* (2013.01); *G08C 2201/32* (2013.01); *G08C 2201/33* (2013.01); *G08C 2201/34* (2013.01); *G08C 2201/50* (2013.01); *G08C 2201/51* (2013.01); *G08C 2201/91* (2013.01); *G08C 2201/92* (2013.01); *G08C 2201/93* (2013.01); *H04N 21/42207* (2013.01)

(58) Field of Classification Search
CPC ........... G08C 23/04; G08C 19/28; A61F 4/00
USPC ................................ 341/176; 340/4.11, 12.22
See application file for complete search history.

(56) References Cited

U.S. PATENT DOCUMENTS

| | | | |
|---|---|---|---|
| 7,193,661 B2 * | 3/2007 | Dresti et al. .................. 348/734 |
| 7,233,316 B2 * | 6/2007 | Smith et al. .................. 345/157 |
| 7,869,618 B2 * | 1/2011 | Thelen .......................... 382/100 |

(Continued)

FOREIGN PATENT DOCUMENTS

| | | |
|---|---|---|
| CN | 1662888 A | 8/2005 |
| CN | 101133402 A | 2/2008 |

(Continued)

OTHER PUBLICATIONS

Japanese Office Action mailed Apr. 23, 2013 in corresponding Japanese Application No. 2010-540271.

(Continued)

*Primary Examiner* — Daniell L Negron
*Assistant Examiner* — Mohamed Barakat
(74) *Attorney, Agent, or Firm* — Staas & Halsey LLP

(57) ABSTRACT

A control device which controls an operation of a controlled device, includes: an operation information storage unit to store operation information about an acceptable operation; a control information acquisition unit to acquire control information about the controlled device; and an association table generation unit to generate an association table for storing the operation information stored in the operation information storage unit associated with the control information acquired by the control information acquisition unit.

17 Claims, 43 Drawing Sheets

(51) Int. Cl.
  *G08C 17/02*  (2006.01)
  *H04N 21/422* (2011.01)

(56) References Cited

U.S. PATENT DOCUMENTS

| | | | |
|---|---|---|---|
| 2001/0043230 A1 | 11/2001 | Furusawa et al. | |
| 2003/0149675 A1* | 8/2003 | Ansari et al. | 706/2 |
| 2005/0052423 A1* | 3/2005 | Harris et al. | 345/169 |
| 2005/0212753 A1* | 9/2005 | Marvit et al. | 345/156 |
| 2006/0036354 A1 | 2/2006 | Maekawa et al. | |
| 2006/0262001 A1 | 11/2006 | Ouchi et al. | |
| 2008/0201665 A1* | 8/2008 | Shimada | 715/847 |
| 2010/0011377 A1* | 1/2010 | Imai et al. | 719/318 |

FOREIGN PATENT DOCUMENTS

| | | | |
|---|---|---|---|
| EP | 1693812 A1 | | 8/2006 |
| JP | 2004-102609 | | 4/2004 |
| JP | 2004102609 A | * | 4/2004 |
| JP | 2005-59812 | | 3/2005 |
| JP | 2005-80091 | | 3/2005 |
| JP | 2005-080091 | | 3/2005 |
| JP | 2005080091 A | * | 3/2005 |
| JP | 2005-151507 | | 6/2005 |
| JP | 2006-074529 | | 3/2006 |
| JP | 2006-74529 | | 3/2006 |
| JP | 2006074529 A | * | 3/2006 |
| JP | 2006-319907 | | 11/2006 |
| JP | 2007-259381 | | 10/2007 |
| JP | 2008-72269 | | 3/2008 |
| JP | 2008-172614 | | 7/2008 |
| JP | 2008-198138 | | 8/2008 |
| WO | 01/82646 A1 | | 11/2001 |
| WO | 2008/099456 A1 | | 8/2008 |
| WO | WO2008-099456 | | 8/2008 |
| WO | WO 2008099456 A1 | * | 8/2008 |

OTHER PUBLICATIONS

Korean Office Action issued Jul. 31, 2012 in corresponding Korean Patent Application No. 10-2011-7012907.
Partial English Translation of Japanese Patent Application No. 2006-74529 published Mar. 16, 2006.
Extended European Search Report mailed Mar. 1, 2013 for corresponding European Application No. 08878424.4.
Japanese Office Action mailed Jan. 8, 2013 in corresponding Japanese Patent Application No. 2010-540271.
Chinese Office Action mailed Feb. 21, 2013 for corresponding Chinese Application No. 200880132048.0.
Partial English translation of Reference JP2006-74529A (previously cited in IDS filed Jul. 20, 2011).

* cited by examiner

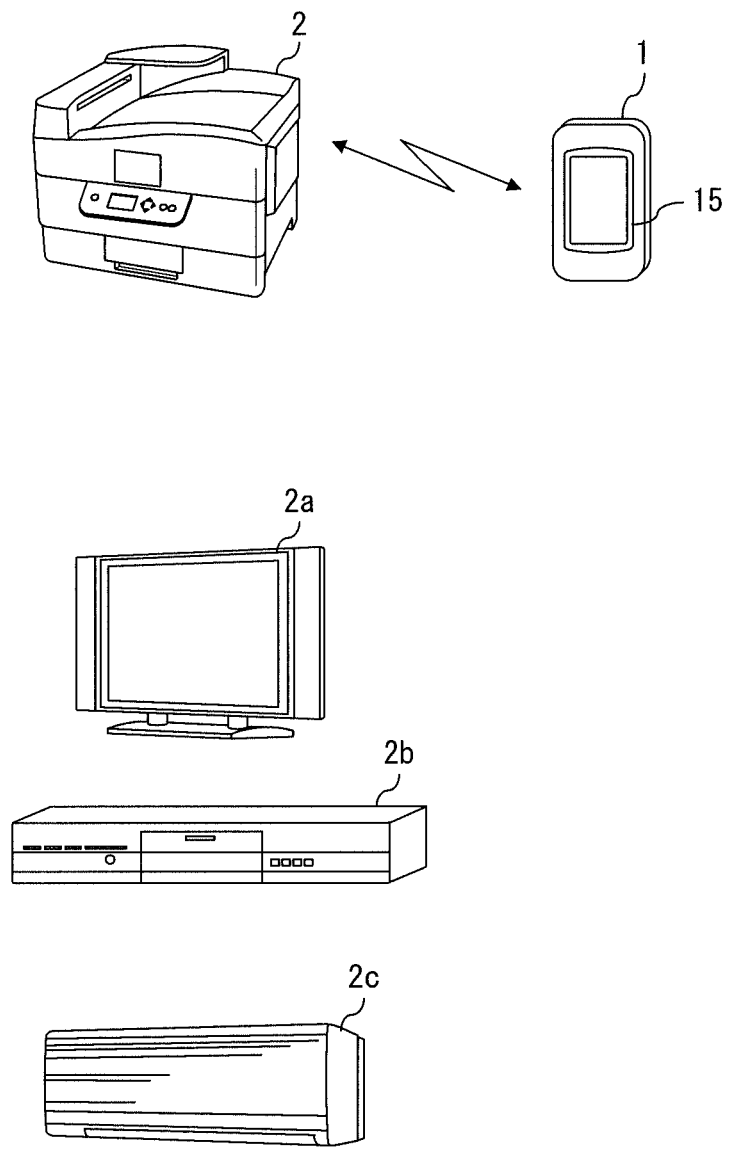
F I G. 1

| ACTION INFORMATION | RECOMMENDED CONTROL INFORMATION | OPERATION COUNT |
|---|---|---|
| DIRECTING FORWARD TWICE WITH THE FILE OPEN | Set File | 10 |
| DIRECTING LEFTWARD TWICE | Send Page | 4 |
| DIRECTING RIGHTWARD TWICE | Return Page | 6 |
| FULLY TURNING | Send to All | 1 |
| | Num | 3 |
| DIRECTING LEFTWARD ONCE, AND THEN DIRECTING RIGHTWARD ONCE | Bye | 2 |
| | Cancel | 3 |
| ⋮ | ⋮ | ⋮ |

| ITEM NAME | CONTROL INFORMATION | ARGUMENT |
|---|---|---|
| EQUIPMENT PROFILE | Printer | |
| EQUIPMENT NAME | Pri-AAA | |
| EVENT 1 | Set File | FileName |
| EVENT 2 | Copy Num | Num |
| EVENT 3 | Cancel | |
| EVENT 4 | Black and White | |
| EVENT 5 | Color | |
| EVENT 6 | Expansion | |
| ⋮ | ⋮ | ⋮ |

| ACTION INFORMATION | CONTROL INFORMATION |
|---|---|
| DIRECTING FORWARD TWICE WITH THE FILE OPEN | Set File |
| FULLY TURNING | Copy Num |
| DIRECTING LEFTWARD ONCE, AND THEN DIRECTING RIGHTWARD ONCE | Cancel |

FIG. 6B

| ACTION INFORMATION | CONTROL INFORMATION |
|---|---|
| DIRECTING FORWARD TWICE WITH THE FILE OPEN | Set File |
| FULLY TURNING | Copy Num |
| DIRECTING LEFTWARD ONCE, AND THEN DIRECTING RIGHTWARD ONCE | Cancel |
| DIRECTING RIGHTWARD TWICE | Black and White |
| DIRECTING LEFTWARD TWICE | Color |
| ⋮ | ⋮ |

NOTIFICATION SCREEN

| ACTION | FUNCTION |
|---|---|
| DIRECTING FORWARD TWICE WITH THE FILE OPEN | PRINTING OPEN FILE |
| FULLY TURNING N TIMES | PRINTING N COPIES |
| DIRECTING LEFTWARD ONCE, AND THEN DIRECTING RIGHTWARD ONCE | CANCEL |
| DIRECTING RIGHTWARD TWICE | MONOCHROME PRINTING |
| DIRECTING LEFTWARD TWICE | COLOR PRINTING |
| ⋮ | ⋮ |

OK
(DIRECTING BACKWARD ONCE)

F I G. 7

OPERATION ACCEPTED

DETECTED ACTION: FULLY TURNING THREE TIMES

EXECUTION FUNCTION INFORMATION: PRINTING THREE COPIES

OK (DIRECTING BACKWARD ONCE)    CANCEL (DIRECTING LEFTWARD ONCE, AND THEN DIRECTING RIGHTWARD ONCE)

FIG. 8

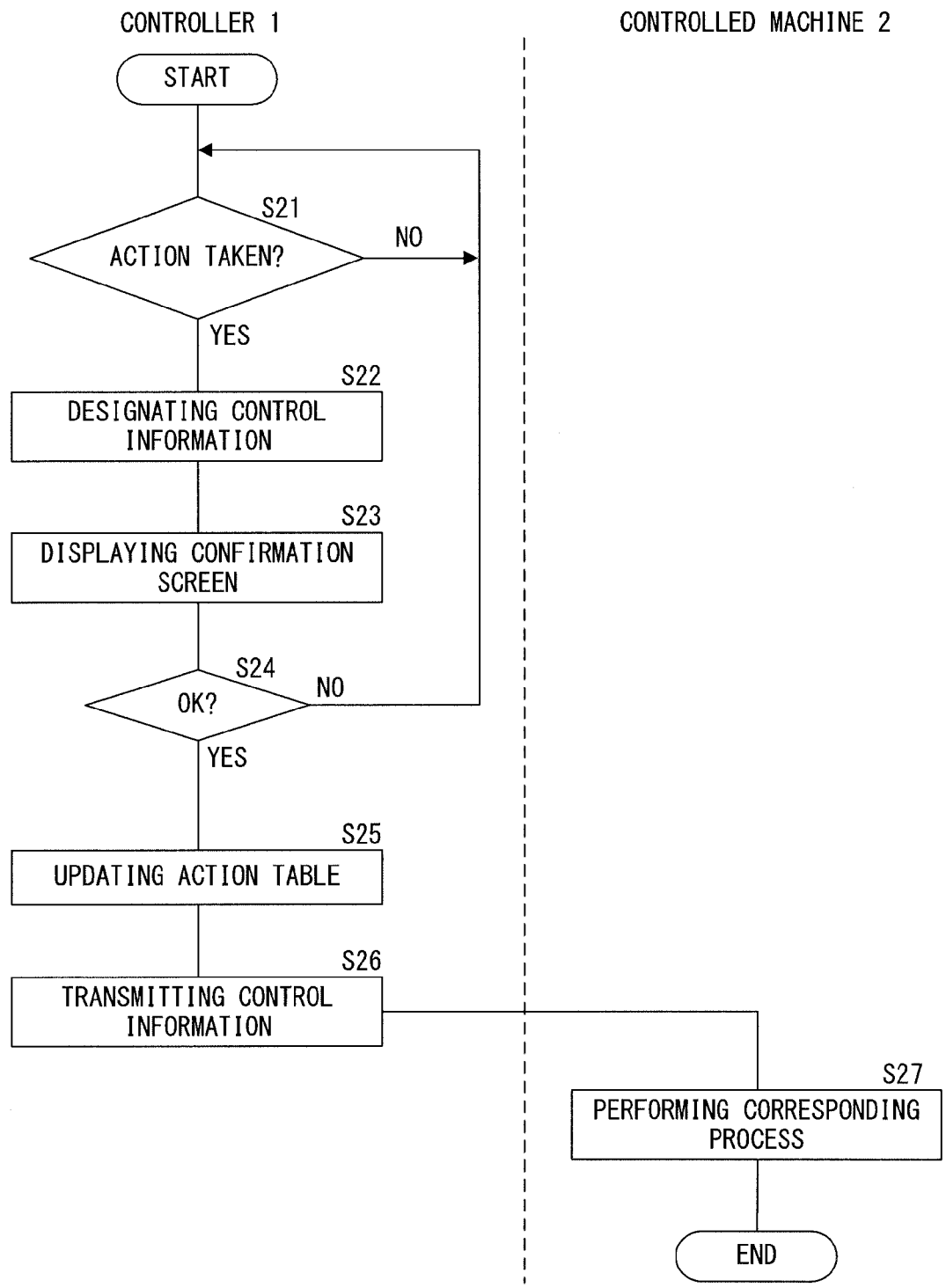
F I G. 1 1

SETTING SCREEN

| ACTION INFORMATION | RECOMMENDED CONTROL INFORMATION | |
|---|---|---|
| DIRECTING FORWARD TWICE WITH THE FILE OPEN | Set File | ▽ |
| DIRECTING LEFTWARD TWICE | Send Page | ▽ |
| DIRECTING RIGHTWARD TWICE | Return Page | ▽ |
| FULLY TURNING | Num | ▽ |
| DIRECTING LEFTWARD ONCE, AND THEN DIRECTING RIGHTWARD ONCE | Cancel | ▽ |
| ⋮ | ⋮ | |

OK
(DIRECTING BACKWARD ONCE)

CANCEL
(DIRECTING LEFTWARD ONCE, AND THEN DIRECTING RIGHTWARD ONCE)

F I G. 1 2

| ACTION INFORMATION | RECOMMENDED CONTROL INFORMATION | OPERATION COUNT |
|---|---|---|
| DIRECTING FORWARD TWICE WITH THE FILE OPEN | Set File | 10 |
| DIRECTING LEFTWARD TWICE | Send Page | 4 |
| DIRECTING RIGHTWARD TWICE | Return Page | 6 |
| FULLY TURNING | Num | 3 |
| DIRECTING LEFTWARD ONCE, AND THEN DIRECTING RIGHTWARD ONCE | Cancel | 3 |
| ⋮ | ⋮ | ⋮ |

| PRIORITY | ACTION INFORMATION | RECOMMENDED CONTROL INFORMATION | OPERATION COUNT |
|---|---|---|---|
| 1 | DIRECTING FORWARD TWICE WITH THE FILE OPEN | Set File | 10 |
| 2 | DIRECTING LEFTWARD TWICE | Send Page | 6 |
| 3 | DIRECTING RIGHTWARD TWICE | Return Page | 6 |
| 4 | FULLY TURNING | Send to All | 1 |
| 4 | FULLY TURNING | Num | 3 |
| 5 | DIRECTING LEFTWARD ONCE, AND THEN DIRECTING RIGHTWARD ONCE | Bye | 2 |
| 5 | DIRECTING LEFTWARD ONCE, AND THEN DIRECTING RIGHTWARD ONCE | Cancel | 3 |
| ⋮ | ⋮ | ⋮ | ⋮ |

FIG. 15

| ACTION INFORMATION | CONTROL INFORMATION |
|---|---|
| DIRECTING FORWARD TWICE WITH THE FILE OPEN | Set File |
| FULLY TURNING | Copy Num |
| DIRECTING LEFTWARD ONCE, AND THEN DIRECTING RIGHTWARD ONCE | Cancel |
| DIRECTING LEFTWARD TWICE | Black and White |
| DIRECTING RIGHTWARD TWICE | Color |
| ⋮ | ⋮ |

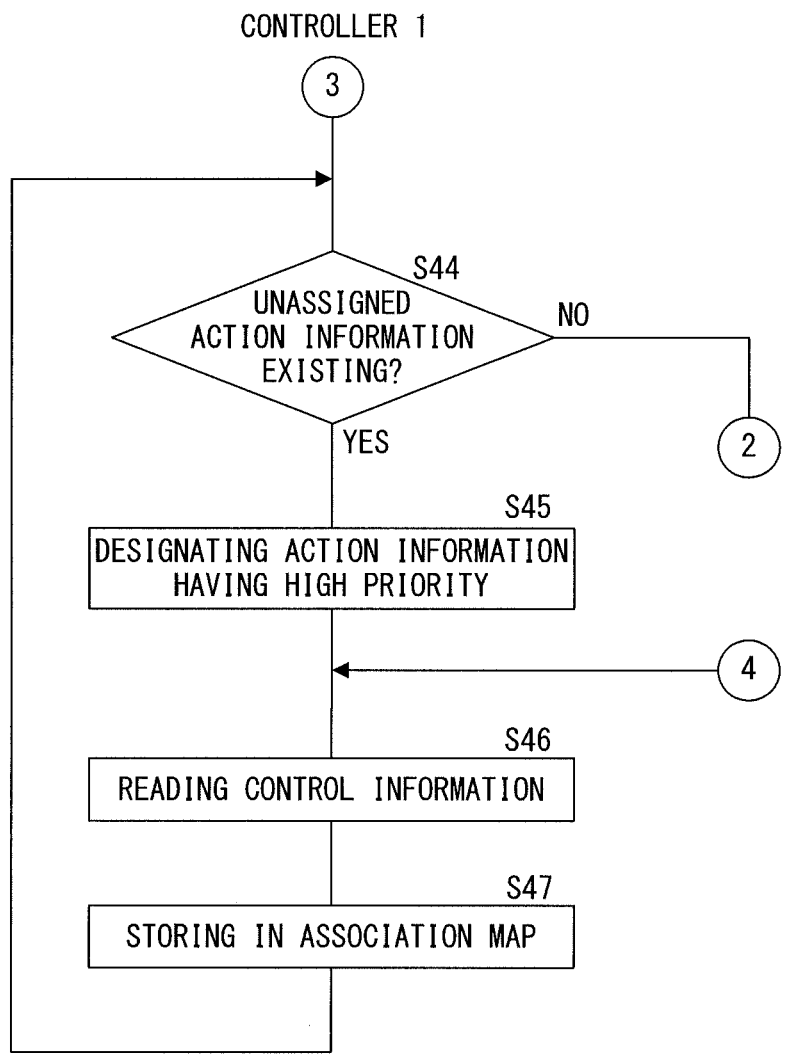
F I G. 1 9

F I G. 2 0 A

13b

| ACTION INFORMATION | CONTROL INFORMATION | EXECUTION COUNT |
|---|---|---|
| DIRECTING FORWARD TWICE WITH THE FILE OPEN | Set File | 1 |
| FULLY TURNING | Copy Num | 0 |
| DIRECTING LEFTWARD ONCE, AND THEN DIRECTING RIGHTWARD ONCE | Cancel | 0 |
| DIRECTING RIGHTWARD TWICE | Black and White | 1 |
| DIRECTING LEFTWARD TWICE | Color | 0 |
| ⋮ | ⋮ | ⋮ |

F I G. 2 0 B

13c

| ACTION INFORMATION | CONTROL INFORMATION | ACCUMULATED EXECUTION COUNT |
|---|---|---|
| DIRECTING FORWARD TWICE WITH THE FILE OPEN | Set File | 5 |
| FULLY TURNING | Copy Num | 3 |
| DIRECTING LEFTWARD ONCE, AND THEN DIRECTING RIGHTWARD ONCE | Cancel | 2 |

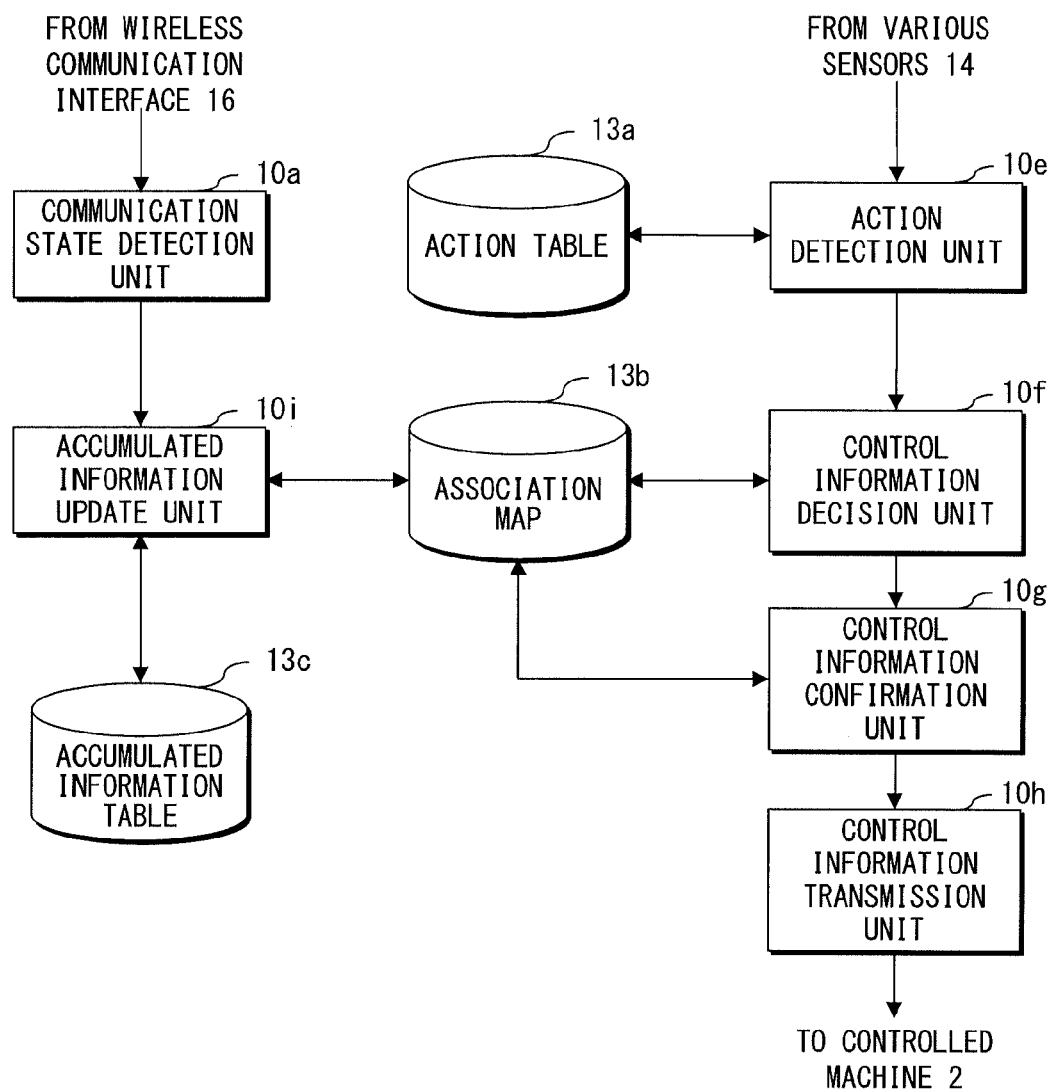
F I G. 21

| ACTION INFORMATION | CONTROL INFORMATION | ACCUMULATED EXECUTION COUNT |
|---|---|---|
| DIRECTING FORWARD TWICE WITH THE FILE OPEN | Set File | 6 |
| FULLY TURNING | Copy Num | 3 |
| DIRECTING LEFTWARD ONCE, AND THEN DIRECTING RIGHTWARD ONCE | Cancel | 2 |
| DIRECTING RIGHTWARD TWICE | Black and White | 1 |

| ACTION INFORMATION | CONTROL INFORMATION | EXECUTION TIME PERIOD | EXECUTION COUNT |
|---|---|---|---|
| DIRECTING FORWARD TWICE WITH THE FILE OPEN | Set File | AM | 1 |
| FULLY TURNING | Copy Num | AM | 1 |
| DIRECTING LEFTWARD ONCE, AND THEN DIRECTING RIGHTWARD ONCE | Cancel | | 0 |
| DIRECTING RIGHTWARD TWICE | Black and White | | 0 |
| DIRECTING LEFTWARD TWICE | Color | | 0 |
| ... | ... | ... | ... |

| ACTION INFORMATION | CONTROL INFORMATION | EXECUTION TIME PERIOD | ACCUMULATED EXECUTION COUNT |
|---|---|---|---|
| DIRECTING FORWARD TWICE WITH THE FILE OPEN | Set File | AM | 5 |
| FULLY TURNING | Copy Num | PM1 | 1 |
| | | PM1 | 3 |
| DIRECTING LEFTWARD ONCE, AND THEN DIRECTING RIGHTWARD ONCE | Cancel | PM2 | 2 |

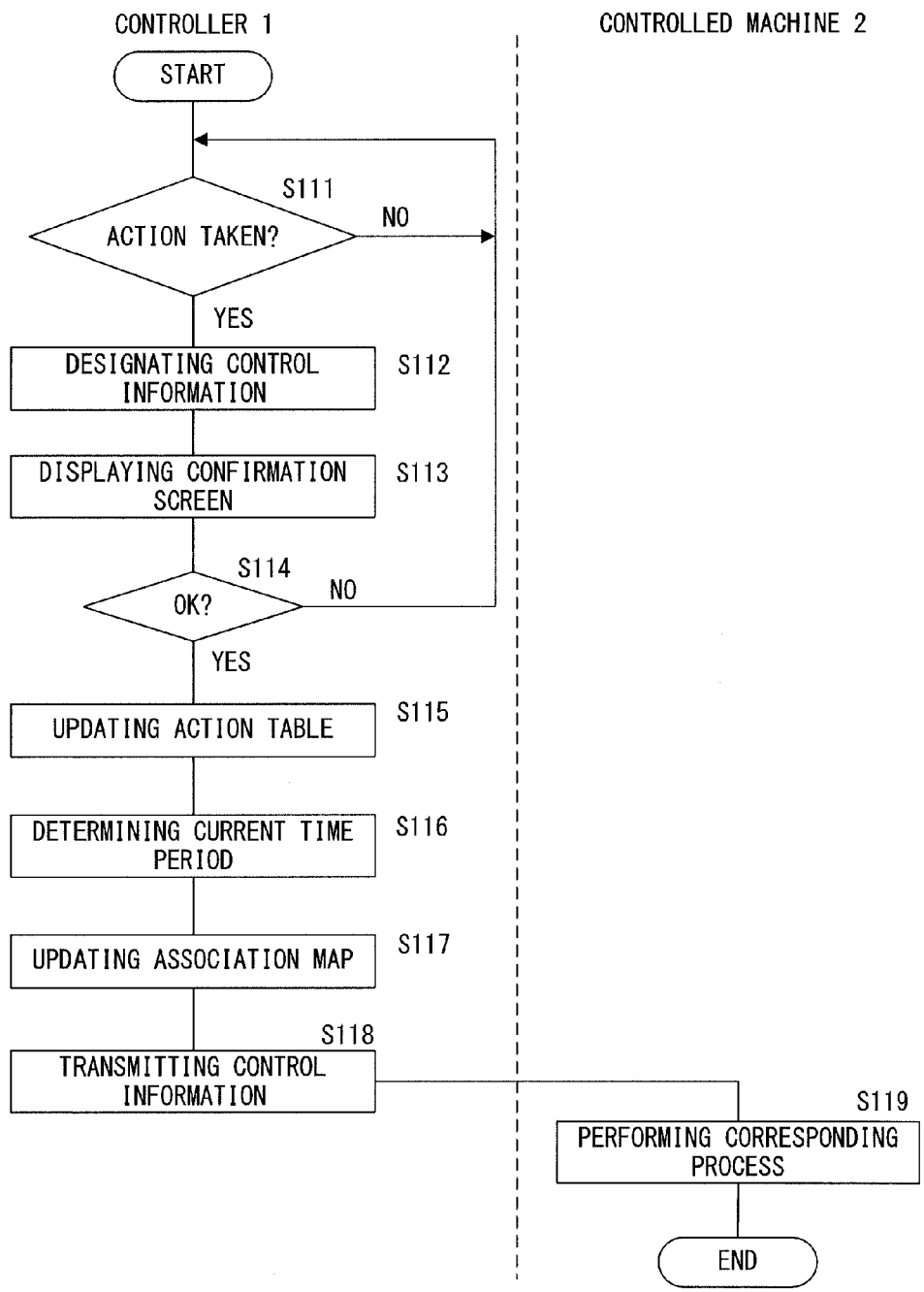
F I G. 3 0

FIG. 32A

| ACTION INFORMATION | CONTROL INFORMATION | EXECUTION PLACE | EXECUTION COUNT |
|---|---|---|---|
| DIRECTING FORWARD TWICE WITH THE FILE OPEN | Set File | A-office | 1 |
| FULLY TURNING | Copy Num | A-office | 1 |
| DIRECTING LEFTWARD ONCE, AND THEN DIRECTING RIGHTWARD ONCE | Cancel | | 0 |
| DIRECTING RIGHTWARD TWICE | Black and White | | 0 |
| DIRECTING LEFTWARD TWICE | Color | | 0 |
| ... | ... | ... | ... |

FIG. 32B

| ACTION INFORMATION | CONTROL INFORMATION | EXECUTION PLACE | ACCUMULATED EXECUTION COUNT |
|---|---|---|---|
| DIRECTING FORWARD TWICE WITH THE FILE OPEN | Set File | A-office | 5 |
|  |  | B-office | 1 |
| FULLY TURNING | Copy Num | A-office | 3 |
| DIRECTING LEFTWARD ONCE, AND THEN DIRECTING RIGHTWARD ONCE | Cancel | B-office | 2 |
| DIRECTING RIGHTWARD TWICE | Black and White | A-office | 5 |
| DIRECTING LEFTWARD TWICE | Color | B-office | 5 |
| ... | ... | ... | ... |

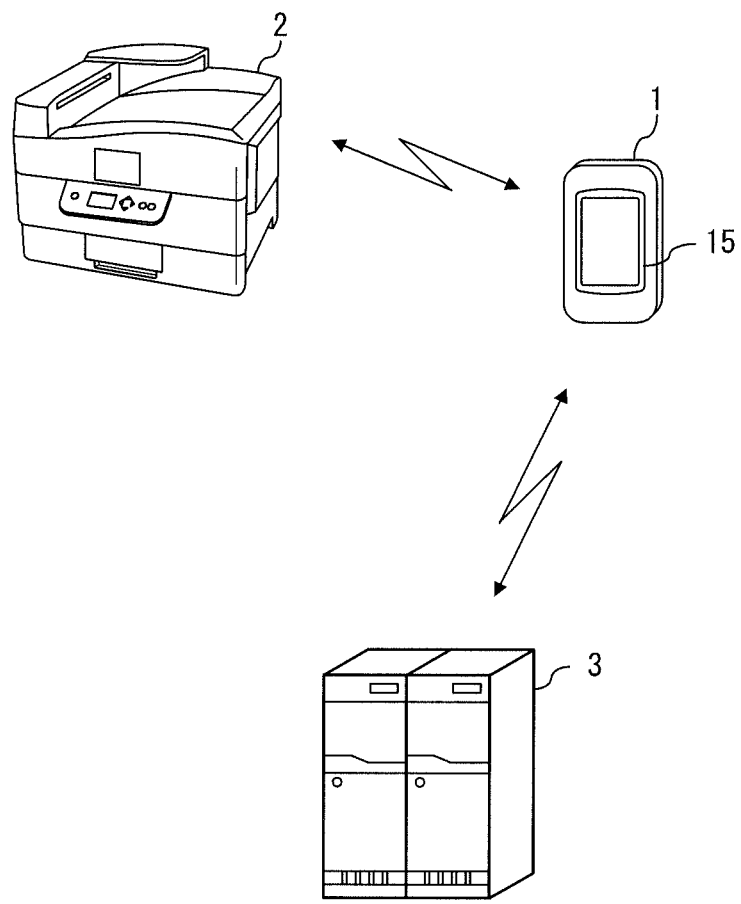
F I G. 33

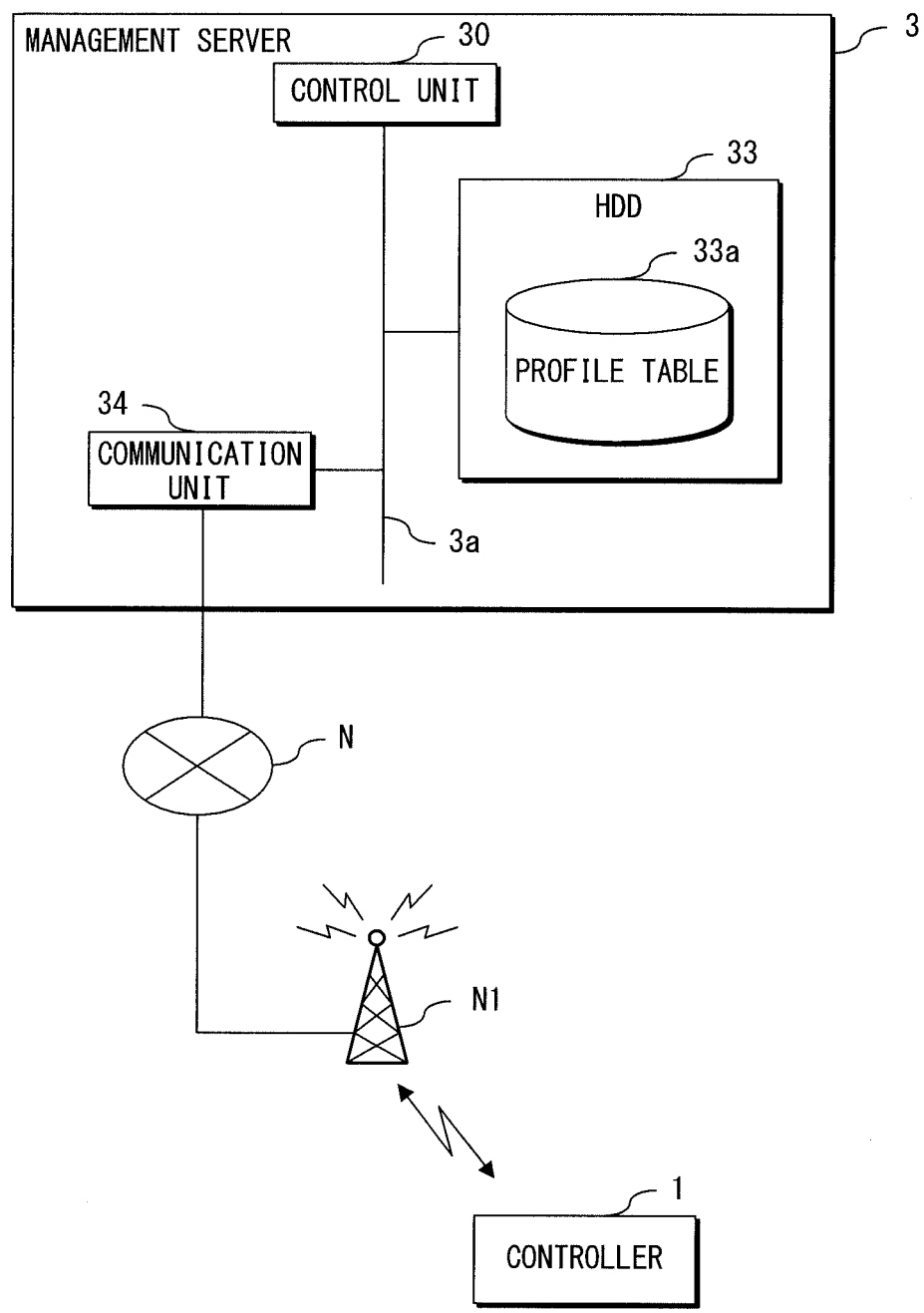
F I G. 3 5

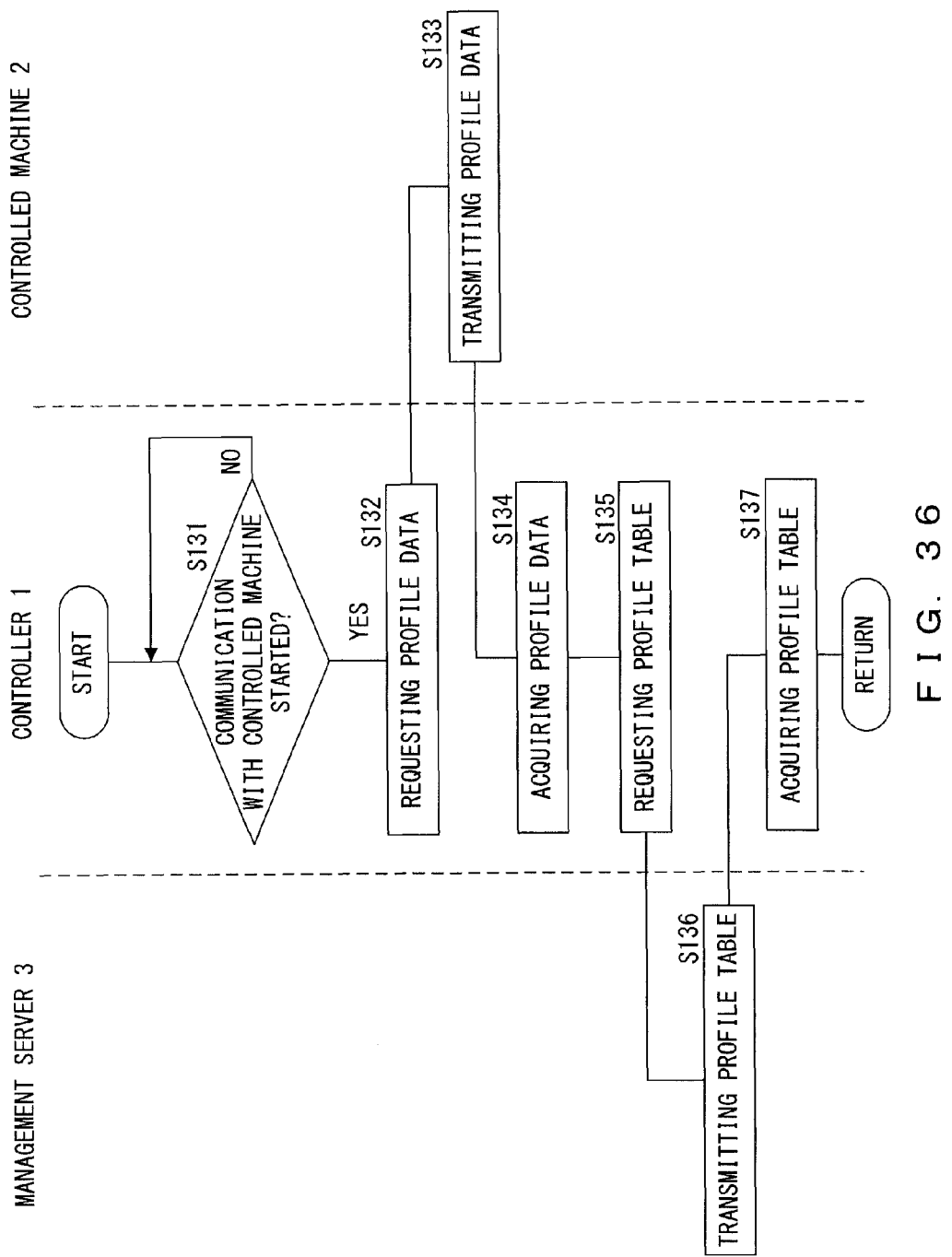
F I G. 36

F I G. 3 7 A

33b

| ACTION INFORMATION | CONTROL INFORMATION | ACCUMULATED EXECUTION COUNT |
|---|---|---|
| DIRECTING FORWARD TWICE WITH THE FILE OPEN | Set File | 10 |
| DIRECTING RIGHTWARD TWICE | Division | 3 |
| DIRECTING LEFTWARD TWICE | Copy Num | 5 |
| DIRECTING LEFTWARD ONCE, AND THEN DIRECTING RIGHTWARD ONCE | Cancel | 7 |
| REVERSING | Both sides | 2 |
| ⋮ | ⋮ | ⋮ |

F I G. 3 7 B

33c

| ACTION INFORMATION | RECOMMENDED INFORMATION |
|---|---|
| DIRECTING FORWARD TWICE WITH THE FILE OPEN | Set File |
| DIRECTING LEFTWARD TWICE | Copy Num |
| DIRECTING LEFTWARD ONCE, AND THEN DIRECTING RIGHTWARD ONCE | Cancel |

CONTROL DEVICE, CONTROL SYSTEM AND CONTROL METHOD

CROSS-REFERENCE TO RELATED APPLICATION

This application is a continuation of an international application PCT/JP2008/071625, which was filed on Nov. 28, 2008, the entire contents of which are incorporated herein by reference.

FIELD

The present invention relates to a control device for controlling the operation of electric equipment having various functions, a control system, a control method, and a computer program for realizing the control device by a computer.

BACKGROUND

Recently, in homes, corporations, offices, etc., electric equipments such as a television device, a video and/or audio record/replay device, an air conditioner, a lighting equipment, a copying machine, a printer, a multi functional machine, etc. have become widespread. These electric equipments have various devices for improving the operability. For example, electric equipments are configured to be remotely controlled.

However, since each electric equipment is operated by a remote controller corresponding to each electric equipment, the number of remote controllers increases with an increasing number of implemented electric equipments, thereby causing troublesome management of the remote controllers. In addition, since the arrangement, the operation method, etc. of the operation keys of each remote controller are different, it is very difficult to appropriately use the plurality of remote controllers.

Meanwhile, the ownership rate of mobile terminals such as a mobile telephone, a PHS (personal handy-phone system), PDA (personal digital assistants), etc. has largely risen. Thus, using the mobile terminals as the remote controllers of the above-mentioned electric equipments has been proposed (see for example, International Publication Pamphlet No. WO 01/802646, Japanese Laid-open Patent Publication No. 2005-151507, and Japanese Laid-open Patent Publication No. 2008-72269). Since various electric equipments can be operated using one of the proposed mobile terminals, the operability can be improved compared with the conventional case in which a plurality of remote controllers are used.

When the mobile terminal is used as a remote controller of the electric equipment as described above, it is necessary to make an association between each operation that a user does for the mobile terminal and each function implemented in each electric equipment in advance. This association is realized by using a association table to make a correspondence between operation information representing each operation for the mobile terminal and control information representing each function implemented in the electric equipment.

Specifically, in a configuration in which the mobile terminal manages the association table, when a user operates the mobile terminal, the mobile terminal identifies control information corresponding to accepted operation by referring to the association table, and transmits the identified control information to the electric equipment. The electric equipment performs a process of user operation taken on the mobile terminal by performing a process corresponding to the control information obtained from the mobile terminal.

In a configuration in which a server apparatus manages the association tables for respective electric equipments, when a user operates the mobile terminal, the mobile terminal transmits operation information representing accepted operation to the server apparatus. The server apparatus identifies control information corresponding to operation information obtained from the mobile terminal by referring to the association table, and returns the identified control information to the mobile terminal. The mobile terminal transmits the control information obtained from the server apparatus to the electric equipment. The electric equipment performs a process of user operation taken on the mobile terminal by performing a process corresponding to the control information obtained from the mobile terminal.

In the above configurations, a vender of the electric equipments has to generate the association table every time a new electric equipment is produced. In addition, a user is required to know which operation corresponds to which function in advance for each electric equipment. Furthermore, in the configuration in which the mobile terminal manages the association table, the association table must be registered every time a user purchases a new electric equipment.

SUMMARY

According to an aspect of the invention, a control device which controls an operation of a controlled device, includes: an operation information storage unit to store operation information about an acceptable operation; a control information acquisition unit to acquire control information about the controlled device; and an association table generation unit to generate an association table for storing the operation information stored in the operation information storage unit associated with the control information acquired by the control information acquisition unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic diagram of the configuration of the control system according to the embodiment 1;

FIG. 3 is a schematic diagram of the stored contents of an action table;

FIG. 4 is a schematic diagram of the stored contents of a profile table;

FIGS. 6A and 6B are schematic diagrams of the stored contents of an association map;

FIG. 7 is a schematic diagram of an example of the configuration of a notification screen;

FIG. 8 is a schematic diagram of an example of the configuration of a confirmation screen;

FIG. 11 is a flowchart of the procedure of the process when a controller controls the operation of a controlled machine;

FIG. 12 is a schematic diagram of an example of the configuration of a setting screen;

FIG. 13 is a schematic diagram of the stored contents of an action table;

FIG. 15 is a schematic diagram of the stored contents of an action table;

FIG. 16 is a schematic diagram of the stored contents of an association map according to the embodiment 3;

FIG. 19 is a flowchart of the procedure of the process of generating an association map;

FIGS. 20A and 20B are schematic diagrams of the stored contents of the association map and the accumulated information table according to the embodiment 4;

FIG. 21 is a block diagram of the functional configuration of the controller according to the embodiment 4;

FIG. 22 is a schematic diagram of the stored contents of an accumulated information table;

FIGS. 27A and 27B are schematic diagrams of the stored contents of the association map and the accumulated information table according to the embodiment 5;

FIG. 30 is a flowchart of the procedure of the process when a controller controls the operation of a controlled machine;

FIGS. 32A and 32B are schematic diagrams of the stored contents of the association map and the accumulated information table according to the embodiment 6;

FIG. 33 is a schematic diagram of the configuration of the control system according to the embodiment 7;

FIG. 35 is a block diagram of the configuration of a management server;

FIG. 36 is a flowchart of the procedure of the process of generating an association map according to the embodiment 7;

FIGS. 37A and 37B are schematic diagrams of the stored contents of the accumulated information table and the recommended information table according to the embodiment 8;

DESCRIPTION OF EMBODIMENTS

Figure 2:
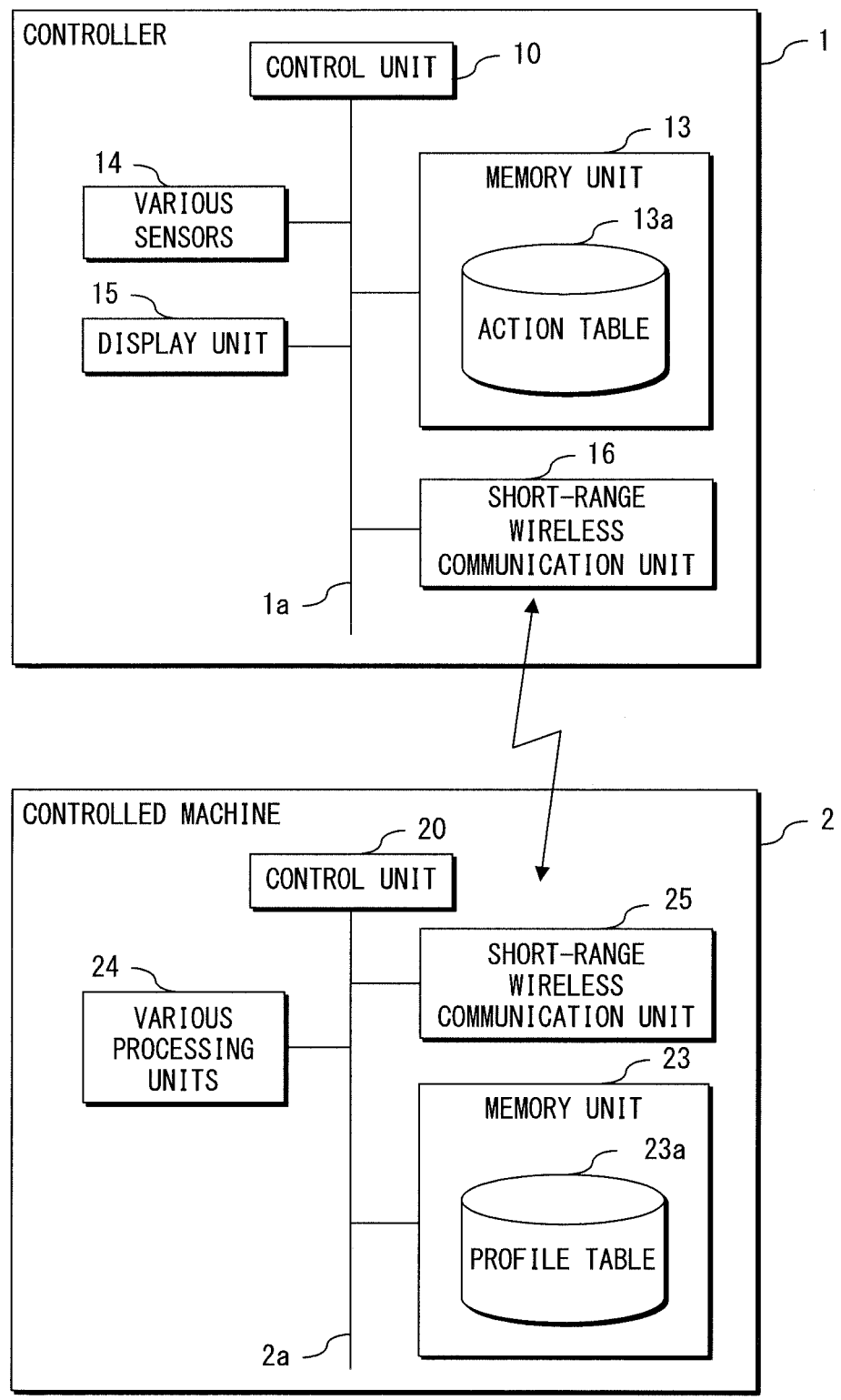
FIG. 2 is a block diagram of the configuration of the controller and the controlled machine according to the embodiment 1.

Described below with reference to the drawings according to each embodiment are the control device, the control system, the control method, and the computer program disclosed in the present application.

Embodiment 1

Described below is the control system according to the embodiment 1. FIG. 1 is a schematic diagram of the configuration of the control system according to the embodiment 1. The control system according to the embodiment 1 includes a controller 1 as a control device disclosed by the present application, and controlled machines (controlled device) 2, 2a, 2b, and 2c, etc. operated through the controller 1.

The controller 1 and each of the controlled machines 2, 2a, 2b, and 2c are configuration so that a wireless communication can be performed between the locations within a short-range of some meters. Practically, the controller 1 and the controlled machines 2, 2a, 2b, and 2c are configured for a wireless communication in accordance with short-range wireless communication standards such as Bluetooth®, an NFC (near field communication), ZigBee®, etc. In addition, the controller 1 and the controlled machines 2, 2a, 2b, and 2c can be configured so that a wireless communication can be performed in accordance with the wireless communication standards such as a WLAN (wireless local area network), an IrDA (infrared data association) using infrared radiation, etc.

Since the controller 1 is used as a remote controller for operating the controlled machines 2, 2a, 2b, and 2c, it is preferable that the controller 1 is small and light in weight, for example, it is configured as a card in business card size. Furthermore, if a smaller size is realized, the controller 1 can be formed as a pendant, or can be formed so that it can be attached to a watch or a ring.

The controller 1 performs a wireless communication with any of the controlled machines 2, 2a, 2b, and 2c within a distance of some meters from the controller 1. Therefore, a user can use the controller 1 as a remote controller of any of the controlled machines 2 (or 2a, 2b, 2c) by operating the controller 1 near the controlled machine 2 (or 2a, 2b, 2c).

The control system according to the embodiment 1 is described below with reference to the configuration of controlling the operation of a printer as the controlled machine 2 using the controller 1. As the controlled machine 2 controlled using the controller 1, not only a printer, but also, for example a copying machine, a multi functional machine, a television device 2a, video or audio record/replay device 2b, an air conditioner 2c, etc.

The video record/replay device 2b can be, for example, a video tape recorder, a DVD (digital versatile disk) recorder, hard disk recorder, a BD (Blue-ray Disc) recorder, a voice recorder (digital voice recorder), etc. The air conditioner 2c can be, for example, an air conditioner, a humidifier, a dehumidifier, an air cleaner, etc. In addition to these devices, for example, electric equipments sold with their remote controllers such as lighting equipments, a car navigation devices, etc. can be applied to the controlled machine 2.

Described below are the configurations of the controller 1 and the controlled machine 2 according to the embodiment 1. FIG. 2 is a block diagram of the configuration of the controller 1 and the controlled machine 2 according to the embodiment 1. The controller 1 according to the embodiment 1 includes a control unit 10, a memory unit 13, various sensors 14, a display unit 15, a short-range wireless communication unit 16, etc. Each unit of these hardware components is interconnected through a bus 1*a*.

The controller 1 according to the embodiment 1 realizes the operations of the control device disclosed by the present application by storing the computer program disclosed by the present application in the memory unit 13, and executing the computer program by the control unit 10. The computer program disclosed by the present application is not limited to the configuration stored in advance in the memory unit 13. For example, when the controller 1 is configured to access external memory, the controller 1 may read the computer program stored in the external memory and store it in the memory unit 13. The controller 1 may also download the computer program from an external device and store it in the memory unit 13.

The control unit 10 can be, a CPU (central processing unit) or an MPU (microprocessor unit), etc., and has a clock to count absolute time (year, month, day, hour, minute, and second). The control unit 10 appropriately executes the control program stored in advance in the memory unit 13 with specified timing. The control unit 10 controls the operation of each hardware component described above.

The memory unit 13 is, for example, flash memory. The memory unit 13 stores in advance various control programs necessary for operating the controller 1 as a control device disclosed by the present application. The memory unit 13 also stores an action table 13*a* as illustrated in FIG. 3. The action table 13*a* is described later in detail.

Each of the various sensors 14 is a 3-dimensional motion sensor including a gyrosensor, an accelerating sensor, etc. The various sensors 14 detect an action (operation) performed by a user on the controller 1. Practically, the various sensors 14 detect the movement of the controller 1, that is, in which direction the user has directed the controller 1, how the user has directed the controller 1, etc.

The various sensors 14 are not limited to the configuration designed using a motion sensor. For example, various sensors using laser, infrared, ultrasonic sensors, etc. can be used. Practically, they can be configured by combining any of a close sensor, a pressure sensor, a temperature sensor, an illumination sensor, a sensor for detecting a heart beat, a pulse, a brain wave, a fingerprint, a vein, a voice print, etc., a capacitance sensor, a displacement sensor, an image sensor, an angle sensor, an angular speed sensor, a geomagnetic sensor, a magnetic sensor, a slope sensor, a posture direction reference device, a position rating device, a GPS (global positioning system) for detecting a direction, a posture, etc. In addition, a code such as a bar code, a QR code, etc., a reader/writer capable of reading and writing data on an RFID (radio frequency identification) tag, an IC card, etc., a touch sensor (touch panel), a mike, etc. can also be used. It is obvious that a device other than these sensors can be used.

The display unit 15 is, for example, a liquid crystal display, and displays the operation state of the controller 1 and the information to be reported to a user, etc. at an instruction from the control unit 10.

The short-range wireless communication unit 16 is an interface for performing a wireless communication between the locations within a short-range of some meters. The short-range wireless communication unit 16 performs a communication with the controlled machine 2 located within a range of some meters around the controller 1.

The controller 1 according to the embodiment 1 is described as a dedicated device. However, the controller 1 can also be realized by, for example, adding a control program and the action table 13*a* to a mobile terminal such as a mobile telephone, a PHS, a PDA, etc. having a motion sensor (various sensors 14) and a short-range wireless communication function (short-range wireless communication unit 16).

The controlled machine 2 according to the embodiment 1 includes a control unit 20, a memory unit 23, various processing units 24, a short-range wireless communication unit 25, etc. Each unit of these hardware components is interconnected through a bus 2*a*.

The control unit 20 is a CPU, an MPU, etc. The control unit 20 appropriately executes a control program stored in advance in the memory unit 23 at specified timing. The control unit 20 controls the operation of each hardware component described above.

The memory unit 23 is, for example, flash memory. The memory unit 23 stores in advance various control programs necessary to function as the controlled machine 2. The memory unit 23 stores a profile table 23*a* as illustrated in FIG. 4. The profile table 23*a* is described later in detail.

The various processing units 24 perform various processes at an instruction of the control unit 20. Since the controlled machine 2 according to the embodiment 1 is a printer, the various processing units 24 perform processes such as the receiving process of receiving image data from an external device, the image outputting process of output an image based on the received image data, etc.

The short-range wireless communication unit 25 is an interface for performing a wireless communication between the locations within a short-range of some meters. The short-range wireless communication unit 25 performs a communication with the controller 1 when the controller 1 enters a specified range of a distance of some meters.

The controlled machine 2 is provided with, for example, a touch panel (not illustrated in the attached drawings), receives an operation of a user through the touch panel, and notifies the user of various types of information.

FIG. 3 is a schematic diagram of the stored contents of an action table 13*a*. As illustrated in FIG. 3, the action table (operation information storage unit) 13*a* stores action information, recommended control information, operation count (number of detected operations), etc. after being associated with one another with respect to each action which can be received by the controller 1. The action which can be received by the controller 1 refers to an action which can be detected by the various sensors 14.

The action information is the information (operation information) about the action (operation) which can be detected by the various sensors 14 of the controller 1. Practically, it is "directing forward twice with the file open", "directing leftward twice", etc.

According to the embodiment 1, the surface on which the display unit 15 is provided is defined as the front surface of the controller 1. Therefore, the action of "directing forward twice with the file open" is an operation of directing the controller 1 twice in the direction of the surface on which the display unit 15 is provided with the desired file being displayed on the display unit 15. In the embodiment 1, the left side of the display unit 15 of the controller 1 in the state illustrated in FIG. 1 viewed by the user is defined as the left side of the controller 1, and the right side of the display unit 15 is defined as the right side of the controller 1. Therefore, the action of "directing leftward twice" refers to the operation of directing the controller 1 illustrated in FIG. 1 twice leftwards.

The recommended control information is the information set in advance for each action. The recommended control information is the information for directing the controlled machine 2 to perform the function instinctively estimated from each action in each function of the electric equipment which can be the controlled machine 2. Used in this embodiment are, for example, "Set file" for indicating the "specification of a file", "Send Page" for indicating the "movement to the next page", "Return Page" for indicating the "return to the preceding page", "Send to All" for indicating the "broadcast to all terminals (users)", "Num" for indicating the "setting of a numeric value", "Bye" for indicating the "termination of process", "Cancel" for indicating the "deletion of the process", etc.

The operation count refers to the number of the actions performed by the user. Practically, the operation count refers to number of detections by the various sensors 14 that the user has performed each action.

The action table 13a stores in advance the action information and the recommended control information. The operation count in the action table 13a is updated by the control unit 10 each time the various sensors 14 detect the performance of each action.

FIG. 4 is a schematic diagram of the stored contents of the profile table 23a. The profile table 23a stores the control information for control of the operation of the controlled machine 2. Practically, as illustrated in FIG. 4, the profile table (control information storage unit) 23a stores in advance the function information including an item name, the control information, an argument, etc. for each function of the controlled machine 2. The profile table 23a is generated in the producing stage of the controlled machine 2. The item name is the information for identification of each function. The control information is the information set in advance for each function. Upon receipt of any control information, the controlled machine 2 performs a corresponding function. An argument is necessary information when each function is performed by the controlled machine 2. The information about the argument is not necessary for all function information.

The "equipment profile" is stored in the column of the item name as the first piece of function information in the profile table 23a, and the "printer" is stored in the column of the control information. It indicates that the type of the controlled machine 2 is a printer. As the second piece of the function information, the "equipment name" is stored in the column of the item name, and "Pri-AAA" is stored in the column of the control information. It indicates that the identification information for identification of the controlled machine 2 is "Pri-AAA". The control information "Pri-AAA" for the "equipment name" is assigned different information for each equipment unit although it is the equipment of the same model. Therefore, each equipment unit can be identified. The information about the equipment profile and the equipment name is normally assigned to all electric equipment units provided with a communication function.

In the profile table 23a illustrated in FIG. 4, the information about the event 1 is the function information about a file specifying process (Set File), the information about the event 2 is the function information about the setting of the number of printed copies (Copy Num), the information about the event 3 is the function information about the cancellation (Cancel) of various processes, the information about the event 4 is the function information about the monochrome printing (Black and White), the information about the event 5 is the function information about the color printing (Color), and the information about the event 6 is the function information about the expanding process (Expansion).

Figure 5:
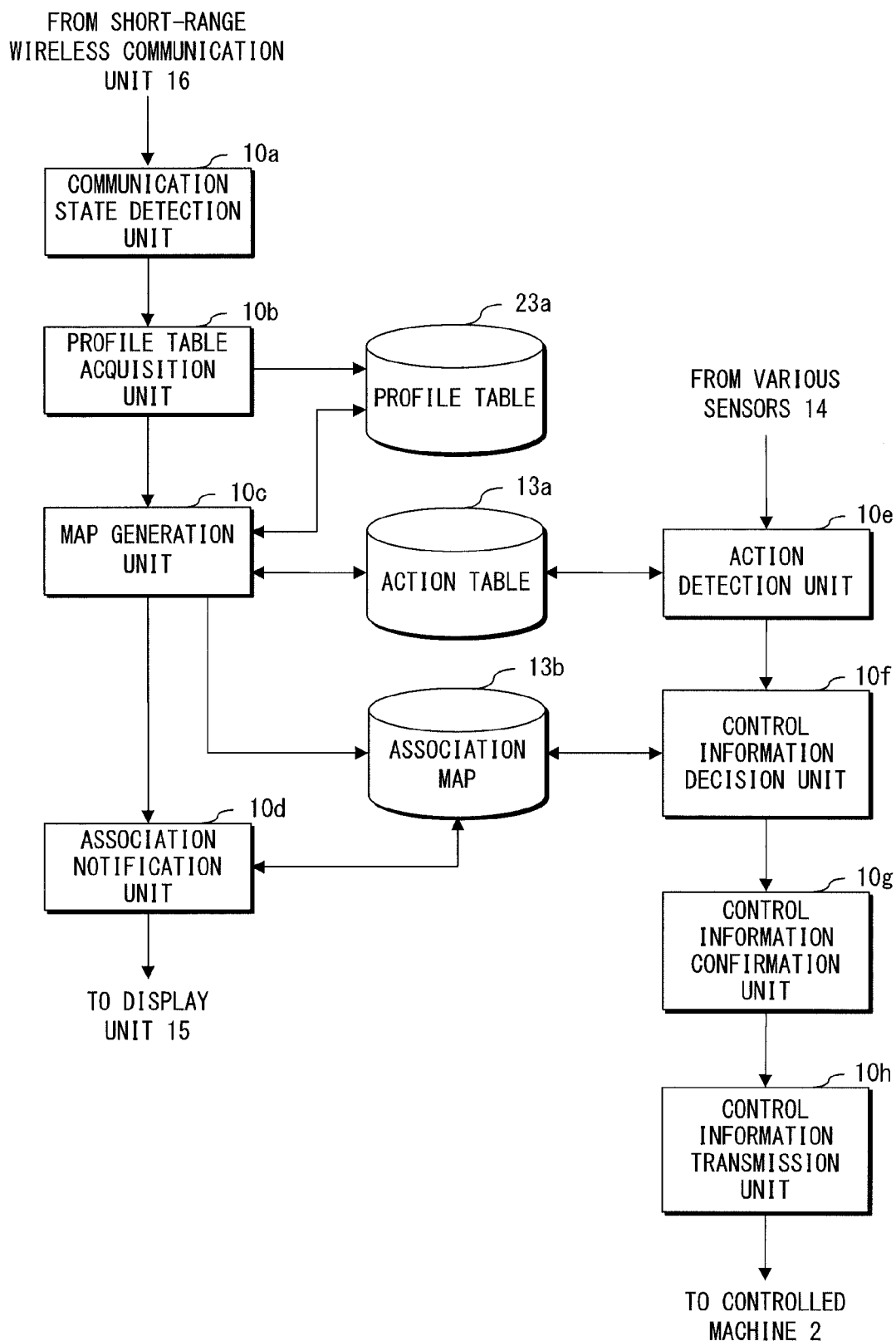
FIG. 5 is a block diagram of the functional configuration of the controller according to the embodiment 1.

The function realized by the control unit 10 of the controller 1 by executing the control program stored in the memory unit 13 in the control system with the above-mentioned configuration is described below. FIG. 5 is a block diagram of the functional configuration of the controller 1 according to the embodiment 1.

In the controller 1 according to the embodiment 1, the control unit 10 executes the control program stored in the memory unit 13, thereby realizing the functions of a communication state detection unit 10a, a profile table acquisition unit 10b, a map generation unit 10c, an association notification unit 10d, an action detection unit 10e, a control information decision unit 10f, a control information confirmation unit 10g, a control information transmission unit 10h, etc.

The communication state detection unit 10a detects the communication state with the controlled machine 2 through the short-range wireless communication unit 16. Practically, the communication state detection unit 10a detects whether or not the communication with the controlled machine 2 has started by having the distance between the controller 1 and the controlled machine 2 shorter than a specified distance. When the communication state detection unit 10a detects that the communication with the controlled machine 2 has started, it is reported to the profile table acquisition unit 10b. When the controller 1 communicates with the controlled machine 2, the communication state detection unit 10a also detects whether or not the communication with the controlled machine 2 has been disconnected by having the distance between the controller 1 and the controlled machine 2 longer than a predetermined distance.

When the communication between the controller 1 and the controlled machine 2 starts, the profile table acquisition unit 10b requests the controlled machine 2 for the profile table 23a. Upon request for the profile table 23a from the controller 1 after the communication with the controller 1 is started through the short-range wireless communication unit 25, the control unit 20 of the controlled machine 2 reads the profile table 23a from the memory unit 23. The control unit 20 transmits the profile table 23a read from the memory unit 23 to the controller 1 through the short-range wireless communication unit 25.

The profile table acquisition unit 10b acquires the profile table 23a transmitted from the controlled machine 2 and stores it in the memory unit 13. The profile table acquisition unit 10b notifies the map generation unit 10c that the profile table 23a has been acquired.

The map generation unit 10c generates an association map (association table) 13b as illustrated in FIG. 6A and FIG. 6B based on the action table 13a and the memory unit 23a stored in the memory unit 13. FIGS. 6A and 6b are schematic diagrams of the stored contents of the association map 13b. FIG. 6A illustrates the association map 13b being generated, and FIG. 6B illustrates a completed association map 13b.

The association map 13b stores the action information (operation information) about the action to be performed by a user on the controller 1 associated with the control information for control of each function of the controlled machine 2. Practically, as illustrated in FIG. 6A and FIG. 6B, the association map 13b stores each piece of action information stored in the action table 13a associated with the control information stored in the profile table 23a.

The map generation unit (similarity detection unit) 10c first compares the recommended control information stored in the action table 13a with the control information stored in the profile table 23a, and determines whether or not any recommended control information includes similar control information. The map generation unit 10c determines on the action table 13a illustrated in FIG. 3 and the profile table 23a illustrated in FIG. 4 that each piece of the control information "Set File", "Copy Num", and "Cancel" in the profile table 23a is respectively similar to the recommended control information "Set File", "Num", and "Cancel" in the action table 13a.

When the map generation unit 10c determines that there is control information similar to any recommended control information, it reads the action information corresponding to the recommended control information from the action table 13a. The map generation unit 10c associates the read action information with the control information determined as similar to the recommended control information, and stores the information in the association map 13b. FIG. 6A illustrates the association map 13b with the action information and the control information stored as described above.

Practically, the association map 13b illustrated in FIG. 6A stores the action information "directing forward twice with the file open" corresponding to the recommended control information "Set File" associated with the control information "Set File" determined as similar to the recommended control information. Likewise, the association map 13b illustrated in FIG. 6A stores the action information "fully turning" corresponding to the recommended control information "Num" associated with the control information "Copy Num", and also stores the action information "directing leftward once, and then directing rightward once" corresponding to the recommended control information "Cancel" associated with the control information "Cancel".

The action table 13a stores the action information about each action associated with the recommended control information instinctively estimated from each action. Since the association map 13b is generated using the action table 13a, each action performed on the controller 1 can be associated with the operation of the controlled machine 2 instinctively estimated from each action. Therefore, each process of the controlled machine 2 can be associated with the action instinctively estimated from each process.

Next, the map generation unit 10c determines whether or not there is any action information, in the action information listed in the action table 13a, not assigned control information depending on the above-mentioned processes. If it is determined that there is action information not assigned control information, then the map generation unit 10c reads the action information not assigned control information from the action table 13a sequentially in the descending order of the operation count. In addition, the map generation unit 10c sequentially reads from the top of the profile table 23a the control information not assigned any action information depending on the process above in the control information of the profile table 23a. The map generation unit 10c stores in the association map 13b the action information and the control information in the order in which they have been read.

FIG. 6B illustrates the association map 13b with the action information and the control information stored as described above. From the action table 13a, the action information "directing rightward twice" and "directing leftward twice" are read in this order, and the pieces of control information "Black and White" and "Color" are read in this order from the profile table 23a. Therefore, the action information "directing rightward twice" is associated with the control information "Black and White" and stored in the association map 13b, and the action information "directing leftward twice" is associated with the control information "Color" and stored in the association map 13b.

The map generation unit 10c repeats the above-mentioned process until it associates all action information stored in the action table 13a with the respective control information stored in the profile table 23a and stores the information. When the map generation unit 10c stores all action information with the respective control information in the association map 13b, it notifies the association notification unit 10d of the completion of the association map 13b.

The association notification unit (notification unit) 10d reports the association between the action information and the control information stored in the association map 13b generated by the map generation unit 10c. Practically, the association notification unit 10d reads the action information stored in the association map 13b, and also reads the process contents corresponding to the control information stored in the association map 13b from the profile table 23a acquired from the controlled machine 2. The association notification unit 10d generates a notification screen for display of the read action information associated with the read process contents, and displays the screen on the display unit 15.

FIG. 7 is a schematic diagram of an example of the configuration of a notification screen. The notification screen illustrated in FIG. 7 displays the action indicated by the action information stored in the association map 13b associated with the function of the controlled machine 2 corresponding to each action.

Thus, the user of the controller 1 can grasp the action (operation) to be performed for the controller 1 so that the controlled machine 2 performs each process (function). Therefore, it is not necessary to grasp in advance the action to be performed by a user on the controller 1 and the process to be performed by the controlled machine 2, thereby reducing the load of the user.

The user operates an OK button by once directing the controller 1 backward after confirming the association between the action and the function on the notification screen illustrated in FIG. 7. The backward of the controller 1 is the reverse of the surface on which the display unit 15 is provided. The control unit 10 of the controller 1 terminates the display of the notification screen when the OK button is operated on the notification screen illustrated in FIG. 7, and terminates the process of generating the association map 13b.

The association between the action indicated by the action information stored in the association map 13b and the function of the controlled machine 2 is not limited to the configuration of a notification by displaying the notification screen on the display unit 15 as illustrated in FIG. 7. For example, if the display area of the display unit 15 is small, and there is a display area for one line only, then the character string indicating the association may be transmitted and reported in a specified direction. In addition when the controller 1 is provided with a speaker, the association may also be notified by voice. The timing with which the association is reported to the user is not only after the generation of the association map 13b, but the notification may be appropriately issued at a request from the user so far as the controller 1 communicates with the controlled machine 2.

In the controller 1 which has generated the association map 13b as described above, the action detection unit 10e detects the action (operation) performed by the user on the controller 1 according to the output signals from the various sensors 14. Practically, the action detection unit (operation detection unit) 10e detects whether or not any of the actions indicated by the action information stored in the action table 13a has been taken.

When the action detection unit 10e detects that any of the actions has been taken, the operation count of the action is updated. Practically, the action detection unit (detection count update unit) 10e adds 1 to the operation count (detection count) stored in the action table 13a corresponding to the action information about the detected action. Thus, by counting the operation count of each action, the frequency of each action taken by the user on the controller 1 can be known.

When the action detection unit 10e detects that any of the actions has been taken, the action information indicating the detected action is read from the action table 13a, and notifies the control information decision unit 10f of the information. The control information decision unit 10f designates the control information corresponding to the action information notified by the action detection unit 10e from the association map 13b.

Practically, the control information decision unit 10f searches the association map 13b and determines whether or not the action information notified by the action detection unit 10e is stored in the association map 13b. If it is determined that the action information is stored in the association map 13b, the control information decision unit (designation unit) 10f reads the control information stored in the association map 13b in association with the action information.

The control information decision unit 10f notifies the control information confirmation unit 10g of the action information notified by the action detection unit 10e and the control information read from the association map 13b. According to the notified information, the control information confirmation unit 10g reports the action taken by the user on the controller 1 and the process performed by the controlled machine 2 in response to the action, and confirms whether or not the action and the process are appropriate.

Practically, the control information confirmation unit 10g reads the process contents corresponding to the notified control information from the profile table 23a acquired from the controlled machine 2. The control information confirmation unit (detection result notification unit) 10g generates a confirmation screen for display of the action indicated by the notified action information and the process contents read from the profile table 23a, and displays the screen on the display unit 15.

FIG. 8 is a schematic diagram of an example of the configuration of a confirmation screen. The confirmation screen illustrated in FIG. 8 associates the action "fully turning three times" detected by the controller 1 with the "printing 3 copies" as the function of the controlled machine 2 corresponding to the action, and displays them. Thus, the user of the controller 1 can confirm the action taken by himself/herself on the controller 1 and the process (function) to be performed by the controlled machine 2 in response to the action.

The user of the controller 1 confirms the confirmation screen illustrated in FIG. 8, and determines whether or not the action taken by the user is "fully turning three times", and the process to be performed by the controlled machine 2 according to the direction of the user is setting "printing 3 copies". When the user determines that the action and the executing function illustrated in FIG. 8 are appropriate, the user directs the controller 1 backwards once, thereby operating the OK button. When the OK button is operated on the confirmation screen illustrated in FIG. 8, the control information confirmation unit (reception unit) 10g recognizes that the action and the function reported on the confirmation screen are appropriate. Then, the control information confirmation unit 10g notifies the control information transmission unit 10h of the control information notified by the control information decision unit 10f.

On the other hand, if the user determines that the action and/or the executing function illustrated in FIG. 8 are not appropriate, then the user directs the controller 1 leftwards once, and then directs it rightwards once, thereby operating the cancel button. The leftward direction of the controller 1 is the left side of the display unit 15 in the state in which the user views the controller 1 in the state illustrated in FIG. 1. When the cancel button is operated on the confirmation screen illustrated in FIG. 8, the control information confirmation unit (reception unit) 10g recognizes that the action and/or the function notified on the confirmation screen are not appropriate. In this case, the control information confirmation unit 10g terminates the process without performing any process.

When the notification of the control information is received from the control information confirmation unit 10g, the control information transmission unit (control unit) 10h transmits the received control information to the controlled machine 2 through the short-range wireless communication unit 16. Thus, the control information transmission unit 10h directs the controlled machine 2 to perform the operation (process) according to the control information. When the control unit 20 of the controlled machine 2 acquires the control information from the controller 1 through the short-range wireless communication unit 25, the control unit 20 performs the process corresponding to the acquired control information. Thus, the controller 1 can control the operation of the controlled machine 2 according to the control information corresponding to the action taken by the user. Accordingly, the controller 1 can be used as a remote controller of the controlled machine 2.

When the controller 1 detects an action, it notifies the user of the detected action and the function to be performed by the controlled machine 2 in association with the action, thereby allowing the user to determine whether or not the action and the function are appropriate. Therefore, when the user takes an action different from the action corresponding to the function to be executed by the controlled machine 2, or when the controller 1 erroneously recognizes the action, the action can be taken again.

In the embodiment 1, the control information decision unit 10f notifies the control information confirmation unit 10g of notified action information and the control information read from the association map 13b each time the control information decision unit 10f receives the action information from the action detection unit 10e. However, the present invention is not limited to this configuration. For example, the control information confirmation unit 10g calculates the OK rate based on the result confirmed by the user through the confirmation screen for each action, and stores the calculation result in the action table 13a. For the action for which the OK rate is equal to or exceeds a specified value (for example, 90 percent), the control information decision unit 10f can notify the control information transmission unit 10h of the action information and the control information without notifying the control information confirmation unit 10g of the information. Thus, the process of confirming on the confirmation screen whether or not the action is correct each time the user takes an action can be omitted.

Figure 9:
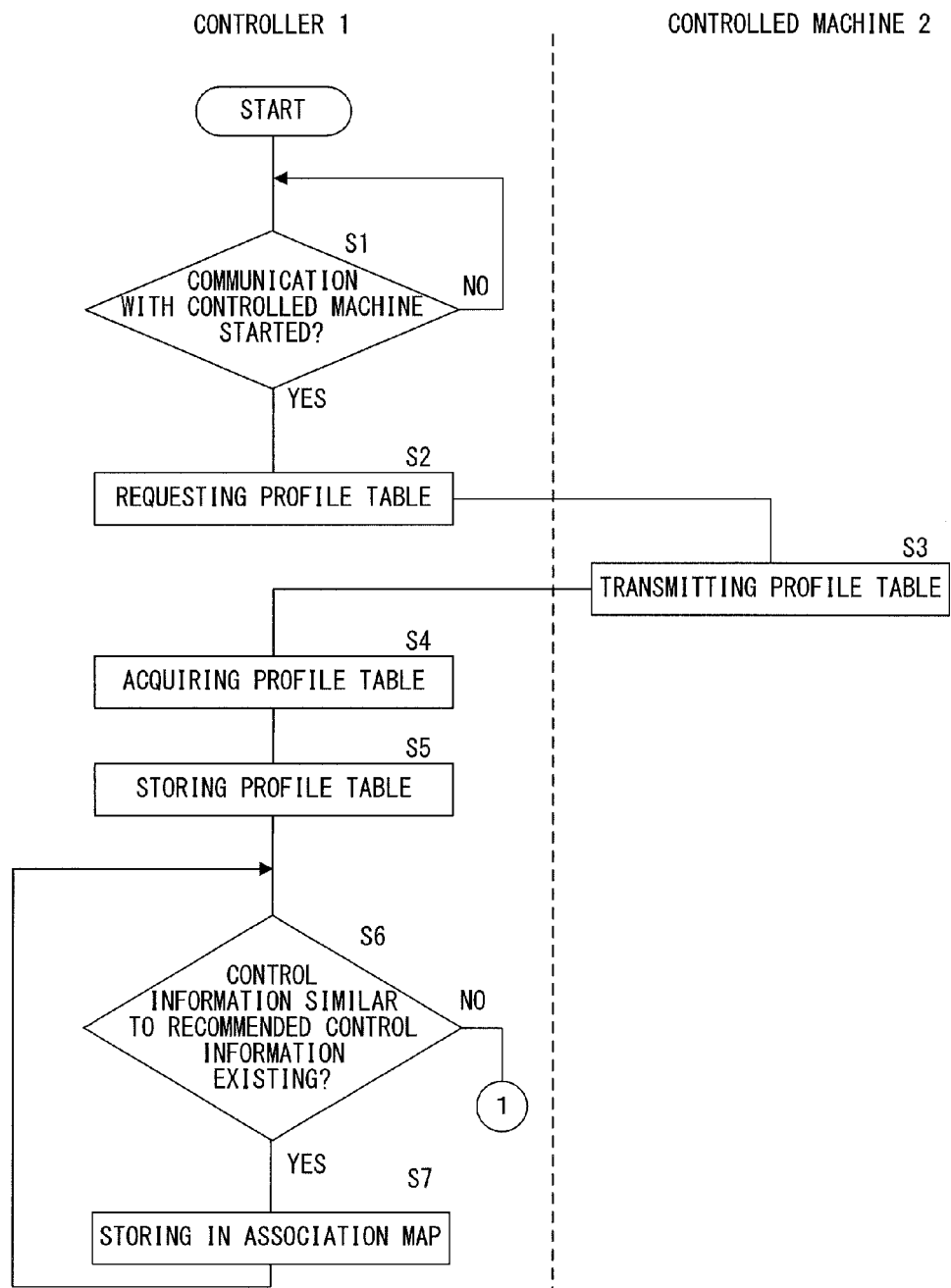
FIG. 9 is a flowchart of the procedure of the process of generating an association map.
Figure 10:
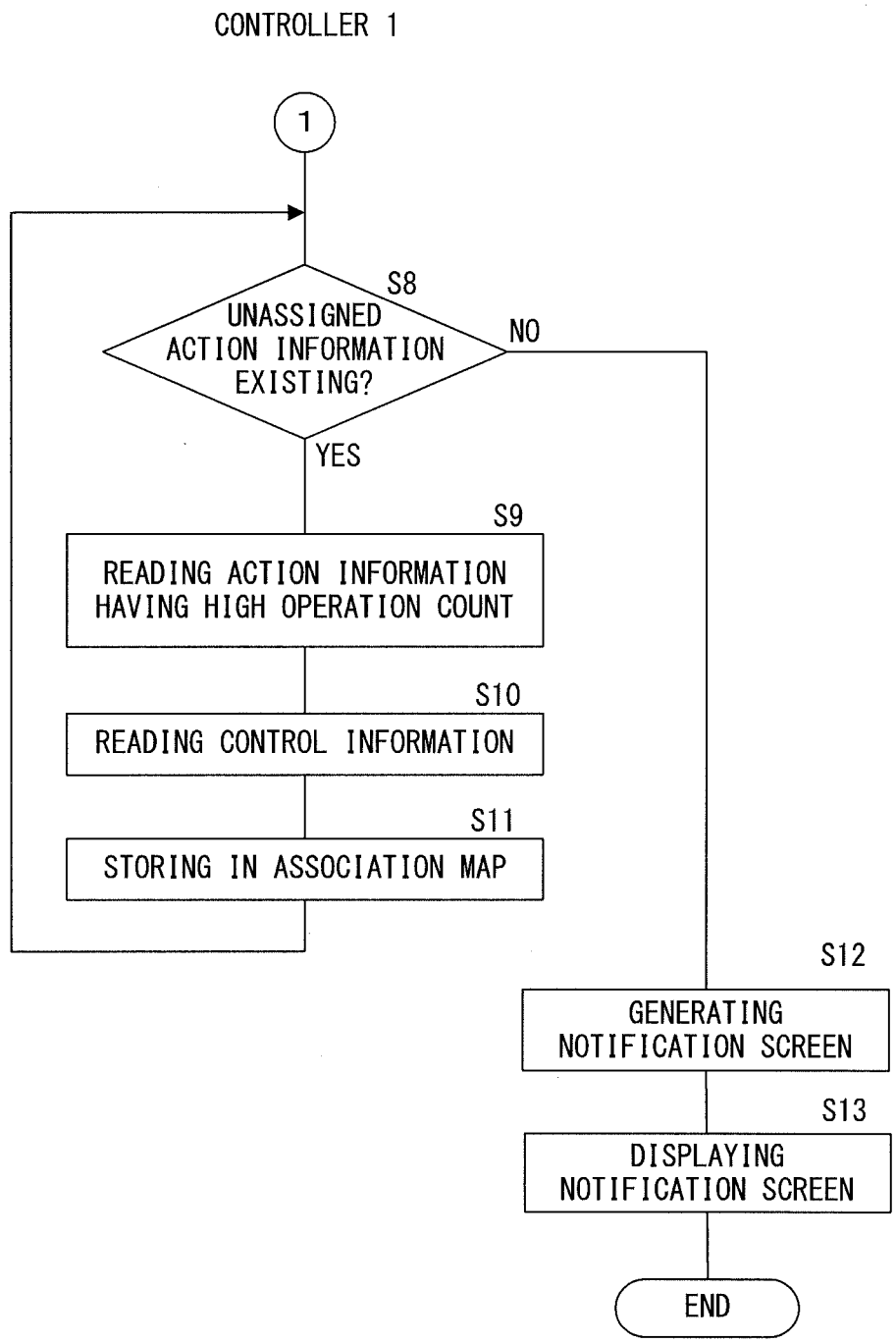
FIG. 10 is a flowchart of the procedure of the process of generating an association map.

The process of generating the association map 13b for control of the operation of the controlled machine 2 by the controller 1 in the control system according to the embodiment 1 is described below with reference to the flowchart. FIG. 9 and FIG. 10 are flowcharts of the procedure of the process of generating the association map 13b. The following process is performed by the control unit 10 according to the control program stored in the memory unit 13 of the controller 1, and also performed by the control unit 20 according to the control program stored in the memory unit 23 of the controlled machine 2. In FIG. 9, in the two areas sectioned by the broken line, the left area indicates the process by the control unit 10 of the controller 1, and the right area indicates the process by the control unit 20 of the controlled machine 2.

The control unit 10 of the controller 1 determines whether or not the communication with the controlled machine 2 has been started (S1). If it is determined that the communication has not been started (NO in S1), control enters the standby state until the communication starts. If it is determined that the communication has been started (YES in S1), the control unit 10 requests the controlled machine 2 for the profile table 23a (S2). If the profile table 23a is requested from the controller 1 after the communication with the controller 1 has been started, the control unit 20 of the controlled machine 2 reads the profile table 23a stored in the memory unit 23, and transmits it to the controller 1 (S3).

When the control unit 10 of the controller 1 acquires the profile table 23a from the controlled machine 2 (S4), the control unit 10 stores the acquired profile table 23a in the memory unit 13 (S5). The control unit 10 generates the association map 13b based on the action table 13a stored in the memory unit 13 and the profile table 23a. Practically, the control unit 10 determines, in the control information stored in the profile table 23a, whether or not there is control information similar to any of the recommended control information stored in the action table 13a (S6). If it is determined that there is control information similar to any recommended control information (YES in S6), then the control unit 10 associates the action information corresponding to the recommended control information with the control information determined as similar to the recommended control information, and stores them in the association map 13b (S7).

The control unit 10 return control to step S6, and determines whether or not there is another piece of control information similar to any of the recommended control information stored in the action table 13a (S6). The control unit 10 repeats the processes in steps S6 and S7 until it is determined there is no control information similar to any of the recommended control information. When the control unit 10 determines that there is no control information similar to any of the recommended control information (NO in S6), it determines, in the action information stored in the action table 13a, whether or not there is action information which has not been assigned (or has not been assigned yet) control information in the above-mentioned processes (S8).

When the control unit 10 determines that there is action information which has not been assigned control information (YES in S8), the control unit 10 reads from the action table 13a the action information having the highest operation count in all unassigned action information (S9). The control unit 10 reads from the profile table 23a the control information stored in the area closest to the leading area in the profile table 23a in the control information which has not assigned the action information in the above-mentioned processes (S10).

The control unit 10 associates the action information read in step S9 with the control information read in step S10 and stores them in the association map 13b (S11). The control unit 10 returns control to the process in step S8, and determines whether or not there is action information which has not been assigned control information in the action information stored in the action table 13a (S8). The control unit 10 repeats the processes in steps S8 through S11 until the control information is assigned to all action information stored in the action table 13a.

When the control unit 10 determines that there is no action information which has not been assigned the control information (NO in S8), and generates the notification screen as illustrated in FIG. 7 (S12). The control unit 10 displays the generated notification screen on the display unit 15 (S13), and reports the association between the action information stored in the association map 13b and the control information. Then, the control unit 10 terminates the process of generating the association map 13b.

Next, the process performed when the controller 1 operates as a remote controller of the controlled machine 2 in the control system in which the controller 1 generates the association map 13b in the above-mentioned processes is described with reference to a flowchart. FIG. 11 is a flowchart of the procedure of the process when the controller 1 controls the operation of the controlled machine 2. The following process is performed by the control unit 10 according to the control program stored in the memory unit 13 of the controller 1 and performed by the control unit 20 according to the control program stored in the memory unit 23 of the controlled machine 2. In FIG. 11, the process performed by the control unit 10 of the controller 1 is illustrated in the left area and the process performed by the control unit 20 of the controlled machine 2 is illustrated in the right area in the two areas sectioned by the broken line.

The control unit 10 of the controller 1 determines according to the output signal from the various sensors 14 whether or not the user has taken on the controller 1 any action indicated by the action information stored in the action table 13a (S21). If it is determined that no action has been taken (NO in S21), the control unit 10 enters a standby state. If it is determined that any action has been taken (YES in S21), the control unit 10 reads the action information indicating the action whose performance has been detected from the action table 13a, and designates the control information corresponding to the read action information from the association map 13b (S22).

The control unit 10 generates a confirmation screen for confirmation as to whether or not the action whose performance has been detected in step S21 and the process of the controlled machine 2 indicated by the control information designated in step S22 are appropriate, and displays the screen on the display unit 15 (S23). The control unit 10 determines whether or not the OK button has been operated through the confirmation screen (S24). When it is determined that the OK button has not been operated (NO in S24), that is, when the cancel button is operated, control is returned to step S21.

When the control unit 10 determines through the confirmation screen that the OK button has been operated (YES in S24), the control unit 10 updates the action table 13a (S25). Practically, the control unit 10 adds 1 to the operation count stored in the action table 13a corresponding to the action information about the action whose performance has been detected. Then the control unit 10 transmits the control information designated in step S22 to the controlled machine 2 (S26).

When the control unit 20 of the controlled machine 2 acquires the control information from the controller 1, the control unit 20 performs the process corresponding to the acquired control information (S27). Thus, the process performed when the controller 1 operates as a remote controller of the controlled machine 2 terminates.

As described above, according to the embodiment 1, the association map 13b in which the action taken by the user on the controller 1 is associated with each function of the controlled machine 2 is dynamically generated. Thus, it is not necessary to prepare the association map 13b in advance. Therefore, it is not necessary for a manufacturer to generate the association map 13b of each controller 1 for each electric equipment as the controlled machine 2, and it is not necessary for the user of the controller 1 to enter the association map 13b in advance in the controller 1. In addition, since the association map 13b is dynamically generated, it is not necessary to recognize which function is associated with which action, thereby reducing the load of the user.

Described above in the embodiment 1 is an example of the configuration of controlling the operation of the printer as the controlled machine 2 by the controller 1. Therefore, as the function information stored in the profile table 23a, the information relating to the printing process (Set File), the setting of the number of printed copies (Copy Num), cancellation (Cancel), etc. has been used. However, it is obvious that the present invention is not limited to the piece of information. For example, when it is assumed that the controller 1 controls the operation of a television device as the controlled machine 2, the profile table 23a stores the function information relating to, for example, "setting channel number to a value larger by 1", "setting audio volume to a value larger by a specified value", etc.

Therefore, as the recommended control information in the action table 13a, not only the information such as "Set File", "Send Page", "Return Page", etc., but also the information corresponding to the processes of "adding 1 to channel number", "adding specified value to audio volume", etc. may be stored. For example, the information indicating the process of "setting channel number to a value smaller by 1" can be stored as the recommended control information corresponding to the action information "directing leftward twice" stored in the action table 13a.

As described above, the controller 1 stores the generated association map 13b in the memory unit 13, and controls the operation of the controlled machine 2 based on the association map 13b when the action by the user is detected. Since the controller 1 and the controlled machine 2 are configured so that a wireless communication can be established between the locations within a short-range, the communication between the controller 1 and the controlled machine 2 terminates when the controller 1 move away from the controlled machine 2 by a distance longer than a specified distance. In this case, the control unit 10 of the controller 1 may delete the association map 13b stored in the memory unit 13.

When the communication with the controlled machine 2 is terminated, the control unit 10 of the controller 1 can store in the memory unit 13 the association map 13b as associated with the information about the equipment profile and the equipment name stored in the profile table profile table 23a acquired from the controlled machine 2. In this case, when the controller 1 is used again as the remote controller of the same controlled machine 2, the generated association map 13b can be reused, thereby simplifying the process.

Embodiment 2

Described below is the control system according to the embodiment 2. Since the control system according to the embodiment 2 can be realized by similar configuration as the control system according to the embodiment 1, similar configuration is assigned the same reference numeral, and the detailed description is omitted here.

In the embodiment 1, each piece of action information stored in the action table 13a is associated with any of the control information stored in the 23a to generate the association map 13b. In the embodiment 1, the action table 13a stores each piece of information set in advance. On the other hand, in the embodiment 2, the recommended control information stored in the action table 13a, that is, the recommended control information corresponding to the action information, can be arbitrarily set by a user.

In the controller 1 in the embodiment 2, when the user performs a specified operation for performing the process of setting the action table 13a, the control unit 10 generates a setting screen as illustrated in FIG. 12, and displays it on the display unit 15. FIG. 12 is a schematic diagram of an example of the configuration of a setting screen. The setting screen illustrated in FIG. 12 is to assign any of the recommended control information to be stored in the action table 13a to each piece of the action information stored in the action table 13a.

On the setting screen in FIG. 12, a pull-down menu for selection of any of the recommended control information is displayed corresponding to each piece of action information. A user assigns any of the recommended control information to each piece of action information using the pull-down menu. To avoid double assigning the same recommended control information to different pieces of action information, the information may be displayed so that the recommended control information already assigned to any of the action information cannot be selected.

When the user assigns the recommended control information to each piece of action information on the setting screen illustrated in FIG. 12, and then requests to enter the association in the action table 13a, the user directs the controller 1 backward once, thereby operates the OK button. When the OK button is operated on the setting screen illustrated in FIG. 12, the control unit (recommended control information reception unit) 10 of the controller 1 receives the action information and the recommended control information on the setting screen. The control unit (storage control unit) 10 associates the received action information with the recommended control information and stores them in the action table 13a.

FIG. 13 is a schematic diagram of the stored contents of the action table 13a. As illustrated in FIG. 13, the action table 13a according to the embodiment 2 stores the recommended control information set by the user for each piece of action information. Therefore, in the action table 13a according to the embodiment 1, two pieces of recommended control information "Send to All" and "Num" are stored for the action information "fully turning". However, in the action table 13a of the embodiment 2, the recommended control information "Num" is stored for the action information "fully turning".

On the other hand, when the user requests to suspend the process of assigning the recommended control information to each piece of action information, the user directs the controller 1 leftward once, and then directs the controller 1 rightward once, thereby operating the cancel button. If the cancel button is operated on the setting screen in FIG. 12, the control unit 10 of the controller 1 terminates the process of setting the action table 13a on the setting screen.

As described above, in the embodiment 2, the association between the action information and the recommended control information stored in the action table 13a can be arbitrarily changed by a user. Thus, the user can assign the recommended control information depending on the action which can be easily taken on the controller 1, the action rarely taken on the controller 1, the information which can be instinctively predicted from each action, etc. In addition, by associating the recommended control information similar to the control information which is specified by a user on the controlled machine 2 with a high possibility with an action which is easily operated by the user, the operability when the controller 1 is operated as a remote controller of the controlled machine 2 can be improved.

As described above, since the process of generating the association map 13b using the action table 13a in which the recommended control information is arbitrarily set by a user is the same as the process described in the embodiment 1 above, the description is omitted here. Also since the process performed when the controller 1 is used as a remote controller of the controlled machine 2 using the generated association map 13*b* is the same as the process described in the embodiment 1 above, the description is omitted here.

Embodiment 3

Described below is the control system according to the embodiment 3. Since the control system according to the embodiment 3 can be realized by similar configuration as the control system according to the embodiment 1 above, similar configuration is assigned the same reference numeral, and the detailed description is omitted here.

In the embodiment 1, when there is the control information similar to the recommended control information stored in the action table 13*a*, the association map 13*b* is generated by associating the action information corresponding to the recommended control information with the similar control information. In addition, in the embodiment 1, the action information not assigned the control information in the above-mentioned process is read in the descending order of the operation count, and the control information which has not assigned the action information is read in order from the top of the profile table 23*a*, thereby generating the association map 13*b* by associating them respectively.

On the other hand, in the embodiment 3, a user arbitrarily sets a priority (processing order) for the action information stored in the action table 13*a*, and when plural pieces of the action information having the equal operation count are read, while the action information is read from the action table 13*a*, the priority is considered. That is, the controller 1 according to the embodiment 3 generates the association map 13*b* by sequentially associating the action information having a higher priority with the control information read from the profile table 23*a* when there are plural pieces of action information having the equal operation count while the action information corresponding to the recommended control information having no similar control information detected is read in the descending order of the operation count.

Figure 14:
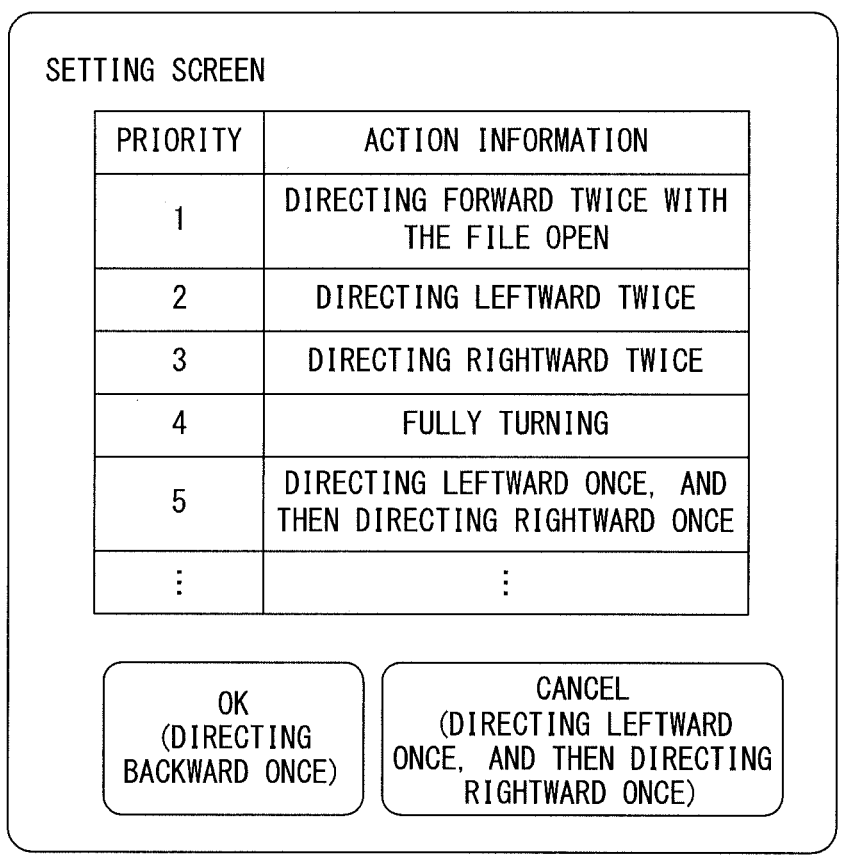
FIG. 14 is a schematic diagram of an example of the configuration of a setting screen.

In the controller 1 according to the embodiment 3, when the control unit 10 performs a specified operation to assign a priority to each piece of action information stored in the action table 13*a*, the control unit 10 generates a setting screen as illustrated in FIG. 14, and displays the screen on the display unit 15. FIG. 14 is a schematic diagram of an example of the configuration of a setting screen. The setting screen in FIG. 14 is to assign a priority (processing order) of 1, 2, 3, . . . to each piece of action information stored in the action table 13*a*.

On the setting screen illustrated in FIG. 14, an input column for input of the priority of 1, 2, 3, . . . corresponding to the respective pieces of action information is displayed. A user performs a specified operation, thereby assigning a priority to each piece of the action information.

When the user requests to assign a priority to each action information on the setting screen in FIG. 14, and then enter the association in the action table 13*a*, the user directs the controller 1 backward once, thereby operating the OK button. When the OK button is operated on the setting screen illustrated in FIG. 14, the control unit (process order reception unit) 10 receives the priority and the action information through the setting screen. The control unit (process order storage control unit) 10 associates the received priority with the received action information and stores them in the action table 13*a*.

FIG. 15 is a schematic diagram of the stored contents of the action table 13*a*. As illustrated in FIG. 15, the action table 13*a* according to the embodiment 3 stores the priority set by the user corresponding to the action information and the recommended control information set in advance, and the sequentially updated operation count.

On the other hand, when the user requests to suspend the process of assigning the priority to each piece of action information on the setting screen illustrated in FIG. 14, the user directs the controller 1 leftward once, and then directs it rightward once, thereby operating a cancel button. If the cancel button is operated on the setting screen illustrated in FIG. 14, the control unit 10 of the controller 1 terminates the process of setting the priority through the setting screen.

Described below is the function realized by the control unit 10 executing the control program stored in the memory unit 13 in the controller 1 according to the embodiment 3. Also with the controller 1 in the embodiment 3, the control unit 10 realizes each function illustrated in FIG. 5.

As with the map generation unit 10*c* described above according to the embodiment 1, the map generation unit 10*c* according to the embodiment 3 generates the association map 13*b* based on the action table 13*a* stored in the memory unit 13 and the profile table 23*a* acquired from the controlled machine 2 and stored in the memory unit 13.

Also the map generation unit 10*c* according to the embodiment 3 first compares the recommended control information stored in the action table 13*a* with the control information stored in the profile table 23*a*, and determines whether or not there is the control information similar to any recommended control information. Relating to the action table 13*a* in FIG. 15 and the profile table 23*a* in FIG. 4, the map generation unit 10*c* determines that the control information "Set File", "Copy Num", and "Cancel" in the profile table 23*a* are respectively similar to the recommended control information "Set File", "Num", and "Cancel" in the action table 13*a*.

When the map generation unit 10*c* determines that there is the control information similar to any recommended control information, it reads the action information corresponding to the recommended control information from the action table 13*a*. The map generation unit 10*c* associates the read action information with the control information determined as similar to the recommended control information, and stores them in the association map 13*b*.

Next, the map generation unit 10*c* determines whether or not there is the action information, in the action information in the action table 13*a*, not assigned control information in the above-mentioned processes. If the map generation unit 10*c* determines that there is action information not assigned control information, it reads the action information not assigned the control information from the action table 13*a* in the descending order of the operation count. In this example, the action information "directing leftward twice" and "directing rightward twice" having the operation count of 6 are read.

The map generation unit 10*c* determines whether or not there are plural pieces of read action information. That is, the map generation unit 10*c* determines whether or not there are plural pieces of action information having the equal operation count. In this example, since two pieces of action information "directing leftward twice" and "directing rightward twice" are read, the map generation unit 10*c* determines that there are plural pieces of read action information.

When the map generation unit 10*c* determines that there are plural pieces of action information, it designates the action information having the highest priority in the read action information. On the other hand, the map generation unit 10*c* sequentially reads the control information not assigned the action information in the above-mentioned processes in order from the top of the profile table 23*a*. Then, the map generation unit 10c associates the action information having the highest priority with the control information read from the profile table 23a and stores them in the association map 13b.

Furthermore, when the map generation unit 10c reads plural pieces of action information having the equal operation count, it designates the action information having the second highest priority, associates the designated action information with the control information read from the profile table 23a next, and stores them in the association map 13b. The map generation unit 10c assigns the control information to all action information having the equal operation count.

In this example, since the priority of the action information "directing leftward twice" is higher than the priority of the action information "directing rightward twice", the action information "directing leftward twice" and the control information "Black and White" are stored in the association map 13b. Then, the action information "directing rightward twice" and the control information "Color" are stored in the association map 13b.

FIG. 16 is a schematic diagram of the stored contents of the association map 13b according to the embodiment 3. In the above-mentioned processes, the controller 1 according to the embodiment 3 generates the association map 13b as illustrated in FIG. 16. The map generation unit 10c performs the above-mentioned processes until all action information stored in the action table 13a is associated with any of the control information stored in the profile table 23a and stored in the association map 13b.

As described above, according to the embodiment 3, each of the action information stored in the action table 13a is assigned a priority. Thus, when the association map 13b is generated, and when the operation count of the action information stored in the action table 13a has the equal operation count, the priority is considered, thereby successfully assigning the control information to the action information having the equal operation count in an appropriate order.

In the controller 1 according to the embodiment 3, since each component other than the map generation unit 10c performs similar process as each component in the embodiment 1, the detailed description is omitted here.

Figure 17:
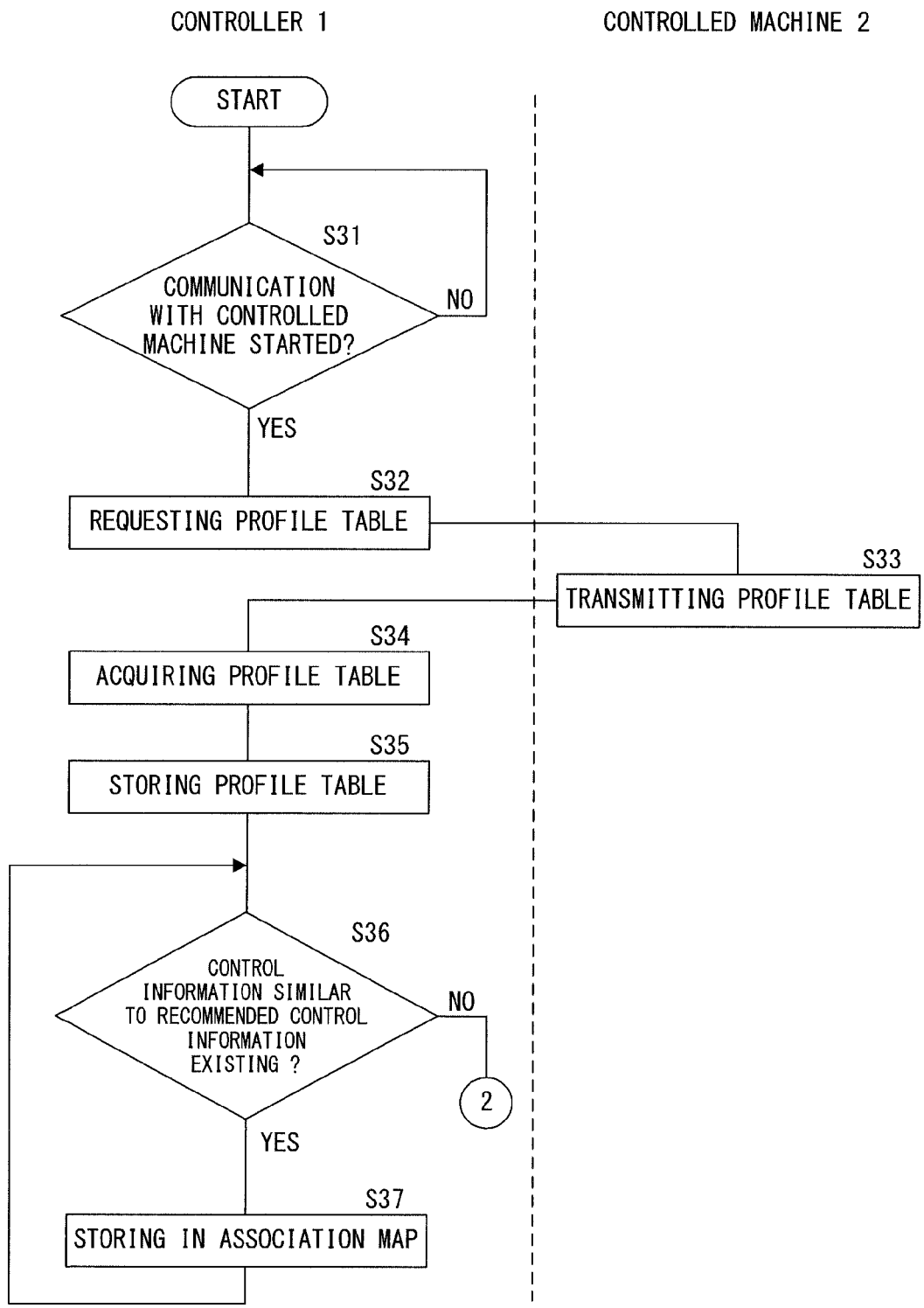
FIG. 17 is a flowchart of the procedure of the process of generating an association map.
Figure 18:
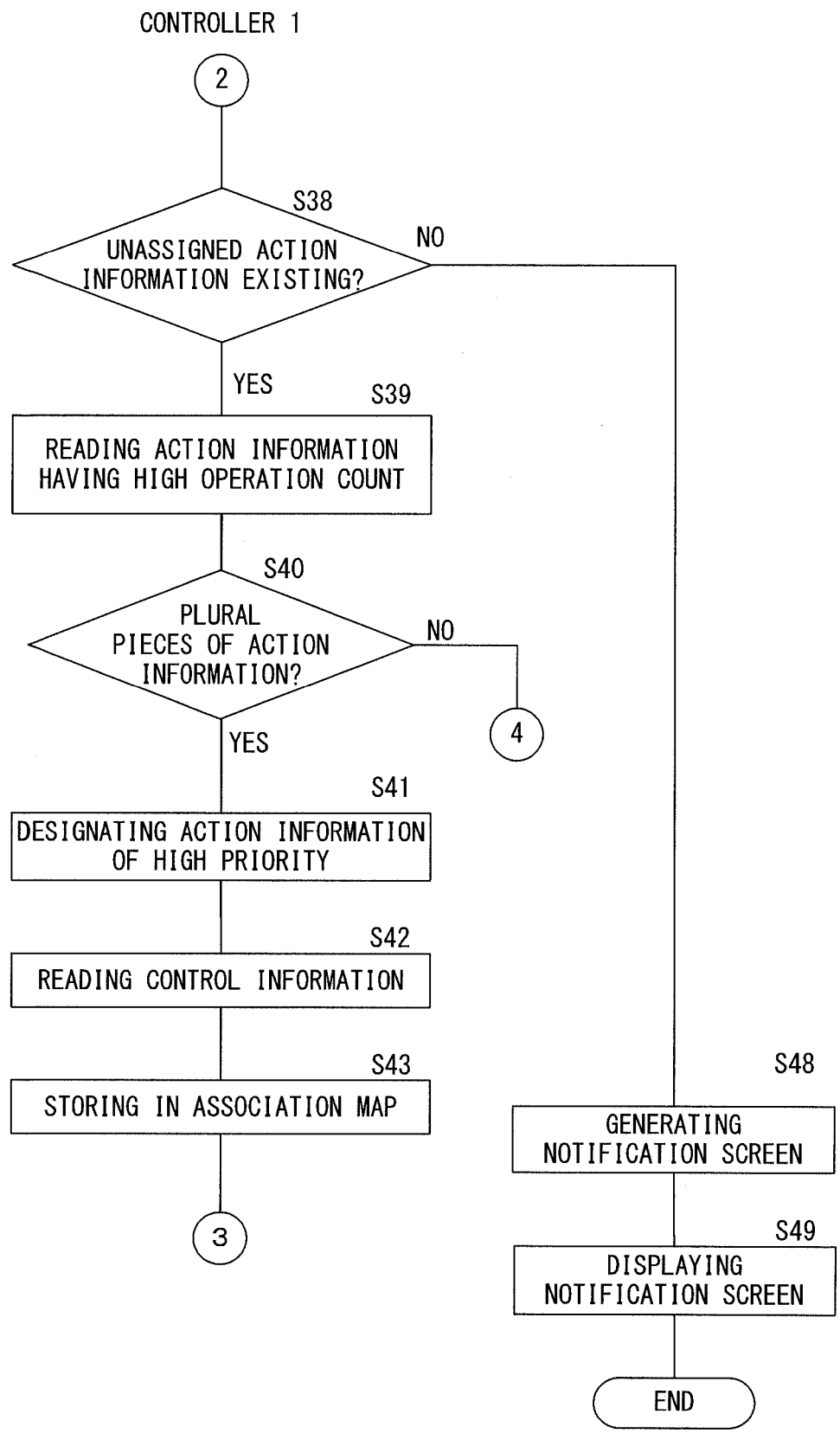
FIG. 18 is a flowchart of the procedure of the process of generating an association map.

The process of the controller 1 generating the association map 13b to control the operation of the controlled machine 2 in the control system according to the embodiment 3 is described below with reference to the flowchart. FIG. 17 through FIG. 19 are flowcharts of the procedure of the process of generating the association map 13b. The following processes are executed by the control unit 10 according to the control program stored in the memory unit 13 of the controller 1, and are executed by the control unit 20 according to the control program stored in the memory unit 23 of the controlled machine 2. In FIG. 17, in the two areas sectioned by the broken line, the left area stores the process by the control unit 10 of the controller 1, and the right area stores the process by the control unit 20 of the controlled machine 2.

The control unit 10 of the controller 1 determines whether or not the communication with the controlled machine 2 has been started (S31). If it is determined that the communication with the controlled machine 2 has not been started (NO in S31), the control unit 10 enters a standby state until it is started. If it is determined that the communication with the controlled machine 2 has been started (YES in S31), the control unit 10 requests the controlled machine 2 for the profile table 23a (S32). If the profile table 23a is requested by the controller 1 after the communication with the controller 1 is started, the control unit 20 of the controlled machine 2 reads the profile table 23a stored in the memory unit 23, and transmits it to the controller 1 (S33).

When the control unit 10 of the controller 1 acquires the profile table 23a from the controlled machine 2 (S34), it stores the acquired profile table 23a in the memory unit 13 (S35). The control unit 10 generates the association map 13b based on the action table 13a stored in the memory unit 13 and the profile table 23a.

Practically, the control unit 10 determines whether or not there is control information, in the control information stored in the profile table 23a, similar to any of the recommended control information stored in the action table 13a (S36). If the control unit 10 determines that there is control information similar to any of the recommended control information (YES in S36), it associates the action information corresponding to the recommended control information with the control information determined as similar to the recommended control information, and stores them in the association map 13b (S37).

The control unit 10 returns control to step S36, and determines whether or not there is another piece of control information similar to any of the recommended control information stored in the action table 13a (S36). The control unit 10 repeats the processes in steps S36 and S37 until it determines there is no control information similar to any of the recommended control information. When the control unit 10 determines that there is no control information similar to any of the recommended control information (NO in S36), the control unit 10 determines whether or not there is action information which has not been assigned (yet) control information in the processes in the action information stored in the action table 13a (S38).

When the control unit 10 determines that there is action information not assigned control information (YES in S38), the control unit 10 reads the action information having the highest operation count in the unassigned action information from the action table 13a (S39). The control unit 10 determines whether or not there are plural pieces of read action information (S40). If the control unit 10 determines there are plural pieces of the information (YES in S40), the control unit 10 designates the action information having a higher priority stored in the action table 13a (S41).

The control unit 10 reads from the profile table 23a the control information stored in the area closest to the top of the profile table 23a in the control information which has not been assigned action information in the processes in the control information stored in the profile table 23a (S42). The control unit 10 associates the action information designated in S41 with the control information read in step S42, and stores them in the association map 13b (S43).

The control unit 10 determines whether or not there is action information not (yet) assigned control information in the action information read in step S39 (S44). If it is determined that there is action information not yet assigned control information (YES in S44), the control unit 10 designates the next highest action information in the plural pieces of read action information in step S39 (S45).

The control unit 10 reads the control information stored in the area closest to the top of the profile table 23a in the control information not assigned action information in the control information stored in the profile table 23a (S46). The control unit 10 associates the action information designated in step S45 with the control information read in step S46, and stores them in the association map 13b (S47).

When it is determined in step S40 that there is no plural pieces of read action information (NO in S40), the control unit 10 passes control to step S46, and reads the control information stored in the area closest to the top of the profile table 23a in the control information not yet assigned action information (S46). The control unit 10 associates the action information read in step S39 with the control information read in step S46, and stores them in the association map 13b (S47).

The control unit 10 returns control to step S44, and determines whether or not there is action information not yet assigned control information in the action information read in step S39 (S44). The control unit 10 repeats the processes in steps S44 through S47 until it assigns control information to each of all action information read in step S39. When the control unit 10 determines that there is no action information not yet assigned control information in the action information read in step S39 (NO in S44), then control is returned to step S38.

The control unit 10 determines whether or not there is action information not yet assigned control information in the action information stored in the action table 13a (S38). The control unit 10 repeats the processes insteps S38 through S47 until it assigns control information to each of all action information stored in the action table 13a. When the control unit 10 determines that there is no action information not assigned control information (NO in S38), it generates a notification screen as illustrated in FIG. 7 (S48).

The control unit 10 displays the generated notification screen on the display unit 15 (S49), and reports the association between the action information and the control information stored in the association map 13b. Then, the control unit 10 terminates the process of generating the association map 13b.

As described above, according to the embodiment 3, in a case where the operation count of the action information stored in the action table 13a is the same when the association map 13b is generated, the priority is considered. Therefore, control information can be assigned to the action information having the equal operation count in an appropriate order.

In the control system in which the controller 1 generates the association map 13b in the above-mentioned process, since the process performed when the controller 1 operates as a remote controller of the controlled machine 2 is the same as the process described in the embodiment 1, the detailed description is omitted here.

In the embodiment 3, when plural pieces of action information having the equal operation count are read from the action table 13a, the control information is assigned sequentially from the action information having a higher priority. The present invention is not limited to this configuration, but the control information can be simply assigned sequentially from the action information having a higher priority without considering the operation count. Practically, for example, after storing in the association map 13b the control information similar to the recommended control information stored in the action table 13a associated with the action information corresponding to the recommended control information, the action information read from the action table 13a in a descending order of priority may be associated with the control information sequentially read from the top of the profile table 23a, and may be stored in the association map 13b.

Embodiment 4

Described below is the control system according to the embodiment 4. Since the control system according to the embodiment 4 can be realized by the configuration similar to that of the control system according to the embodiment 1, a similar configuration is assigned the same reference numeral, and the detailed description is omitted here.

In the embodiment 1, the action information corresponding to the recommended control information stored in the action table 13a is associated with the control information similar to the recommended control information, thereby generating the association map 13b. In addition, in the embodiment 1, the action information not assigned the control information in the process is associated with the control information in the descending order of the operation count, thereby generating the association map 13b.

On the other hand, in the embodiment 4, the number of operations (control count) of the controlled machine 2, actually operated by a user with the controller 1, is accumulated in the association map 13b. The action information and the control information on which the execution count is equal to or exceeds a specified value are used as is when the association map 13b is next generated.

The controller 1 according to the embodiment 4 stores in the memory unit 13 an accumulated information table 13c as illustrated in FIG. 20B in addition to similar configuration as the controller 1 according to the embodiment 1 illustrated in FIG. 2. In addition, the association map 13b generated by the controller 1 according to the embodiment 4 is a map as illustrated in FIG. 20A.

FIGS. 20A and 20B are schematic diagrams of the stored contents of the association map 13b and the accumulated information table 13c according to the embodiment 4. As illustrated in FIG. 20A, the action information about the action taken by a user on the controller 1, the control information for control of each function of the controlled machine 2, and the execution count (control count) of the controlled machine 2 performing a function corresponding to the action information are associated with one another and the association is stored in the association map 13b according to the embodiment 4.

That is, the association map 13b according to the embodiment 4 has a configuration in which a column of the execution count is added to the association map 13b of the embodiment 1 in FIG. 6A or 6B. The association map 13b according to the embodiment 4 is generated by the control unit 10 (map generation unit 10c), and when the controlled machine 2 executes a corresponding function by the action indicated by the action information, the controller 1 updates the execution count.

As illustrated in FIG. 20B, the accumulated information table (control count storage unit) 13c stores the action information about the action taken by a user on the controller 1, the control information for control of each function of the controlled machine 2, and the accumulated execution count indicating the accumulation of the execution count by the controlled machine 2 which has performed the corresponding function according to the action information. That is, the accumulated information table 13c has a configuration similar to that of the association map 13b, and has the column of the accumulated execution count instead of the execution count of the association map association map 13b. The stored contents of the accumulated information table 13c is updated by the control unit 10 each time the communication between the controller 1 and the controlled machine 2 is disconnected.

Described below is the function realized by the control unit 10 executing the control program stored in the memory unit 13 in the controller 1 according to the embodiment 4. FIG. 21 is a block diagram of the functional configuration of the controller 1 according to the embodiment 4.

In the controller 1 according to the embodiment 4, the control unit 10 realizes the function of an accumulated information update unit 10i in addition to each function illustrated in FIG. 5. In FIG. 21, the profile table acquisition unit 10b, the map generation unit 10c, and the association notification unit 10d are omitted.

The map generation unit 10c according to the embodiment 4 generates the association map 13b based on the profile table 23a acquired from the controlled machine 2, the action table 13a and the accumulated information table 13c stored in the memory unit 13.

The map generation unit 10c according to the embodiment 4 first determines whether or not there is a combination of action information and control information having a value equal to or exceeding a specified value (for example, three) of accumulated execution count stored in the accumulated information table 13c. When it is determined that there is a combination having a value equal to or exceeding a specified value of accumulated execution count, the map generation unit 10c determines whether or not the action information in the combination is stored in the action table 13a, and whether or not the control information in the combination is stored in the profile table 23a. When it is determined that the action information in the combination is stored in the action table 13a and the control information in the combination is stored in the profile table 23a, then the map generation unit 10c stores the action information and the control information in the combination in the association map 13b. In this case, the map generation unit 10c stores 0 as the execution count corresponding to the combination. Note that when the action information in the combination is not stored in the action table 13a, and/or the control information in the combination is not stored in the profile table 23a, then the map generation unit 10c does not store the information in the association map 13b.

The map generation unit 10c performs the above-mentioned process on all action information and control information having a value equal to or exceeding the specified value of accumulated execution count stored in the accumulated information table 13c, and stores the information in the association map 13b. Next, the map generation unit 10c associates the action information not assigned control information in the process above in the action information stored in the action table 13a with the control information not assigned action information in the process above in the control information stored in the profile table 23a.

The map generation unit 10c compares the recommended control information corresponding to the action information not assigned control information with the control information not assigned action information, and determines whether or not there is any control information similar to the recommended control information. When the map generation unit 10c determines that there is control information similar to any recommended control information, it reads the action information corresponding to the recommended control information from the action table 13a. The map generation unit 10c associates the read action information with the control information determined as similar to the recommended control information, and stores them in the association map 13b. In this case, the map generation unit 10c stores 0 as the execution count corresponding to the combination.

Next, the map generation unit 10c associates the action information not assigned control information in the two above-mentioned processes in the action information stored in the action table 13a with the control information not assigned action information in the two above-mentioned processes in the control information stored in the profile table 23a.

The map generation unit 10c reads the action information not assigned control information in the descending order of operation count from the action table 13a, and sequentially reads the control information not assigned action information from the top of the profile table 23a. The map generation unit 10c associates the action information with the control information in the order in which the information is read and stores them in the association map 13b. In this case, the map generation unit 10c stores 0 as the execution count corresponding to the combination.

By performing the processes above, the map generation unit 10c associates all action information stored in the action table 13a with any control information stored in the profile table 23a, and stores them in the association map 13b. In the processes above, the map generation unit 10c generates the association map 13b as illustrated in FIG. 20A.

As described above, in the embodiment 4, each combination of the action information and the control information having a value equal to or exceeding a specified value of execution count is stored in the association map 13b, thereby allowing the operation performed by a user for the specified count or more to be used again. Therefore, the operability of the user can be improved more efficiently.

The control information confirmation unit 10g according to the embodiment 4 performs similar process as the control information confirmation unit 10g according to the embodiment 1 above, and confirms with the user according to the information reported from the control information decision unit 10f whether or not the action taken by the user on the controller 1 and the process performed by the controlled machine 2 for the action are appropriate.

Upon receipt of the information that the action and the function reported to the user are appropriate, the control information confirmation unit 10g according to the embodiment 4 updates the execution count corresponding to the action information about the reported action and the control information about the reported function. Practically, the control information confirmation unit 10g adds 1 to the execution count stored in the association map 13b corresponding to the action information about the reported action and the control information about the reported function. Then, the control information confirmation unit 10g notifies the control information transmission unit 10h of the control information reported from the control information decision unit 10f. When the control information confirmation unit 10g according to the embodiment 4 receives the information that the action and the function reported to the user are not appropriate, it terminates the process without performing anything.

The communication state detection unit 10a according to the embodiment 4 detects whether or not a communication with the controlled machine 2 has been started when the distance between the controller 1 and the controlled machine 2 becomes shorter than a specified distance, and detects whether or not a communication with the 2 has been disconnected when the distance between the controller 1 and the controlled machine becomes longer than a specified distance. When the communication state detection unit 10a detects that the communication with the controlled machine 2 has been disconnected, it notifies the accumulated information update unit 10i of the information.

When the accumulated information update unit (control count update unit) 10i receives from the communication state detection unit 10a the information that the communication with the controlled machine 2 has been disconnected, it updates the accumulated information table 13c based on the stored contents of the association map 13b. Practically, the accumulated information update unit 10i reads the information about a combination whose execution count is not 0 in each combination of action information, control information, and execution count stored in the association map 13b, and determines whether or not the same information as the read action information and control information is stored in the accumulated information table 13c.

When the accumulated information update unit 10i determines that the same information is stored in the accumulated information table 13c, it adds the execution count read from the association map 13b to the accumulated execution count stored in the accumulated information table 13c associated with the same information, thereby updating the accumulated execution count. On the other hand, when the accumulated information update unit 10i determines that the same information is not stored in the accumulated information table 13c, it stores the action information, control information and execution count read from the association map 13b in the columns of the action information, control information, and accumulated execution count respectively, thereby updating the accumulated information table 13c.

FIG. 22 is a schematic diagram of the stored contents of the accumulated information table 13c. The accumulated information table 13c illustrated in FIG. 22 represents the case in which the stored contents of the accumulated information table 13c illustrated in FIG. 20B are updated based on the stored contents of the association map 13b illustrated in FIG. 20A. In the embodiment 4, the association map 13b is generated using the accumulated information table 13c sequentially updated after the communication with the controlled machine 2 is disconnected. Thus, the action practical taken by a user of the controller 1 on the controller 1 to operate the controlled machine 2 can be entered in the association map 13b.

In the controller 1 according to the embodiment 4, since the communication state detection unit 10a, the profile table acquisition unit 10b, the association notification unit 10d, the action detection unit 10e, the control information decision unit 10f, and the control information transmission unit 10h perform similar processes as the corresponding elements of the embodiment 1, the detailed descriptions are omitted here.

Figure 23:
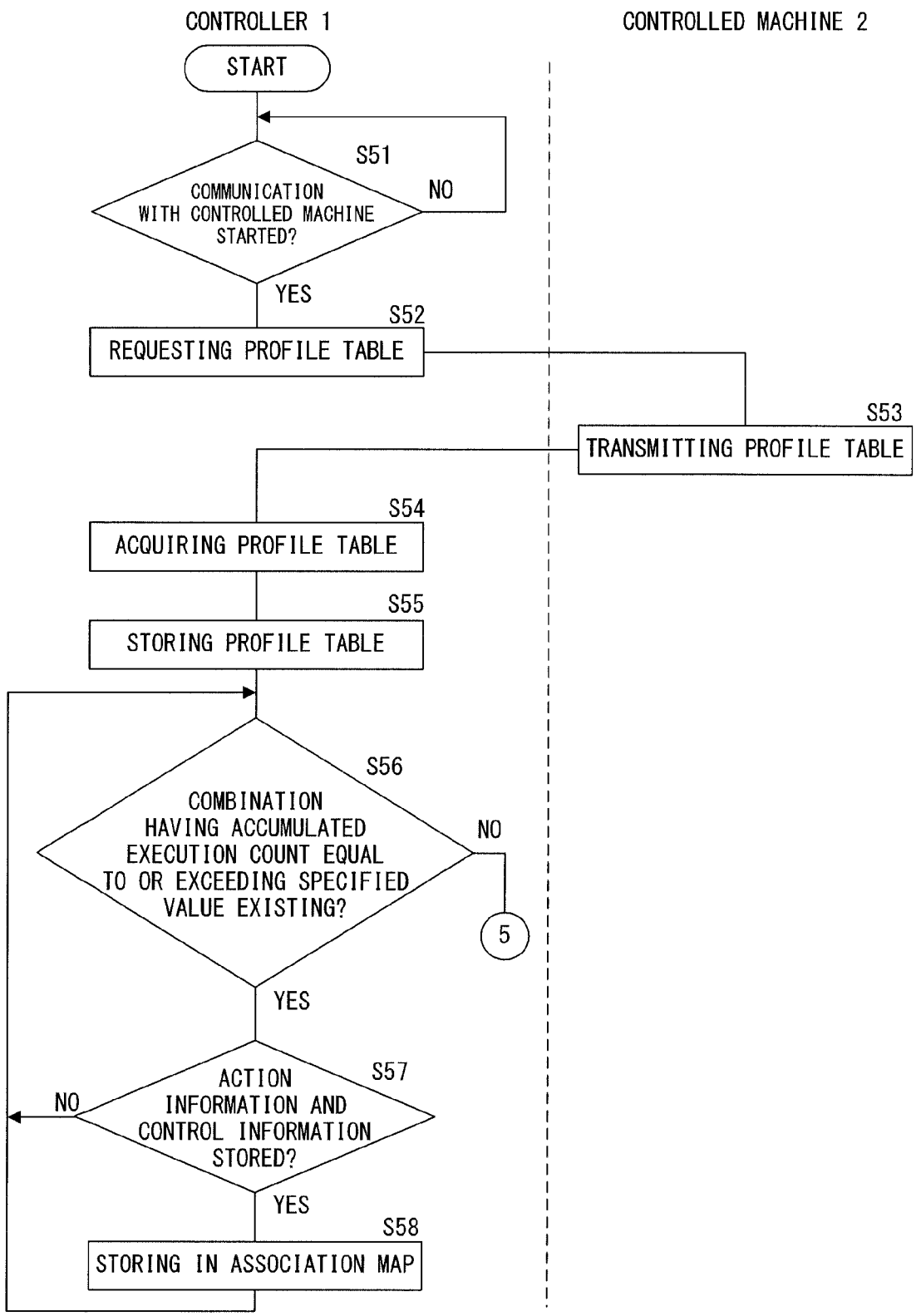
FIG. 23 is a flowchart of the procedure of the process of generating an association map.
Figure 24:
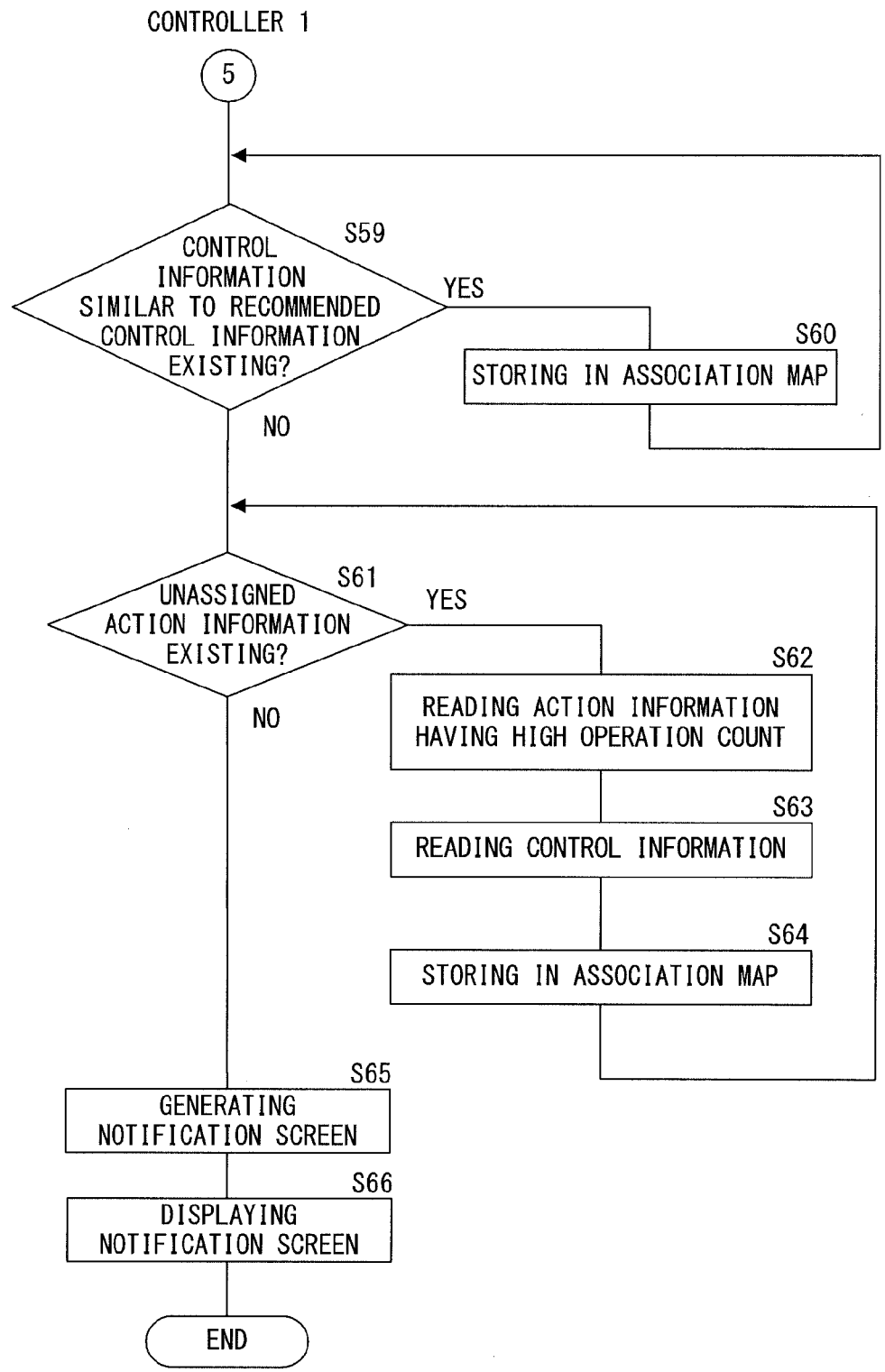
FIG. 24 is a flowchart of the procedure of the process of generating an association map.

The process of the controller 1 generating the association map 13b to control the operation of the controlled machine 2 in the control system according to the embodiment 4 is described below with reference to a flowchart. FIG. 23 and FIG. 24 are flowcharts of the procedure of the process of generating the association map 13b.

The following process is performed by the control unit 10 according to the control program stored in the memory unit 13 of the controller 1, and also performed by the control unit 20 according to the control program stored in the memory unit 23 of the controlled machine 2. FIG. 23 illustrates the process performed by the control unit 10 of the controller 1 in the left area and the process performed by the control unit 20 of the controlled machine 2 in the right area in the two areas sectioned by the broken line.

The control unit 10 of the controller 1 determines whether or not the communication with the controlled machine 2 has been started (S51). When it is determined that the communication has not been started (NO in S51), then the control unit 10 keeps in the standby state until the communication is started. When it is determined that the communication with the controlled machine 2 has been started (YES in S51), then the control unit 10 requests the controlled machine 2 for the profile table 23a (S52). Upon receipt of the request for the profile table 23a from the controller 1 after the communication with the controller 1 has been started, the control unit 20 of the controlled machine 2 reads the profile table 23a stored in the memory unit 23, and transmits it to the controller 1 (S53).

Upon receipt of the profile table 23a from the controlled machine 2 (S54), the control unit 10 of the controller 1 stores the acquired profile table 23a in the memory unit 13 (S55). The control unit 10 generates the association map 13b based on the action table 13a, the accumulated information table 13c, and the profile table 23a stored in the memory 13a. Practically, the control unit 10 determines whether or not there is a combination of action information and control information having a value equal to or exceeding a specified value of accumulated execution count stored in the accumulated information table 13c (S56). When it is determined that there is a combination having a value equal to or exceeding the specified value of accumulated execution count (YES in S56), then the control unit 10 determines whether or not the action information of the combination is stored in the action table 13a, and the control information of the combination is stored in the profile table 23a (S57).

When the control unit 10 determines that the action information of the combination is not stored in the action table 13a, or the control information of the combination is not stored in the profile table 23a (NO in S57), then the control unit 10 returns control to step S56. When it is determined that the action information of the combination is stored in the action table 13a, and the control information of the combination is stored in the profile table 23a (YES in S57), then the control unit 10 stores the action information and the control information of the combination in the association map 13b (S58). The control unit 10 stores 0 as the execution count corresponding to the combination in the association map 13b.

The control unit 10 returns control to step S56, and determines that there is another combination having a value equal to or exceeding the specified value of accumulated execution count (S56). The control unit 10 repeats the processes in steps S56 through S58 until it determines that there is no combination having a value equal to or exceeding the specified value of accumulated execution count. When the control unit 10 determines that there is no other combinations having a value equal to or exceeding the specified value of accumulated execution count (NO in S56), it determines whether or not there is control information similar to any of the recommended control information corresponding to the action information not yet assigned control information in the control information not yet assigned action information (S59).

When the control unit 10 determines that there is control information similar to any of the recommended control information (YES in S59), the control unit 10 associates the action information corresponding to the recommended control information with the control information determined as similar to the recommended control information, and stores them in the association map 13b (S60). The control unit 10 stores 0 as the execution count corresponding to the combination in the association map 13b. The control unit 10 returns control to step S59, and determines whether or not there is another piece of control information similar to any of the recommended control information corresponding to the action information not yet assigned control information (S59).

The control unit 10 repeats the processes in steps S59 and S60 until it determines there is no control information similar to any of the recommended control information. When the control unit 10 determines that there is no control information similar to any of the recommended control information (NO in S59), then it determines whether or not there is action information not yet assigned control information (S61).

When the control unit 10 determines that there is action information not yet assigned control information (YES in S61), it reads from the action table 13a the action information having the highest operation count in the action information not yet assigned (S62). The control unit 10 reads from the profile table 23a the control information stored in the area closest to the top of the profile table 23a in the control information not yet assigned action information (S63).

The control unit 10 associates the action information read in step S62 with the control information read in step S63, and stores them in the association map 13b (S64). The control unit 10 stores 0 as the execution count corresponding to the combination in the association map 13b. The control unit 10 returns control to step S61, and determines whether or not there is action information not yet assigned control information (S61). The control unit 10 repeats the processes in steps S61 through S64 until each of all action information stored in the action table 13a is assigned control information.

When the control unit 10 determines there is no action information not yet assigned control information (NO in S61), it generates a notification screen as illustrated in FIG. 7 (S65). The control unit 10 displays the generated notification screen on the display unit 15 (S66), and reports the association between the action information and the control information stored in the association map 13b. Then, the control unit 10 terminates the process of generating the association map 13b.

Figure 25:
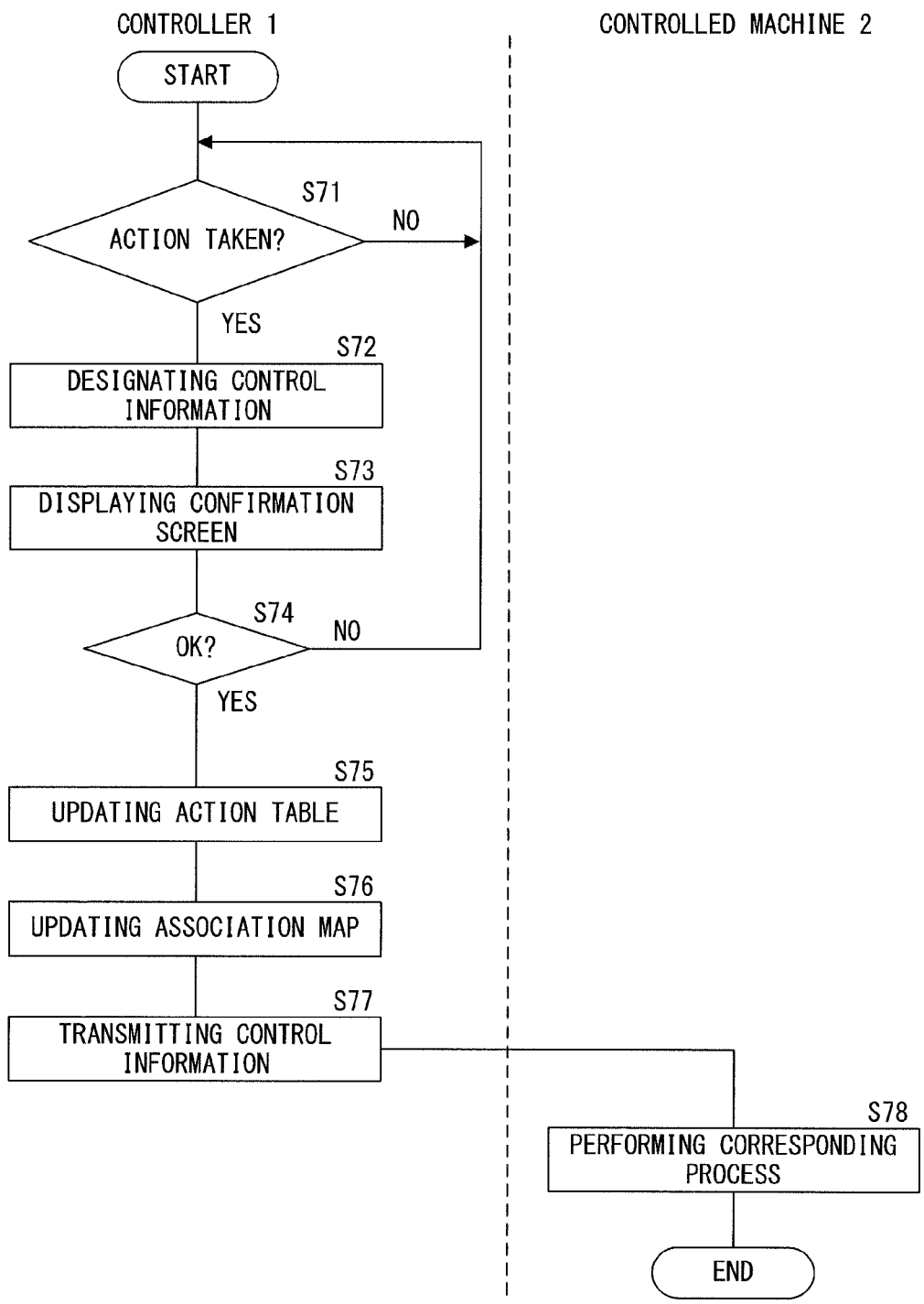
FIG. 25 is a flowchart of the procedure of the process when a controller controls the operation of a controlled machine.

The process of the controller 1 operating as a remote controller of the controlled machine 2 in the control system according to the embodiment 4 is described below with reference to a flowchart. FIG. 25 is a flowchart of the procedure of the process when the controller 1 controls the operation of the controlled machine 2.

The following process is performed by the control unit 10 according to the control program stored in the memory unit 13 of the controller 1, and also performed by the control unit 20 according to the control program stored in the memory unit 23 of the controlled machine 2. FIG. 25 illustrates the process performed by the control unit 10 of the controller 1 in the left area and the process performed by the control unit 20 of the controlled machine 2 in the right area in the two areas sectioned by the broken line.

The control unit 10 of the controller 1 determines according to the output signal from the various sensors 14 whether or not the user has taken on the controller 1 any action indicated by the action information stored in the action table 13a (S71). When it is determined that no action has been taken (NO in S71), the control unit 10 enters a standby state. When it is determined that any action has been taken (YES in S71), the control unit 10 reads the action information indicating the action whose performance has been detected from the action table 13a, and designates the control information corresponding to the read action information from the association map 13b (S72).

The control unit 10 generates a confirmation screen for confirmation as to whether or not the action whose performance has been detected in step S71 and the process of the controlled machine 2 indicated by the control information designated in step S72 are appropriate, and displays the screen on the display unit 15 (S73). The control unit 10 determines whether or not the OK button has been operated through the confirmation screen (S74). When it is determined that the OK button has not been operated (NO in S74), that is, when the cancel button is operated, control is returned to step S71.

When the control unit 10 determines through the confirmation screen that the OK button has been operated (YES in S74), it updates the action table 13a (S75). Practically, the control unit 10 adds 1 to the operation count stored in the action table 13a corresponding to the action information about the action whose performance has been detected. Then, the control unit 10 updates the association map 13b (S76). Practically, the control unit 10 adds 1 to the execution count corresponding to the action information about the action whose execution has been detected in step S71 and the control information designated in step S72.

The control unit 10 transmits the control information designated in step S72 to the controlled machine 2 (S77). When the control unit 20 of the controlled machine 2 acquires the control information from the controller 1, the control unit 20 performs the process corresponding to the acquired control information (S78). Thus, the process performed when the controller 1 operates as a remote controller of the controlled machine 2 terminates.

Figure 26:
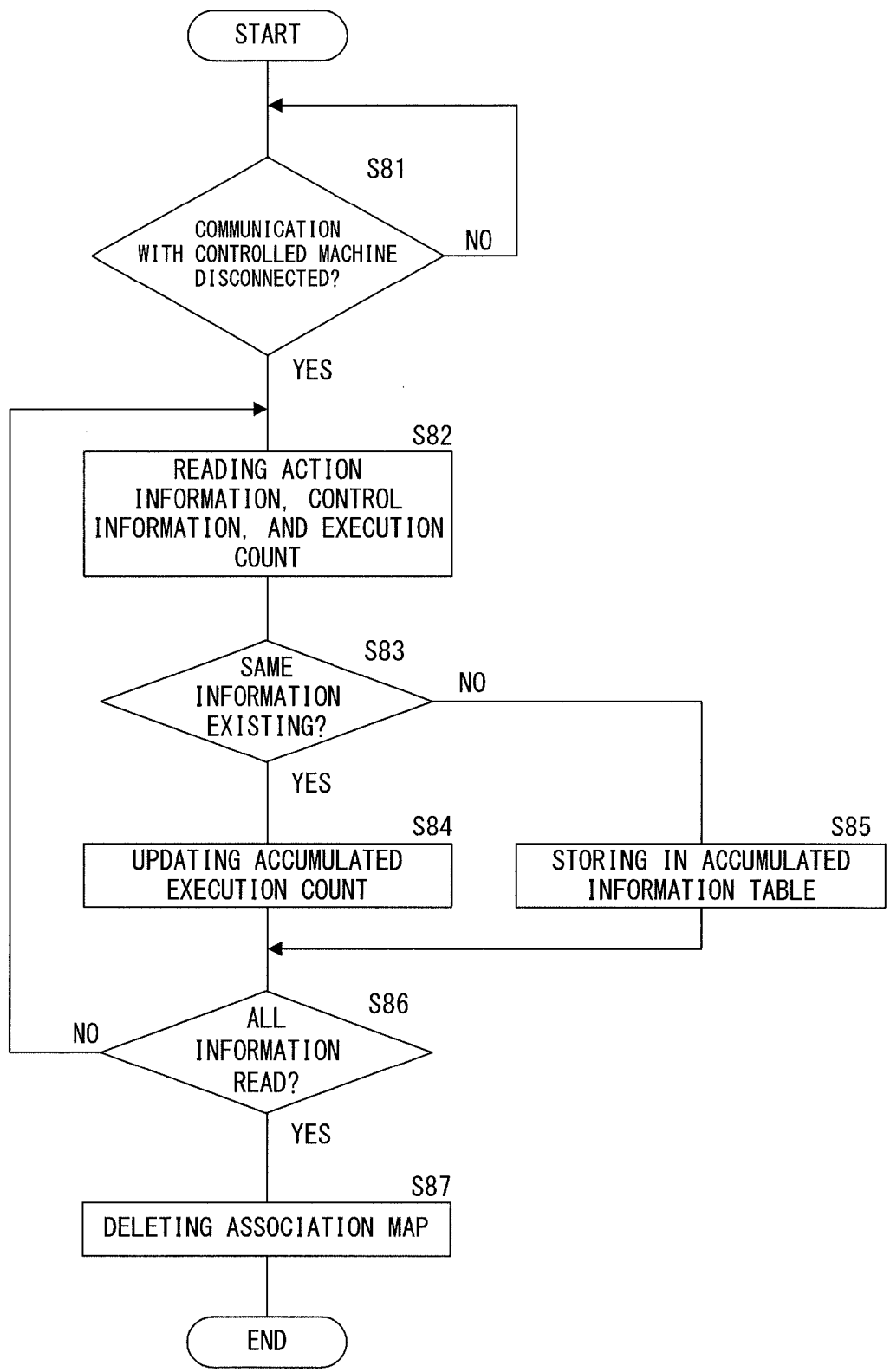
FIG. 26 is a flowchart of the procedure of the process of a controller updating an accumulated information table.

The process of updating the accumulated information table 13c performed by the controller 1 when the distance between the controller 1 and the controlled machine 2 becomes longer than a specified distance in the control system according to the embodiment 4 is described below with reference to a flowchart. FIG. 26 is a flowchart of the procedure of the process of the controller 1 updating the accumulated information table 13c. The following process is executed by the control unit 10 according to the control program stored in the memory unit 13 of the controller 1.

The control unit 10 of the controller 1 determines whether or not the communication with the controlled machine 2 has been disconnected (S81). When it is determined that the communication has not been disconnected (NO in S81), another process is performed, and control enters the standby state. When it is determined that the communication with the controlled machine 2 has been disconnected (YES in S81), the control unit 10 reads the information about the combination having the execution count other than 0 in each combination of the action information, the control information, and the execution count stored in the association map 13b (S82). The control unit 10 determines whether or not the same information as the read action information and control information is stored in the accumulated information table 13c (S83).

When the control unit 10 determines that the same information is stored in the accumulated information table 13c (YES in S83), it adds the execution count read from the association map 13b to the accumulated execution count associated with the same information and stored in the accumulated information table 13c, and updates the accumulated execution count (S84). When the control unit 10 determines that the same information is not stored in the accumulated information table 13c (NO in S83), it associates the action information, the control information, and the execution count read from the association map 13b, and stores them in the accumulated information table 13c (S85).

The control unit 10 determines whether or not all information about the combination having the execution count other than 0 in each combination of the action information, the control information, and the execution count stored in the association map 13b has been read (S86). When it is determined that all information has not been read, (NO in S86), then the control unit 10 returns control to step S82, and reads from the association map 13b the information about other combinations having the execution count other than 0 (S82). The control unit 10 repeats the processes in steps S82 through S86 until it reads all information about the combinations having the execution count other than 0.

When the control unit 10 determines that the information about all combinations having the execution count other than 0 (YES in S86), then it deletes the association map 13b from the memory unit 13 (S87), and terminates the process of updating the accumulated information table 13c. The controller 1 can also be configured so that the association map 13b generated by the controller 1 is associated with the equipment profile and the information about the equipment name acquired by the controller 1 from the controlled machine 2, and stored in the memory unit 13. With the controller 1 storing in the memory unit 13 the association map 13b as associated with the equipment profile, the control unit 10 can perform an initializing process in which the execution count stored in the association map 13b is initialized to 1 instead of deleting the association map 13b from the memory unit 13. With the controller 1 storing in the memory unit 13 the association map 13b as associated with the equipment name, the control unit 10 can perform an initializing process in which the execution count stored in the association map 13b is initialized to 0 instead of deleting the association map 13b from the memory unit 13.

As described above, in the embodiment 4, the action information about an action taken by a user to operate the controlled machine 2 for a specified number of times or more on the controller 1 and the control information about the process of the controlled machine 2 are registered also in the newly generated association map 13b. Thus, the operation of the controlled machine 2 can be controlled by the action which the user is used to operating, thereby more efficiently improving the operability of the user.

In the embodiment 4, the process of generating the accumulated information table 13c for the controlled machine 2 as a printer is described. Therefore, the accumulated information table 13c is generated for each equipment profile of the controlled machine 2, and stored in the memory unit 13 for each equipment profile. However, for example, by providing a column for storing an equipment profile in the accumulated information table 13c, the contents of the accumulated information table 13c generated for a plurality of controlled machines 2 can be stored in one accumulated information table 13c.

The embodiment 4 is described as a variation example of the embodiment 1, but the configuration of the embodiment 4 may also be applied to the embodiments 2 and 3.

Embodiment 5

Described below is the control system according to the embodiment 5. Since the control system according to the embodiment 5 can be realized by the configuration similar to that of the control system according to the embodiment 4, a similar configuration is assigned the same reference numeral, and the detailed description is omitted here.

In the embodiment 4, the association map 13b accumulates the number of times (execution count) of the operation of the controlled machine 2 performed by a user practically operating the controller 1. Also in the embodiment 4, the association between the action information and the control information having a value equal to or exceeding a specified value of execution count is used as is when the association map 13b is next generated.

On the other hand, in the embodiment 5, the association map 13b accumulates the number of times (execution count) of the operation of the controlled machine 2 performed by a user practically operating the controller 1 for each execution time period. Then, the association between the action information and the control information having a value equal to or exceeding a specified value of execution count in time period in which the association map 13b is generated, when the association map 13b is generated is used as is then the association map 13b is next generated.

In the controller 1 according to the embodiment 5, the accumulated information table 13c stored in the memory unit 13 is a table as illustrated in FIG. 27B. The association map 13b generated by the controller 1 according to the embodiment 5 is a map as illustrated in FIG. 27A.

FIGS. 27A and 27B are schematic diagrams of the stored contents of the association map 13b and the accumulated information table 13c according to the embodiment 5.

As illustrated in FIG. 27A, the association map 13b according to the embodiment 5 stores the association among the action information about the action taken by a user on the controller 1, the control information for control of each function of the controlled machine 2, the execution time period in which a corresponding function is performed according to the action information, and the execution count in the execution time period. The association map 13b according to the embodiment 5 is generated by the control unit 10 (map generation unit 10c), and the control unit 10 updates the execution time period and the execution count when the controlled machine 2 performs a corresponding function by the action indicated by any action information.

As illustrated in FIG. 27B, the accumulated information table 13c according to the embodiment 5 stores the association among the action information about the action taken by a user on the controller 1, the control information for control of each function of the controlled machine 2, the execution time period in which a corresponding function is performed according to the action information, and the accumulated execution count about the accumulation of the execution count in the execution time period. The execution time period stored in the association map 13b and the accumulated information table 13c is, for example, a time period in the morning (AM), a time period (PM1) from noon to five in the afternoon, and a time period (PM2) after five in the afternoon. However, the execution time period is not limited to these time periods, but can be a time period in an hour unit and a time period in some hour units.

Described below is the function realized by the control unit 10 executing the control program stored in the memory unit 13 in the controller 1 according to the embodiment 5. In the controller 1 according to the embodiment 5, the control unit 10 realizes the function similar to that of the controller 1 according to the embodiment 4 illustrated in FIGS. 5 and 21.

The map generation unit 10c according to the embodiment 5 generates the association map 13b based on the profile table 23a acquired from the controlled machine 2, and the action table 13a and the accumulated information table 13c stored in the memory unit 13.

The map generation unit (generated time period decision unit) 10c according to the embodiment 5 first determines the time period including the current time from among AM, PM1, and PM2 based on the current time indicated by a clock. The map generation unit 10c determines whether or not there is a combination of action information and control information having a value equal to or exceeding a specified value (for example, three) of accumulated execution count stored in the accumulated information table 13c corresponding to the same execution time period as the determined time period. When it is determined that there is a combination having a value equal to or exceeding the specified value of accumulated execution count, the map generation unit 10c determines whether or not the action information in the combination is stored in the action table 13a, and whether or not the control information in the combination is stored in the profile table 23a.

When the map generation unit 10c determines that the action information in the combination is stored in the action table 13a and the control information in the combination is stored in the profile table 23a, the map generation unit 10c stores in the association map 13b the action information and the control information in the combination. In this case, the map generation unit 10c stores 0 as the execution count corresponding to the combination, and stores no data as the execution time period. When the action information in the combination is not stored in the action table 13a, and/or the control information in the combination is not stored in the profile table 23a, then the map generation unit 10c does not store data in the association map 13b.

The map generation unit 10c performs the above-mentioned process on all action information and control information having a value equal to or exceeding a specified value of accumulated execution count stored in the accumulated information table 13c corresponding to the same execution time period as the determined time period, and stores the information in the association map 13b. Next, the map generation unit 10c associates the action information not assigned control information in the process above in all action information stored in the action table 13a with the control information not assigned action information in the process above in all control information stored in the profile table 23a.

The map generation unit 10c compares the recommended control information corresponding to the action information not assigned control information with the control information not assigned action information, and determines whether or not there is control information similar to any recommended control information. When the map generation unit 10c determines that there is control information similar to the any recommended control information, it reads the action information corresponding to the recommended control information from the action table 13a. The map generation unit 10c associates the read action information with the control information determined as similar to the recommended control information and stores them in the association map 13b. The map generation unit 10c stores 0 as the execution count corresponding to the action information and the control information, and stores no data as the execution time period.

Next, the map generation unit 10c associates the action information not associated control information in the two above-mentioned processes in all action information stored in the action table 13a with the control information not assigned action information in the two above-mentioned processes in all control information stored in the profile table 23a.

The map generation unit 10c reads the action information not assigned control information from the action table 13a in the descending order of operation count, and the control information not assigned action information in order from the top of the profile table 23a. The map generation unit 10c associates the action information with the control information in the order in which the information is read, and then stores them in the association map 13b. In this case, the map generation unit 10c stores 0 as the execution count corresponding to the action information and the control information, but stores no data as the execution time period.

By performing the above-mentioned process, the map generation unit 10c associates all action information stored in the action table 13a with any control information stored in the profile table 23a, and stores them in the association map 13b. By performing these processes, the map generation unit 10c generates the association map 13b as illustrated in FIG. 27A.

As described above, in the embodiment 5, the action information and the control information having a value equal to or exceeding a specified value of execution in the same time period as the time period in which the association map 13b is generated are associated with each other and stored in the association map 13b. Thus, the controlled machine 2 can be controlled by the action easily taken by a user in each time period in which the controlled machine 2 is operated using the controller 1. When a user tends to perform each function of the controlled machine 2 by a different action for each time period, the operability of the user can be efficiently improved in each time period.

The control information confirmation unit 10g according to the embodiment 5 performs similar process as the control information confirmation unit 10g according to the embodiment 1, and confirms with the user according to the information reported from the control information decision unit 10f whether or not the action taken by the user on the controller 1 and the process performed by the controlled machine 2 in response to the action are appropriate.

The control information confirmation unit 10g according to the embodiment 5 updates the association map 13b when it receives the information that the action and the function reported to the user are appropriate. Practically, the control information confirmation unit (control time period decision unit) 10g determines the time period including the current time based on the current time indicated at this time point by a clock. The control information confirmation unit 10g determines whether or not the execution time period associated with the action information about the notified action and the control information indicating the notified function and stored in the association map 13b is a determined time period.

If the corresponding execution time period is the determined time period, then the control information confirmation unit 10g adds 1 to the corresponding execution count. If the corresponding execution time period is not the determined time period, the control information confirmation unit 10g stores in the association map 13b the determined time period as a execution time period corresponding to the action information about the notified action and the control information indicating the notified function, and stores 1 as a corresponding execution count in the association map 13b.

The control information confirmation unit 10g notifies the control information transmission unit 10h of the control information notified from the control information decision unit 10f. Upon receipt of the information that the action and the function reported to the user are not appropriate, the control information confirmation unit 10g according to the embodiment 5 also terminates the process without performing any process.

Upon receipt of the notification from the communication state detection unit 10a that the communication with the controlled machine 2 has been disconnected, the accumulated information update unit 10i updates the accumulated information table 13c based on the stored contents of the association map 13b. Practically, the accumulated information update unit 10i reads each combination of the action information, control information, execution time period, and execution count stored in the association map 13b and having an execution count other than 0. When the same information as the read action information, control information, and execution time period is stored in the accumulated information table 13c, the accumulated information update unit 10i adds the execution count read from the association map 13b to the accumulated execution count stored in the accumulated information table 13c as associated with the same information, and updates the accumulated execution count.

On the other hand, if the accumulated information update unit 10i determines that the same information is not stored in the accumulated information table 13c, it stores the action information, control information, execution time period, and execution count read from the association map 13b in the columns of the action information, control information, execution time period, and accumulated execution count respectively in the accumulated information table 13*c*, and updates the accumulated information table 13*c*.

In the controller 1 according to the embodiment 5, since the communication state detection unit 10*a*, the profile table acquisition unit 10*b*, the association notification unit 10*d*, the action detection unit 10*e*, the control information decision unit 10*f*, and the control information transmission unit 10*h* perform similar processes as the respective components according to the embodiments 1 and 4 above, the detailed descriptions are omitted here.

Figure 28:
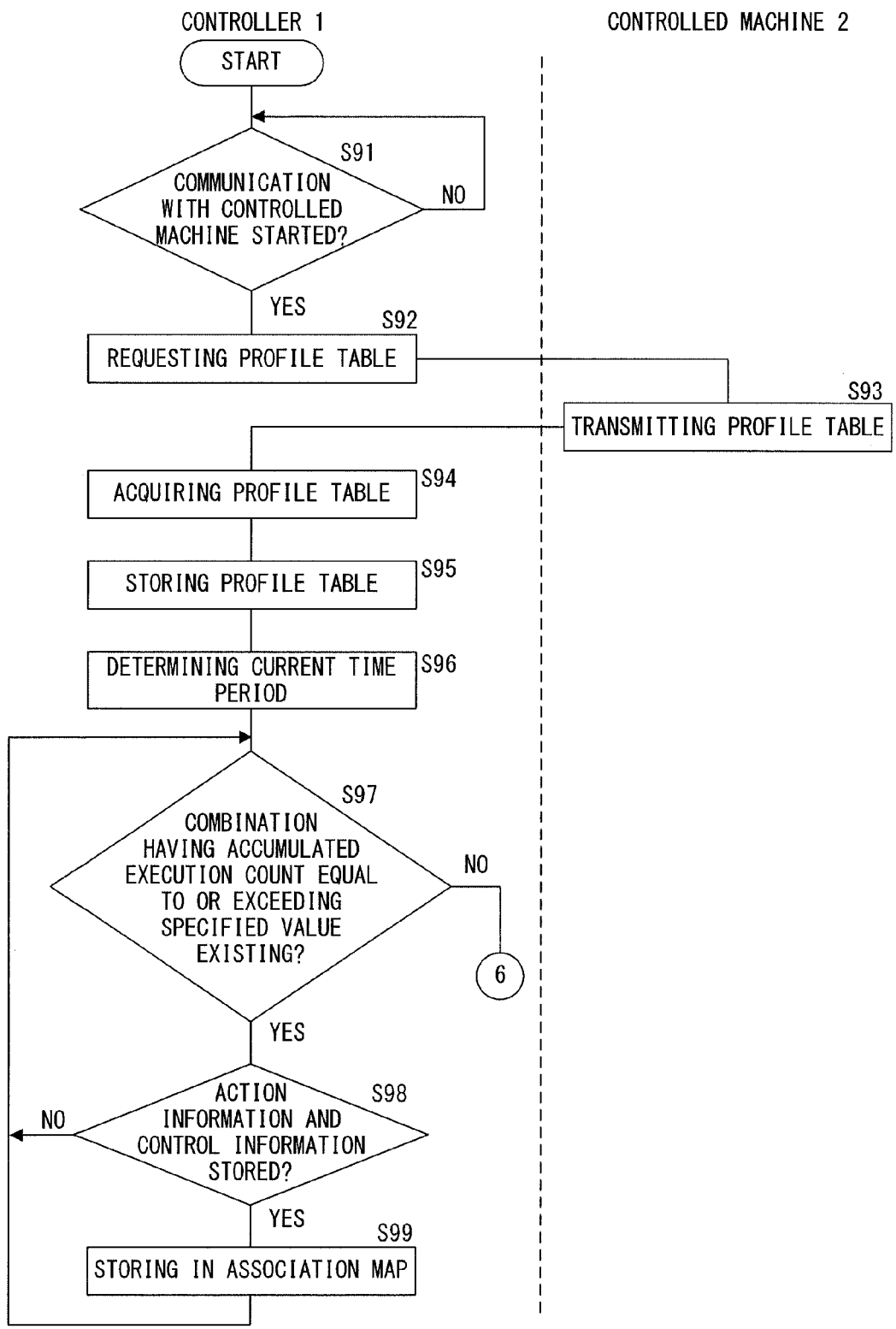
FIG. 28 is a flowchart of the procedure of the process of generating an association map.
Figure 29:
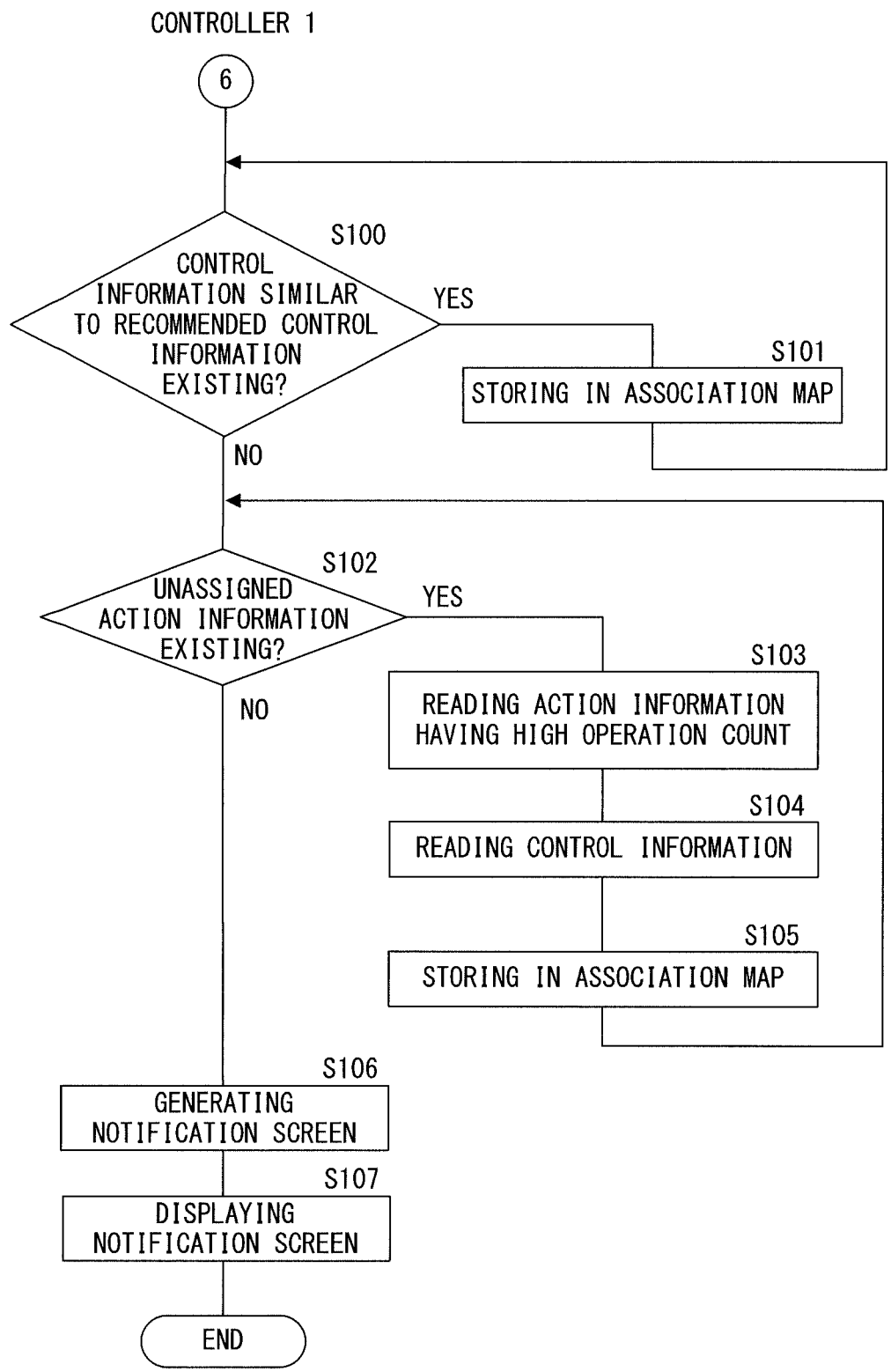
FIG. 29 is a flowchart of the procedure of the process of generating an association map.

The process of the controller 1 generating the association map 13*b* to control the operation of the controlled machine 2 in the control system according to the embodiment 5 is described below with reference to a flowchart. FIG. 28 and FIG. 29 are flowcharts of the procedure of the process of generating the association map 13*b*.

The following process is performed by the control unit 10 according to the control program stored in the memory unit 13 of the controller 1, and also performed by the control unit 20 according to the control program stored in the memory unit 23 of the controlled machine 2. FIG. 28 illustrates the process performed by the control unit 10 of the controller 1 in the left area and the process performed by the control unit 20 of the controlled machine 2 in the right area in the two areas sectioned by the broken line.

The control unit 10 of the controller 1 determines whether or not the communication with the controlled machine 2 has been started (S91). When it is determined that the communication has not been started (NO in S91), then the control unit 10 keeps in the standby state until the communication is started. When it is determined that the communication with the controlled machine 2 has been started (YES in S91), then the control unit 10 requests the controlled machine 2 for the profile table 23*a* (S92). Upon receipt of the request for the profile table 23*a* from the controller 1 after the communication with the controller 1 has been started, the control unit 20 of the controlled machine 2 reads the profile table 23*a* stored in the memory unit 23, and transmits it to the controller 1 (S93).

Upon receipt of the profile table 23*a* from the controlled machine 2 (S94), the control unit 10 of the controller 1 stores the acquired profile table 23*a* in the memory unit 13 (S95). The control unit 10 generates the association map 13*b* based on the action table 13*a*, the accumulated information table 13*c*, and the profile table 23*a* stored in the memory unit 13. The control unit 10 determines the current time period based on the current time indicated by a clock (S96). The control unit 10 determines whether or not there is a combination of action information, control information, and execution time period having a value equal to or exceeding a specified value of accumulated execution count stored in the accumulated information table 13*c* corresponding to the same execution time period as the determined time period (S97).

When it is determined that there is a combination having accumulated execution count equal to or exceeding the specified value (YES in S97), then the control unit 10 determines whether or not the action information of the combination is stored in the action table 13*a*, and the control information of the combination is stored in the profile table 23*a* (S98). When the control unit 10 determines that the action information of the combination is not stored in the action table 13*a*, and/or the control information of the combination is not stored in the profile table 23*a* (NO in S98), then the control unit 10 returns control to step S97.

When it is determined that the action information of the combination is stored in the action table 13*a*, and the control information of the combination is stored in the profile table 23*a* (YES in S98), then the control unit 10 stores the action information and the control information of the combination in the association map 13*b* (S99). The control unit 10 stores 0 as the execution count corresponding to the combination in the association map 13*b*, and stores no data in the corresponding execution time period. The control unit 10 returns control to step S97, and determines that there is another combination having accumulated execution count equal to or exceeding the specified value (S97). The control unit 10 repeats the processes in steps S97 through S99 until it determines that there is no combination having accumulated execution count equal to or exceeding the specified value. When the control unit 10 determines that there is no other combinations having accumulated execution count equal to or exceeding the specified value (NO in S97), it determines whether or not there is control information similar to any of the recommended control information corresponding to the action information not yet assigned control information in the control information not yet assigned action information (S100).

When the control unit 10 determines that there is control information similar to any of the recommended control information (YES in S100), the control unit 10 associates the action information corresponding to the recommended control information with the control information determined as similar to the recommended control information, and stores them in the association map 13*b* (S101). The control unit 10 stores 0 as the execution count corresponding to the combination in the association map 13*b*, and stores no data as the corresponding execution time period. The control unit 10 returns control to step S100, and determines whether or not there is another piece of control information similar to any of the recommended control information corresponding to the action information not yet assigned control information (S100).

The control unit 10 repeats the processes in steps S100 and S101 until it determines there is no control information similar to any of the recommended control information. When the control unit 10 determines that there is no control information similar to any of the recommended control information (NO in S100), then it determines whether or not there is action information not yet assigned control information (S102). When the control unit 10 determines that there is action information not yet assigned control information (YES in S102), the control unit 10 reads from the action table 13*a* the action information having the highest operation count in the action information not yet assigned (S103). The control unit 10 reads from the profile table 23*a* the control information stored in the area closest to the top of the profile table 23*a* in the control information not yet assigned action information (S104).

The control unit 10 associates the action information read in step S103 with the control information read in step S104, and stores them in the association map 13*b* (S105). The control unit 10 stores 0 as the execution count corresponding to the combination in the association map 13*b*, and stores no data as the execution time period. The control unit 10 returns control to step S102, and determines whether or not there is action information not yet assigned control information (S102). The control unit 10 repeats the processes in steps S102 through S105 until each of all action information stored in the action table 13*a* is assigned control information.

When the control unit 10 determines there is no action information not yet assigned control information (NO in S102), it generates a notification screen as illustrated in FIG. 7 (S106). The control unit 10 displays the generated notification screen on the display unit 15 (S107), and reports the association between the action information and the control information stored in the association map 13b. Then, the control unit 10 terminates the process of generating the association map 13b.

The process of the controller 1 operating as a remote controller of the controlled machine 2 in the control system according to the embodiment 5 is described below with reference to a flowchart. FIG. 30 is a flowchart of the procedure of the process when the controller 1 controls the operation of the controlled machine 2.

The following process is performed by the control unit 10 according to the control program stored in the memory unit 13 of the controller 1, and also performed by the control unit 20 according to the control program stored in the memory unit 23 of the controlled machine 2. FIG. 30 illustrates the process performed by the control unit 10 of the controller 1 in the left area and the process performed by the control unit 20 of the controlled machine 2 in the right area in the two areas sectioned by the broken line.

The control unit 10 of the controller 1 determines according to the output signal from the various sensors 14 whether or not the user has taken on the controller 1 any action indicated by the action information stored in the action table 13a (S111). When it is determined that no action has been taken (NO in S111), the control unit 10 enters a standby state. When it is determined that any action has been taken (YES in S111), the control unit 10 reads the action information indicating the action whose performance has been detected from the action table 13a, and designates the control information corresponding to the read action information from the association map 13b (S112).

The control unit 10 generates a confirmation screen for confirmation as to whether or not the action whose performance has been detected in step S111 and the process of the controlled machine 2 indicated by the control information designated in step S112 are appropriate, and displays the screen on the display unit 15 (S113). The control unit 10 determines whether or not the OK button has been operated through the confirmation screen (S114). When it is determined that the OK button has not been operated (NO in S114), that is, when the cancel button is operated, control is returned to step S111.

When the control unit 10 determines through the confirmation screen that the OK button has been operated (YES in S114), the control unit 10 adds 1 to the operation count stored in the action table 13a corresponding to the action information about the action whose performance has been detected, and updates the action table 13a (S115). The control unit 10 determines the current time period based on the current time indicated by a clock (S116). The control unit 10 adds 1 to the execution count corresponding to the action information about the action whose execution has been detected in step S111, the control information designated in step S112, and the same execution time period as the time period determined in step S116, and updates the association map 13b (S117).

When the same execution time period as the time period determined in step S116 is not stored in the association map 13b corresponding to the action information about the action whose performance has been detected in step S111 and the control information designated in step S112, the control unit 10 stores the time period determined in step S116 as the execution time period corresponding to the action information and the control information, and stores 1 as the corresponding to execution count.

The control unit 10 transmits the control information designated in step S112 to the controlled machine 2 (S118). When the control unit 20 of the controlled machine 2 acquires the control information from the controller 1, the control unit 20 performs the process corresponding to the acquired control information (S119). Thus, the process performed when the controller 1 operates as a remote controller of the controlled machine 2 terminates.

Figure 31:
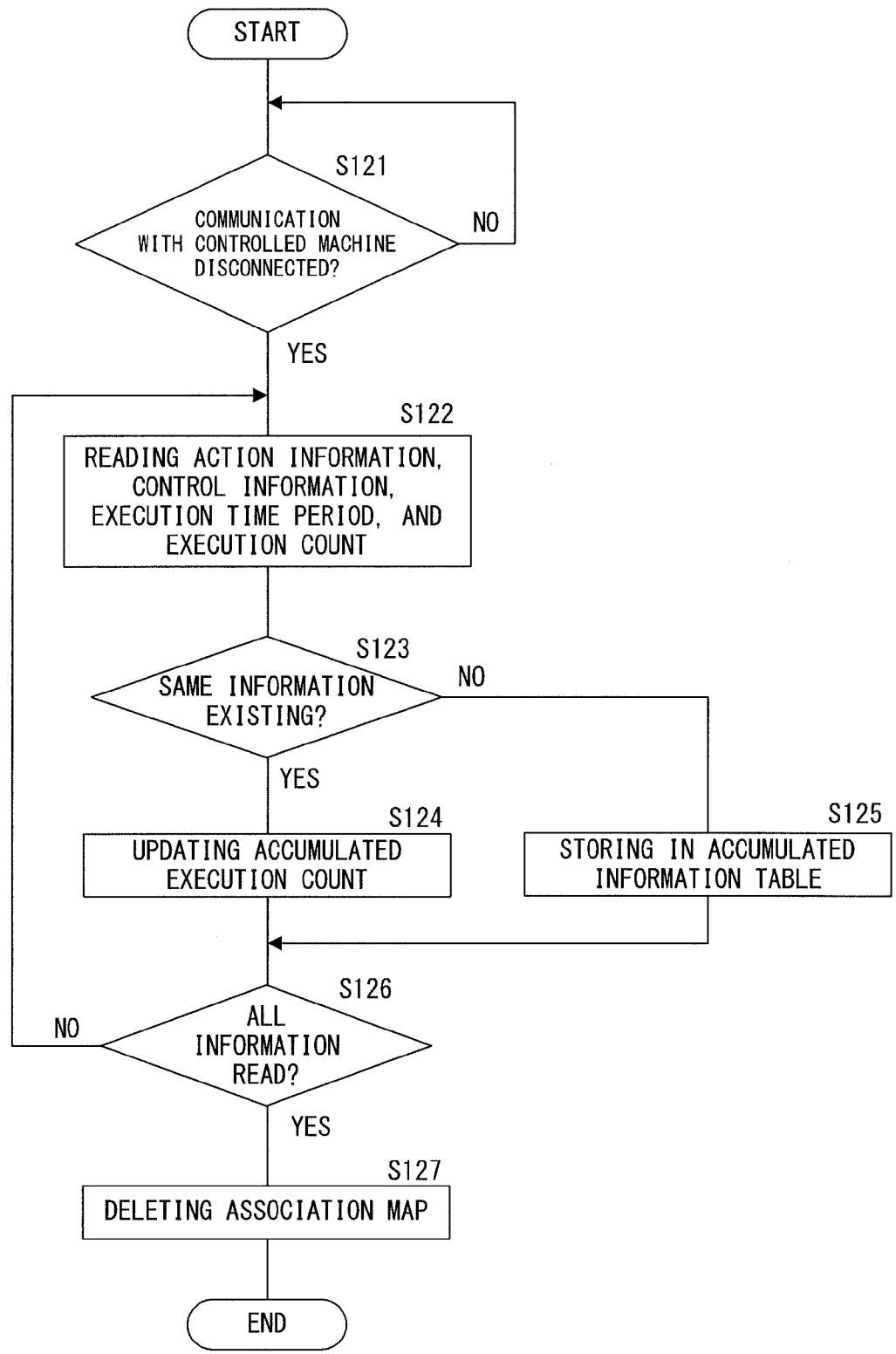
FIG. 31 is a flowchart of the procedure of the process of a controller updating an accumulated information table.

The process of updating the accumulated information table 13c performed by the controller 1 when the distance between the controller 1 and the controlled machine 2 becomes longer than a specified distance in the control system is described below with reference to a flowchart. FIG. 31 is a flowchart of the procedure of the process of the controller 1 updating the accumulated information table 13c. The following process is executed by the control unit 10 according to the control program stored in the memory unit 13 of the controller 1.

The control unit 10 of the controller 1 determines whether or not the communication with the controlled machine 2 has been disconnected (S121). When it is determined that the communication has not been disconnected (NO in S121), another process is performed, and control enters the standby state. When it is determined that the communication with the controlled machine 2 has been disconnected (YES in S121), the control unit 10 reads the information about the combination having the execution count other than 0 in each combination of the action information, the control information, the execution time period, and the execution count stored in the association map 13b (S122). The control unit 10 determines whether or not the same information as the read action information, the control information, and the execution time period is stored in the accumulated information table 13c (S123).

When the control unit 10 determines that the same information is stored in the accumulated information table 13c (YES in S123), the control unit 10 adds the execution count read from the association map 13b to the accumulated execution count associated with the same information and stored in the accumulated information table 13c, and updates the accumulated execution count (S124). When the control unit 10 determines that the same information is not stored in the accumulated information table 13c (NO in S123), the control unit 10 associates the action information, the control information, the execution time period, and the execution count read from the association map 13b, and stores them in the accumulated information table 13c (S125).

The control unit 10 determines whether or not all information about the combination having the execution count other than 0 in each combination of the action information, the control information, the execution time period, and the execution count stored in the association map 13b has been read (S126). When it is determined that all information has not been read, (NO in S126), then the control unit 10 returns control to step S122, and reads from the association map 13b the information about other combinations having the execution count other than 0 (S122). The control unit 10 repeats the processes in steps S122 through S126 until it reads all information about the combinations having the execution count other than 0.

When the control unit 10 determines that the information about all combinations having the execution count other than 0 (YES in S126), then it deletes the association map 13b from the memory unit 13 (S127), and terminates the process of updating the accumulated information table 13c.

As described above, in the embodiment 5, the action information about the action taken by the user at a specified count or more on the controller 1 to control the controlled machine 2 in each time period and the control information about the process of the controlled machine 2 are also entered in the newly generated association map 13b. Thus, the association map 13b depending on the frequency at which the user operates the controlled machine 2 using the controller 1 in each time period can be generated. Therefore, since the operation of the controlled machine 2 can be controlled by the action taken at a high execution frequency in each time period, the operability of the user can be more efficiently improved.

Embodiment 6

Described below is the control system according to the embodiment 6. Since the control system according to the embodiment 6 can be realized by the configuration similar to that of the control system according to the embodiment 5, a similar configuration is assigned the same reference numeral, and the detailed description is omitted here.

In the embodiment 5, the number of times (execution count) of the operations of the controlled machine 2 is accumulated for each execution time period by the user practically operating the controller 1. On the other hand, in the embodiment 6, the number of times (execution count) of the operations of the controlled machine 2 practically performed by a user operating the controller 1 for each execution place.

The controller 1 according to the embodiment 6 is provided with a position detection unit (not illustrated in the attached drawings) for detecting the current position. The position detection unit detects the current position of the controller 1 using, for example, a GPS (global positioning system) according to the radio waves (GPS signal) transmitted from a plurality of GPS satellites. The detected current position is acquired as position information including the data of the longitude, the latitude, and the height above sea level.

In the controller 1 according to the embodiment 6, the memory unit 13 stores the information about the places (home, office, etc.) in which a user can use the controller 1 associated with the position information specifying each place. Therefore, the control unit 10 of the controller 1 can determine the place stored in the memory unit 13 according to the acquired position information when the position detection unit detects the current position.

In the controller 1 according to the embodiment 6, the accumulated information table 13c stored in the memory unit 13 is a table as illustrated in FIG. 32B. The association map 13b generated by the controller 1 according to the embodiment 6 is a map as illustrated in FIG. 32A.

FIGS. 32A and 32B are schematic diagrams of the stored contents of the association map 13b and the accumulated information table 13c according to the embodiment 6.

As illustrated in FIG. 32A, the association map 13b according to the embodiment 6 stores the association among the action information about the action taken by a user on the controller 1, the control information for control of each function of the controlled machine 2, the execution place in which a corresponding function is performed according to the action information, and the execution count in the execution place. The association map 13b according to the embodiment 6 is generated by the control unit 10 (map generation unit 10c), and the control unit 10 updates the execution place and the execution count when the controlled machine 2 performs a corresponding function by the action indicated by any action information.

As illustrated in FIG. 32B, the accumulated information table 13c according to the embodiment 6 stores the association among the action information about the action taken by a user on the controller 1, the control information for control of each function of the controlled machine 2, the execution place (control position) in which a corresponding function is performed according to the action information, and the accumulated execution count about the accumulation of the execution count in the execution place.

The execution place stored in the association map 13b and the accumulated information table 13c is the information about any of the places stored in the memory unit 13 in advance corresponding to the position detected by the position detection unit of the controller 1. However, the execution place is not limited to the information. For example, the position information acquired by the position detection unit can be used without modulation.

In the control system according to the embodiment 6, the process for generating the association map 13b to control the operation of the controlled machine 2 by the controller 1, the process performed when the controller 1 operates as a remote controller of the controlled machine 2, the process of the controller 1 updating the accumulated information table 13c, etc. are similar to the processes described in the embodiments 1 through 5. Therefore, the detailed descriptions are omitted here. The controller 1 according to the embodiment 6 uses the information about the execution place instead of the information about the execution time period processed by the controller 1 according to the embodiment 5.

The embodiment 6 is described as a variation example of the embodiment 5, but can also be configured as a combination with the embodiment 5. In this case, the controller 1 manages the execution count of the controlled machine 2 by a user practically operating the controller 1 for each execution time period and execution place. Then, since the controller 1 can generate the association map 13b based on the time period and the place when the association map 13b is generated, the association map 13b can be generated with the time period and the execution place taken into account when the user operates the controlled machine 2.

Embodiment 7

Described below is the control system according to the embodiment 7. Since the control system according to the embodiment 7 can be realized by the configuration similar to that of the control system according to the embodiment 1, a similar configuration is assigned the same reference numeral, and the detailed description is omitted here.

In the embodiment 1 above, the controller 1 generates the association map 13b based on the action table 13a stored in the memory unit 13 within the controller 1 and the profile table 23a acquired from the controlled machine 2. On the other hand, a management server for managing the profile table of the controlled machine 2 is provided in the embodiment 7, the controller 1 generates the association map 13b based on the action table 13a stored in the memory unit 13 within the controller 1 and the profile table acquired from the management server.

FIG. 33 is a schematic diagram of the configuration of the control system according to the embodiment 7. The control system according to the embodiment 7 is provided with a management server (management device) 3 in addition to the controller 1 and the controlled machine 2. The controller 1 and the controlled machine 2 according to the embodiment 7 have similar configurations as the controller 1 and the controlled machine 2 according to the embodiment 1.

The controller 1 according to the embodiment 7 performs a short-range wireless communication with the controlled machine 2, and a wireless communication is performed through a network such as the Internet etc. The controller 1 performs a wireless communication with the management server 3 over a network.

Figure 34:
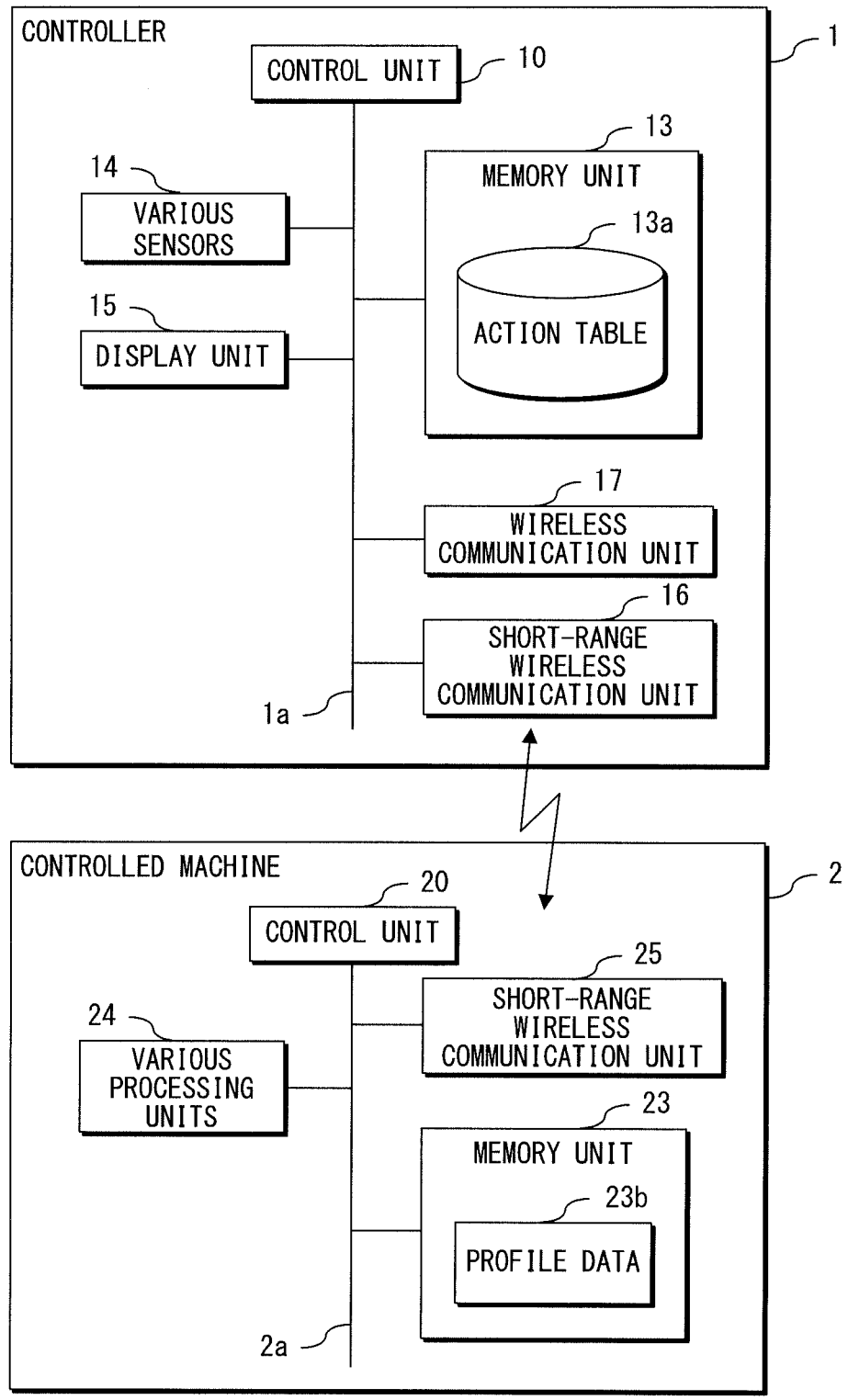
FIG. 34 is a block diagram of the configuration of the controller and the controlled machine according to the embodiment 7.

Described below in details are the configurations of the controller 1, the controlled machine 2, and the management server 3 in the control system according to the embodiment 7. FIG. 34 is a block diagram of the configuration of the controller 1 and the controlled machine 2 according to the embodiment 7 and FIG. 35 is a block diagram of the configuration of the management server 3.

The controller 1 according to the embodiment 7 is provided with a wireless communication unit 17 in addition to the configuration illustrated in FIG. 2. The wireless communication unit 17 is an interface for performing a wireless communication with another device over a network N. The wireless communication unit 17 establishes a connection with the closest wireless access point N1 provided in the network at an instruction from the control unit 10, and is connected to the network through the closest wireless access point N1. The controller 1 according to the embodiment 7 communicates with the management server 3 through the wireless communication unit 17.

The controlled machine 2 according to the embodiment 7 stores profile data 23b instead of the profile table 23a in the memory unit (identification information Storage unit) 23. The profile data 23b includes a equipment profile indicating the type of the controlled machine 2 and the equipment name for identification of the controlled machine 2. That is, the profile data 23b is the first function information and the second function information in the profile table 23a.

The management server 3 according to the embodiment 7 is, for example, a well-known server computer. The management server 3 is provided with a control unit 30, a hard disk drive (hereinafter referred to as an HDD) 33, a communication unit 34, etc. Each of these hardware components is interconnected to one another through a bus 3a.

The control unit 30 is a CPU, an MPU, etc. The control unit 30 appropriately executes a control program stored in advance in the HDD 33 with specified timing. The control unit 30 also controls the operation of each hardware component described above.

The HDD 33 is a storage device of a large capacity. The HDD 33 stores in advance various necessary control programs for operating as the management server 3. The HDD 33 stores a plurality of profile tables (identification information storage units) 33a. The profile table 33a is stored in the HDD 33 for each of the equipment profile and the equipment name of the controlled machine 2. Each of the profile tables 33a according to the embodiment 7 has almost the same configuration as the profile table 23a illustrated in FIG. 4.

The communication unit 34 is an interface for connection to the network N. The communication unit 34 performs a communication with another device through the network N. The management server 3 according to the embodiment 7 performs a communication with the controller 1 through the wireless communication unit 34.

In the control system with the configuration above, the function realized by the control unit 10 of the controller 1 executing the control program stored in the memory unit 13 is similar to each function illustrated in FIG. 5. However, while the profile table acquisition unit 10b according to the embodiment 1 has the configuration of acquiring the profile table 23a from the controlled machine 2, the profile table acquisition unit 10b according to the embodiment 7 acquires the profile table 33a from the management server 3.

Practically, the profile table acquisition unit (identification information request unit) 10b requests the controlled machine 2 to transmit the profile data (identification information) 23b when the communication between the controller 1 and the controlled machine 2 is started. When a request for the profile data 23b is received from the controller 1 after the communication with the controller 1 is stared through the short-range wireless communication unit 25, the control unit 20 of the controlled machine 2 reads the profile data 23b from the memory unit 23, and transmits it to the controller 1.

The profile table acquisition unit (identification information acquisition unit) 10b acquires the profile data 23b transmitted from the controlled machine 2, and transmits the acquired profile data 23b to the management server 3. Thus, the profile table acquisition unit 10b requests the management server 3 to transmit the profile table 33a corresponding to the profile data 23b. When the request for the profile table 33a is received from the controller 1, the control unit 30 of the management server 3 reads the requested profile table 33a from the HDD 33, and transmits it to the controller 1.

Practically, the control unit 30 of the management server 3 retrieves from the HDD 33 the profile table 33a with respect to the profile data 23b received from the controller 1, and the successfully retrieved profile table 33a is transmitted to the controller 1. The profile table acquisition unit 10b of the controller 1 acquires the profile table 33a transmitted from the management server 3, and stores it in the memory unit 13.

The map generation unit 10c according to the embodiment 7 generates the association map 13b as illustrated in FIG. 6A or 6B based on the profile table 33a acquired by the profile table acquisition unit 10b from the management server 3 and the action table 13a stored in the memory unit 13. The process of the map generation unit 10c generating the association map 13b is similar to the process described above in the embodiment 1. Therefore, the detailed description is omitted here.

The process of generating the association map 13b for the controller 1 controlling the operation of the controlled machine 2 in the control system according to the embodiment 7 is described below with reference to a flowchart. The process of generating the association map 13b by the control unit 10 of the controller 1 is similar to the process illustrated in FIG. 9 and FIG. 10 according to the embodiment 1, and the description of the process is omitted here. FIG. 36 is a flowchart of the procedure of the process of generating the association map 13b according to the embodiment 7.

The following process is performed by the control unit 10 according to the control program stored in the memory unit 13 of the controller 1, performed by the control unit 20 stored in the memory unit 23 of the controlled machine 2, and performed by the control unit 30 according to the control program stored in the HDD 33.

In FIG. 36, in the three areas sectioned by the broken lines, the left area indicates the process performed by the control unit 30 of the management server 3, the central area indicates the process performed by the control unit 10 of the controller 1, and the right area indicates the process performed by the control unit 20 of the controlled machine 2. The process illustrated in FIG. 36 is performed instead of the steps S1 through S4 in the process illustrated in FIG. 9.

The control unit 10 of the controller 1 determines whether or not the communication with the controlled machine 2 has been started (S131). When it is determined that the communication has not been started (NO in S131), control enters the standby state until the communication starts. When it is determined that the communication has been started (YES in S131), the control unit 10 requests the controlled machine 2 for the profile data 23b (S132). When the control unit 20 of the controlled machine 2 receives a request for the profile data 23b from the controller 1 after the communication with the controller 1 has been started, the control unit 20 reads the profile data 23b stored in the memory unit 23, and transmits it to the controller 1 (S133).

When the control unit 10 of the controller 1 acquires the profile data 23*b* from the controlled machine 2 (S134), the control unit 10 requests the management server 3 to transmit the profile table 33*a* corresponding to the acquired profile data 23*b* (S135). When the control unit 30 of the management server 3 receives a request for the profile table 33*b* from the controller 1, the control unit 30 reads the requested profile table 33*a* from the HDD 33, and transmits the read profile table 33*a* to the controller 1 (S136).

When the control unit 10 of the controller 1 acquires the profile table 33*a* from the management server 3, control is passed to step S5 in FIG. 9, and the processes in and after step S5 are continued. The descriptions of the subsequent processes are omitted here.

As described above, in the embodiment 7, the management server 3 manages the profile table 33*a* necessary to generate the association map 13*b* corresponding to each of the controlled machines 2. Then, the controller 1 acquires the desired profile table 33*a* from the management server 3 when the association map 13*b* is generated. Thus, the conventional electric equipment storing only the profile data 23*b* as the information about the equipment profile and the equipment name can be used as the controlled machine 2 in the control system disclosed by the present application.

In the control system according to the embodiment 7, the process performed when the controller 1 operates as a remote controller of the controlled machine 2 is similar to the process described in the embodiment 1. Therefore, the detailed description is omitted here.

The embodiment 7 is described as a variation example of the embodiment 1, the configuration of the embodiment 7 can also be applied to the embodiments 2 through 6.

Embodiment 8

Described below is the control system according to the embodiment 8. Since the control system according to the embodiment 8 can be realized by the similar configuration as the control system according to the embodiment 7, the similar configuration is assigned the same reference numeral, and the detailed description is omitted here.

In the embodiment 7, the controller 1 generates the association map 13*b* based on the action table 13*a* stored in the memory unit 13 within the controller 1 and the profile table 33*a* acquired from the management server 3.

In the embodiment 8, the association map 13*b* is generated with the number of operations (execution count) of the controlled machine 2 taken into account in addition to the configuration according to the embodiment 7. Practically, by considering that there are a plurality of controllers 1, the management server 3 manages the number of the operations of the controlled machine 2 by the user actually operating the controller 1 in each controller 1. Then, it is assumed that the action information and the control information having execution count equal to or exceeding a specified value refer to an action easily taken by a user, and is used as the recommended information when the association map 13*b* is next generated.

The controller 1 according to the embodiment 8 has a configuration similar to the configuration illustrated in FIG. 34, but the association map (transmission count storage unit) 13*b* generated by the controller 1 is a map as illustrated in FIG. 20A. The configuration of the controlled machine 2 according to the embodiment 8 is the same as that illustrated in FIG. 34.

The management server 3 according to the embodiment 8 stores an accumulated information table 33*b* as illustrated in FIG. 37A and an recommended information table 33*c* as illustrated in FIG. 37B in the HDD 33 in addition to the configuration illustrated in FIG. 35. The accumulated information table 33*b* and the recommended information table 33*c* are stored in the HDD 33 with respect to the equipment profile and/or the equipment name of the controlled machine 2. FIGS. 37A and 37B are schematic diagrams of the stored contents of the accumulated information table 33*b* and the recommended information table 33*c* according to the embodiment 8.

The accumulated information table 33*b* according to the embodiment 8 has a configuration similar to that of the accumulated information table 13*c* illustrated in FIG. 20B. As illustrated in FIG. 37A, the accumulated information table 33*b* according to the embodiment 8 associates the action information about the action taken on the controller 1 by a user of each of a plurality of controllers 1 to operate the controlled machine 2, the control information for control of each function of the controlled machine 2, and the accumulated execution count about the accumulation (total) of the execution count of the controlled machine 2 by each user on the corresponding function according to the action information, and stores them. The stored contents of the accumulated information table 33*b* are updated by the control unit 30 each time the controller 1 terminates the communication with the controlled machine 2 and transmits the information stored in the association map 13*b* to the management server 3.

The recommended information table 33*c* is generated by the control unit 30 based on the stored contents of the accumulated information table 33*b*. The recommended information table (recommended information storage unit) 33*c* associates the action information about the action taken on the controller 1 with the recommended information for recommendation of the function of the controlled machine 2 by the action, and stores them as illustrated in FIG. 37B.

Described below is the function realized by the control unit 10 executing the control program stored in the memory unit 13 in the controller 1 according to the embodiment 8. In the controller 1 according to the embodiment 8, the control unit 10 realizes the function similar to each function illustrated in FIG. 5 and FIG. 21. However, the control unit 10 according to the embodiment 8 realizes the function of the execution information transmission unit (not illustrated in the attached drawings) instead of the accumulated information update unit 10*i*.

Upon receipt of the notification from the communication state detection unit 10*a* that the communication with the controller 1 has been disconnected, the execution information transmission unit (transmission count sending unit) transmits the stored contents of the association map 13*b* to the management server 3. Practically, the execution information transmission unit reads the information about a combination having an execution count other than 0 in the combinations of the action information, the control information, and the execution count stored in the association map 13*b*. The execution information transmission unit transmits to the management server 3 the read action information, control information, and execution count together with the equipment profile and/or equipment name of the controlled machine 2.

In the management server 3 according to the embodiment 8, upon receipt of the action information, control information, and execution count from the controller 1, the control unit (summation unit) 30 updates the accumulated information table 33*b* corresponding to the received equipment profile and/or the equipment name. Practically, the control unit 30 determines whether or not the accumulated information table 33*b* corresponding to the received equipment profile and equipment name stores the same information as the received action information and control information. When the control unit 30 determines that the same information is stored in the accumulated information table 33b, the control unit 30 adds the execution count received from the controller 1 to the accumulated execution count stored in the accumulated information table 33b as associated with the same information, and updates the accumulated execution count.

On the other hand, when the control unit 30 determines that the same information is not stored in the accumulated information table 33b, then the control unit 30 stores the action information, control information, and execution count received from the controller 1 in the columns of the action information, control information, and accumulated execution count respectively, and updates the accumulated information table 33b. FIG. 37A illustrates the updated accumulated information table 33b.

After updating the accumulated information table 33b, the control unit 30 of the management server 3 updates the recommended information table 33c based on the stored contents of the accumulated information table 33b. Practically, the control unit 30 determines whether or not there is action information and control information having a value equal to or exceeding a specified value of accumulated execution count (for example, five times) stored in the accumulated information table 33b. When the control unit 30 determines that there is the action information and the control information having accumulated execution count equal to or exceeding the specified value, the control unit 30 stores the control information as recommended information together with the action information in the recommended information table 33c. When the control unit 30 determines that there is no action information and control information having accumulated execution count equal to or exceeding the specified value, the control unit 30 performs no process.

Thus, when the execution count of the action taken by each user of the controller 1 on the controller 1 to actually operate the controlled machine 2, then the control information about the process performed by the controlled machine 2 through the action can be recommended information for the action. Therefore, in a case where the association map 13b is generated using the recommended information table 33c, the action taken on the controller 1 can be entered in the association map 13b when a plurality of users operate the controlled machine 2.

On the other hand, when the control unit 30 receives a request for the profile table 33a from the controller 1 in the management server 3 according to the embodiment 8, the control unit 30 transmits also the recommended information table 33c corresponding to the profile data 23b received from the controller 1 to the controller 1. Practically, upon receipt of the profile data 23b from the controller 1, the control unit 30 of the management server 3 retrieves the profile table 33a relating to the received profile data 23b and the recommended information table 33c stored in the HDD 33 as associated with the profile data 23b from the HDD 33.

When the retrieval has been successfully performed, the control unit 30 transmits the profile table 33a and the recommended information table 33c to the controller 1. When the recommended information table 33c corresponding to the profile data 23b is not stored in the HDD 33, then the control unit 30 transmits only the profile table 33a.

In the controller 1 according to the embodiment 8, the profile table acquisition unit 10b acquires the profile table 33a and the recommended information table 33c transmitted from the management server 3, and stores them in the memory unit 13.

The map generation unit 10c according to the embodiment 8 generates the association map 13b illustrated in FIG. 6A or 6B based on profile table 33a and the recommended information table 33c acquired by the profile table acquisition unit 10b from the management server 3, and the action table 13a stored in the memory unit 13. When the profile table acquisition unit 10b does not receive the recommended information table 33c from the management server 3, the map generation unit 10c generates the association map 13b based on the profile table 33a and the action table 13a.

The map generation unit 10c according to the embodiment 8 first determines whether or not the memory unit 13 stores the recommended information table 33c. When the recommended information table 33c is stored in the memory unit 13, then the map generation unit 10c sequentially reads the action information and recommended information stored in the recommended information table 33c. The map generation unit 10c determines whether or not the action information read from the recommended information table 33c is stored in the action table 13a, and whether or not the recommended information read from the recommended information table 33c is stored in the column of the control information in the profile table 33a.

When the read action information is stored in the action table 13a and the read recommended information is stored in the column of the control information in the profile table 33a, then the map generation unit 10c stores the information in the association map 13b correspondingly. In this case, the map generation unit 10c stores the recommended information as control information, and stores 0 as the execution count corresponding to the action information and the control information. When the read action information is not stored in the action table 13a, and/or the read control information is not stored in the profile table 33a, the map generation unit 10c does not store data in the association map 13b.

Next, the map generation unit 10c associates the action information not associated control information in the process above in all action information stored in the action table 13a with the control information not associated action information in the process above in all control information stored in the profile table 23a. The map generation unit 10c compares the recommended control information corresponding to the action information not associated control information with the control information not associated action information, and determines whether or not there is control information similar to any of the recommended control information. When the map generation unit 10c determines that there is control information similar to any recommended control information, it reads the action information corresponding to the recommended control information from the action table 13a. The map generation unit 10c associates the read action information with the control information determined as similar to the recommended control information, and stores them in the association map 13b. In this case, the map generation unit 10c stores 0 as the execution count corresponding to the action information and the control information.

Next, the map generation unit 10c associates the action information not associated control information in the two processes above in all action information stored in the action table 13a with the control information not associated action information in the two processes above in all control information stored in the profile table 23a.

The map generation unit 10c sequentially reads the action information not associated control information from the action table 13a in the descending order of operation count, and sequentially reads the control information not associated action information from the top of the profile table 23a. The map generation unit 10c associates the action information and the control information in the order in which the information is read, and stores them in the association map 13b. In this case, the map generation unit 10c stores 0 as the execution count corresponding to the action information and control information.

By performing the above-mentioned process, the map generation unit 10c associates all action information stored in the action table 13a with any control information stored in the profile table 23a, and stores them in the profile table 23a.

As described above, in the embodiment 8, each combination of action information and control information entered in the recommended information table 33c as recommended information is stored in the association map 13b in the management server 3. Thus, an operation having an execution record to a certain level by a plurality of users can be stored in the association map 13b.

In the controller 1 according to the embodiment 8, the configuration other than the above-mentioned configuration performs a process similar to that of the configuration described in the embodiments 4 and 7, the detailed descriptions are omitted here.

Figure 38:
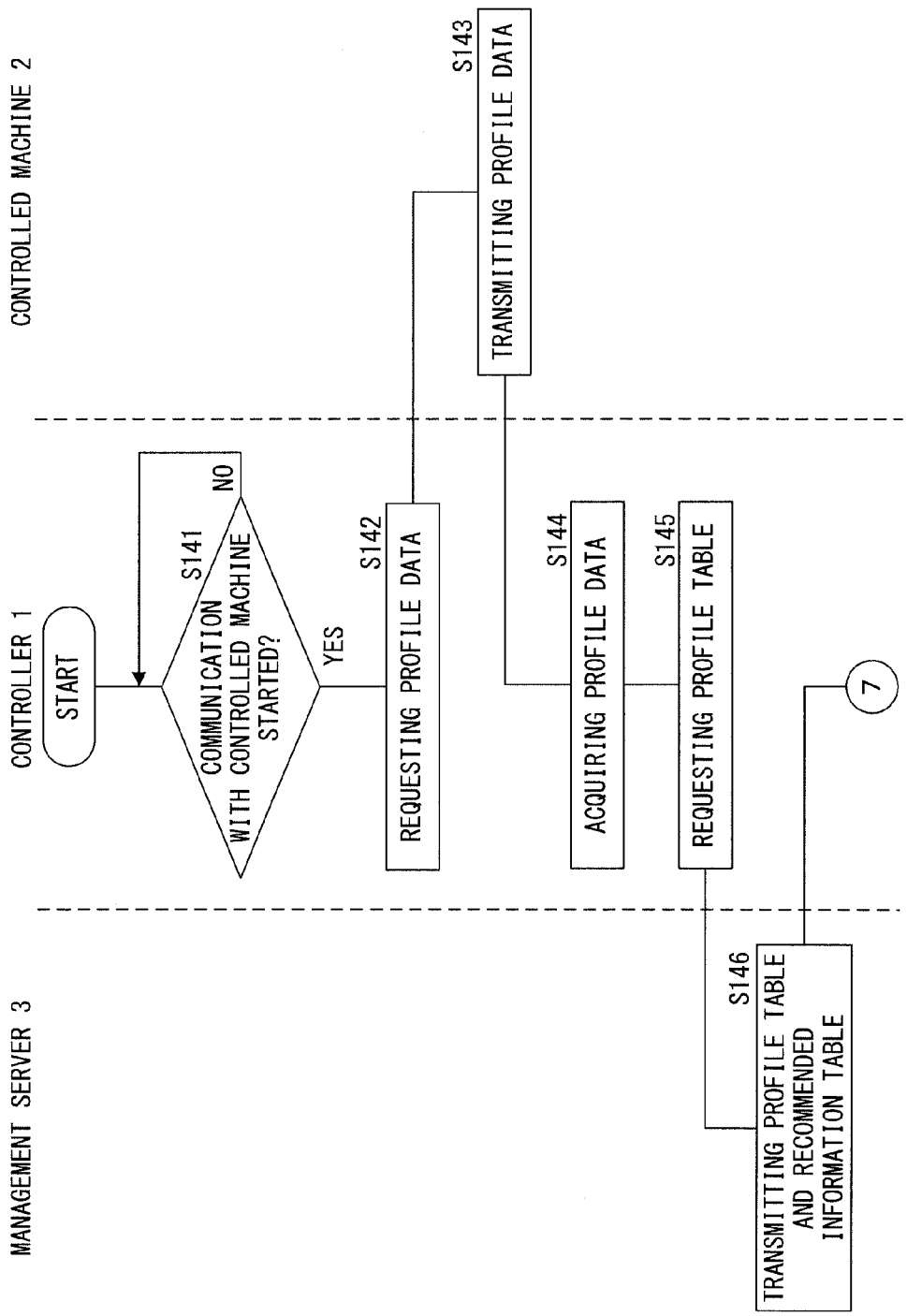
FIG. 38 is a flowchart of the procedure of the process of generating an association map.
Figure 39:
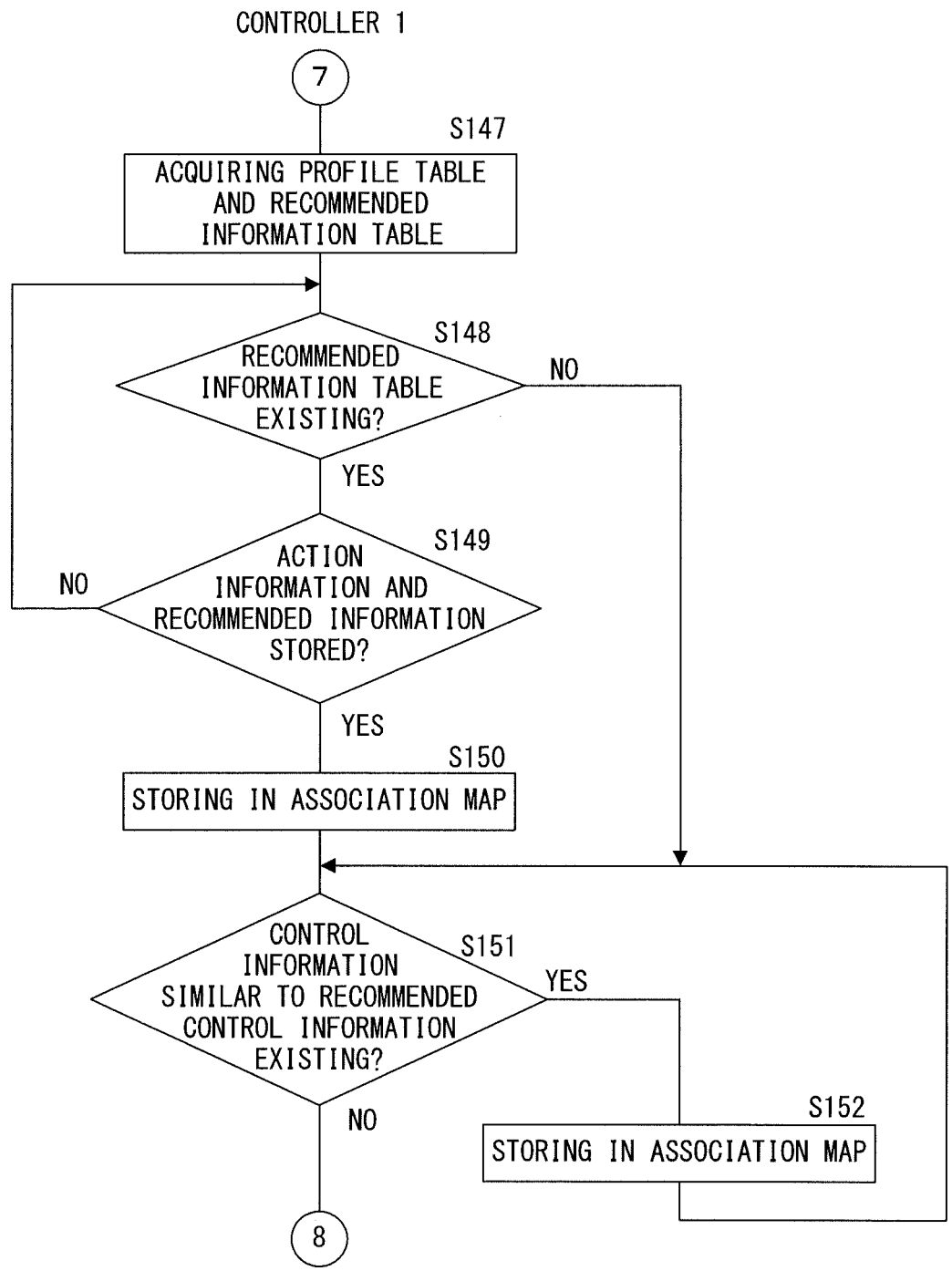
FIG. 39 is a flowchart of the procedure of the process of generating an association map.
Figure 40:
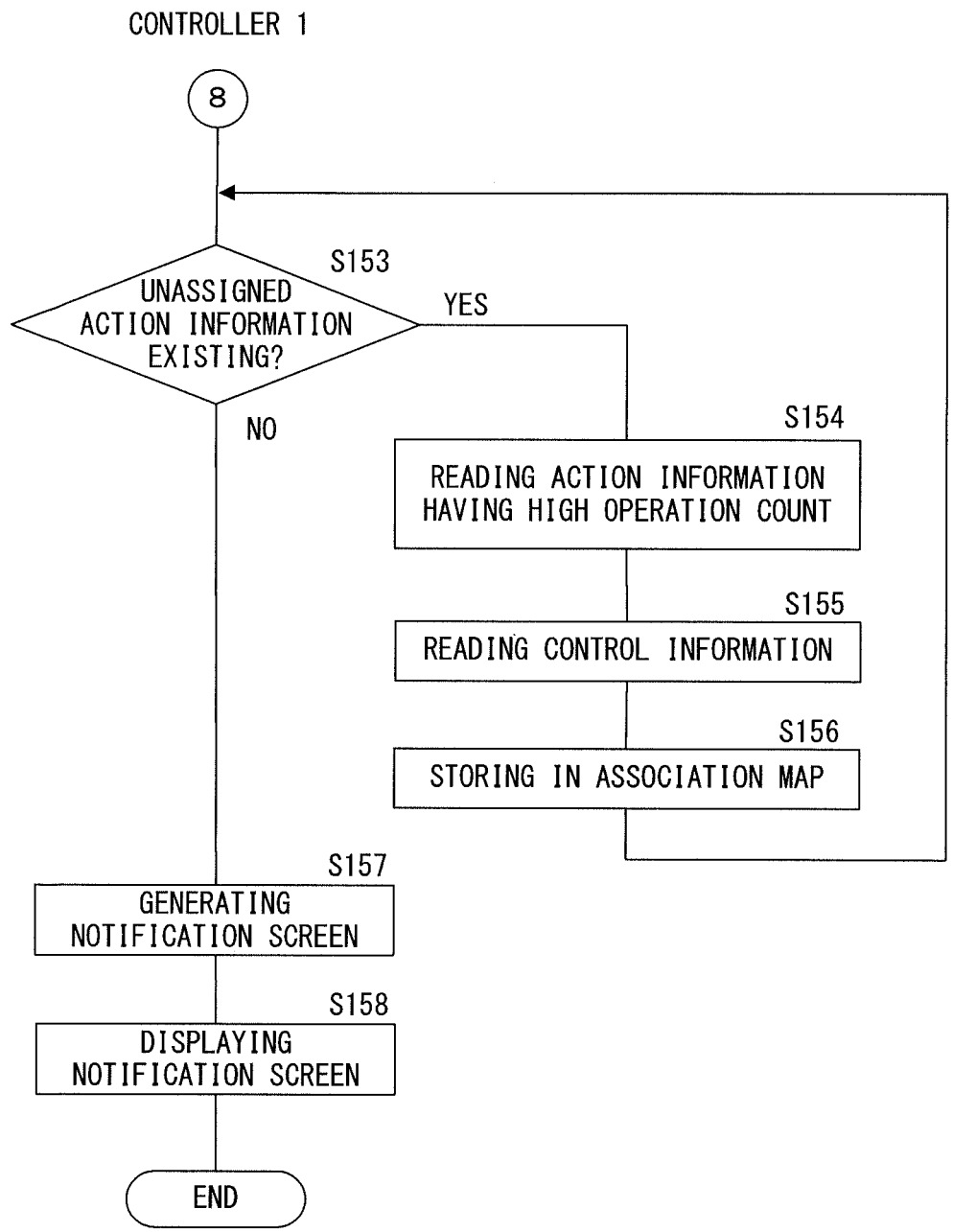
FIG. 40 is a flowchart of the procedure of the process of generating an association map.

The process of generating the association map 13b to control the operation of the controlled machine 2 by the controller 1 in the control system according to the embodiment 8 is described below with reference to a flowchart. FIG. 38 through FIG. 40 are flowcharts of the procedure of the process of generating the association map 13b.

The following process is performed by the control unit 10 according to the control program stored in the memory unit 13 of the controller 1, performed by the control unit 20 stored in the memory unit 23 of the controlled machine 2, and performed by the control unit 30 according to the control program stored in the HDD 33 of the management server 3. In FIG. 38, in the three areas sectioned by the broken lines, the left area indicates the process performed by the control unit 30 of the management server 3, the central area indicates the process performed by the control unit 10 of the controller 1, and the right area indicates the process performed by the control unit 20 of the controlled machine 2.

The control unit 10 of the controller 1 determines whether or not the communication with the controlled machine 2 has been started (S141). When it is determined that the communication has not been started (NO in S141), control enters the standby state until the communication starts. When it is determined that the communication has been started (YES in S141), the control unit 10 requests the controlled machine 2 for the profile data 23b (S142). When the control unit 20 of the controlled machine 2 receives a request for the profile data 23b after the communication with the controller 1 has been started, the control unit 20 reads the profile data 23b stored in the memory unit 23, and transmits it to the controller 1 (S143).

When the control unit 10 of the controller 1 acquires the profile data 23b from the controlled machine 2 (S144), the control unit 10 transmits the profile data 23b to the management server 3, and requests the management server 3 to transmit the profile table 33a corresponding to the acquired profile data 23b (S145). When the control unit 30 of the management server 3 receives a request for the profile table 33a from the controller 1, the control unit 30 reads the requested profile table 33a and the recommended information table 33c from the HDD 33, and transmits the read profile table 33a and the recommended information table 33c to the controller 1 (S146).

Practically, the control unit 30 transmits the profile table 33a relating to the profile data 23b and the recommended information table 33c corresponding to the profile data 23b to the controller 1. When the recommended information table 33c corresponding to the profile data 23b is not stored in the HDD 33, the control unit 30 transmits only the profile table 33a to the controller 1.

When the control unit 10 of the controller 1 acquires the profile table 33a and the recommended information table 33c from the management server 3 (S147), the control unit 10 stores the acquired profile table 33a and recommended information table 33c in the memory unit 13. The control unit 10 generates the association map 13b based on the action table 13a, the profile table 33a, and the recommended information table 33c stored in the memory unit 13. Practically, the control unit determines whether or not there is the recommended information table 33c (S148). When the control unit 10 determines that there is the recommended information table 33c (YES in S148), then it sequentially reads the action information and control information stored in the recommended information table 33c.

The control unit 10 determines whether or not the read action information is stored in the action table 13a, and whether or not the read recommended information is stored in the column of the control information in the profile table 33a (S149). When the control unit 10 determines that the read action information is not stored in the action table 13a, and/or the read recommended information is not stored in the column of the control information in the profile table 33a, the control unit 10 returns control to step S148. When the control unit 10 determines that the read action information is stored in the action table 13a, and the read recommended information is stored in the column of the control information in the profile table 33a (YES in S149), the control unit 10 associates and stores them (S150). The control unit 10 stores the recommended information as control information in the association map 13b, and stores 0 as the execution count corresponding to the stored action information and control information in the association map 13b.

When the control unit 10 determines that there is no recommended information table 33c (NO in S148), control is passed to step S151. The control unit 10 determines whether or not there is control information similar to any recommended control information corresponding to the action information not yet assigned control information in all control information not assigned action information (S151).

When the control unit 10 determines that there is control information similar to any recommended control information (YES in S151), the control unit 10 associates the action information corresponding to the recommended control information with the control information determined as similar to the recommended control information, and stores them in the association map 13b (S152). The control unit 10 stores 0 as the execution count corresponding to the stored action information and control information in the association map 13b. The control unit 10 returns control to step S151, and determines whether or not there is another piece of control information similar to any recommended control information corresponding to the action information not yet assigned control information (S151).

The control unit 10 repeats the processes in steps S151 and S152 until it determines there is no control information similar to any recommended control information. When the control unit 10 determines that there is no control information similar to any recommended control information (NO in S151), it determines whether or not there is action information not yet assigned control information.

When the control unit 10 determines that there is action information not yet assigned control information (YES in S153), it reads the action information having the highest operation count from the action table 13a (S154). The control unit 10 reads the control information stored in the area closest to the top of the profile table 23*a* in all control information not yet assigned action information (S155).

The control unit 10 associates the action information read in step S154 with the control information read in step S155, and stores the information in the association map 13*b* (S156). The control unit 10 stores 0 as the execution count corresponding to the stored action information and control information in the association map 13*b*. The control unit 10 returns control to step S153, and determines whether or not there is action information not yet assigned control information (S153). The control unit 10 repeats the processes in steps S153 through S156 until it assigns control information to all action information stored in the action table 13*a*.

When the control unit 10 determines that there is no action information not yet assigned control information (NO in S153), it generates a notification screen as illustrated in FIG. 7 (S157). The control unit 10 displays the generated notification screen on the display unit 15 (S158), and reports the association between the action information and control information stored in the association map 13*b*. Then, the control unit 10 terminates the process of generating the association map 13*b*.

In the control system according to the embodiment 8, the process performed when the controller 1 operates as a remote controller of the controlled machine 2 is similar to the process described above in the embodiment 1. Therefore, the detailed description is omitted here.

Figure 41:
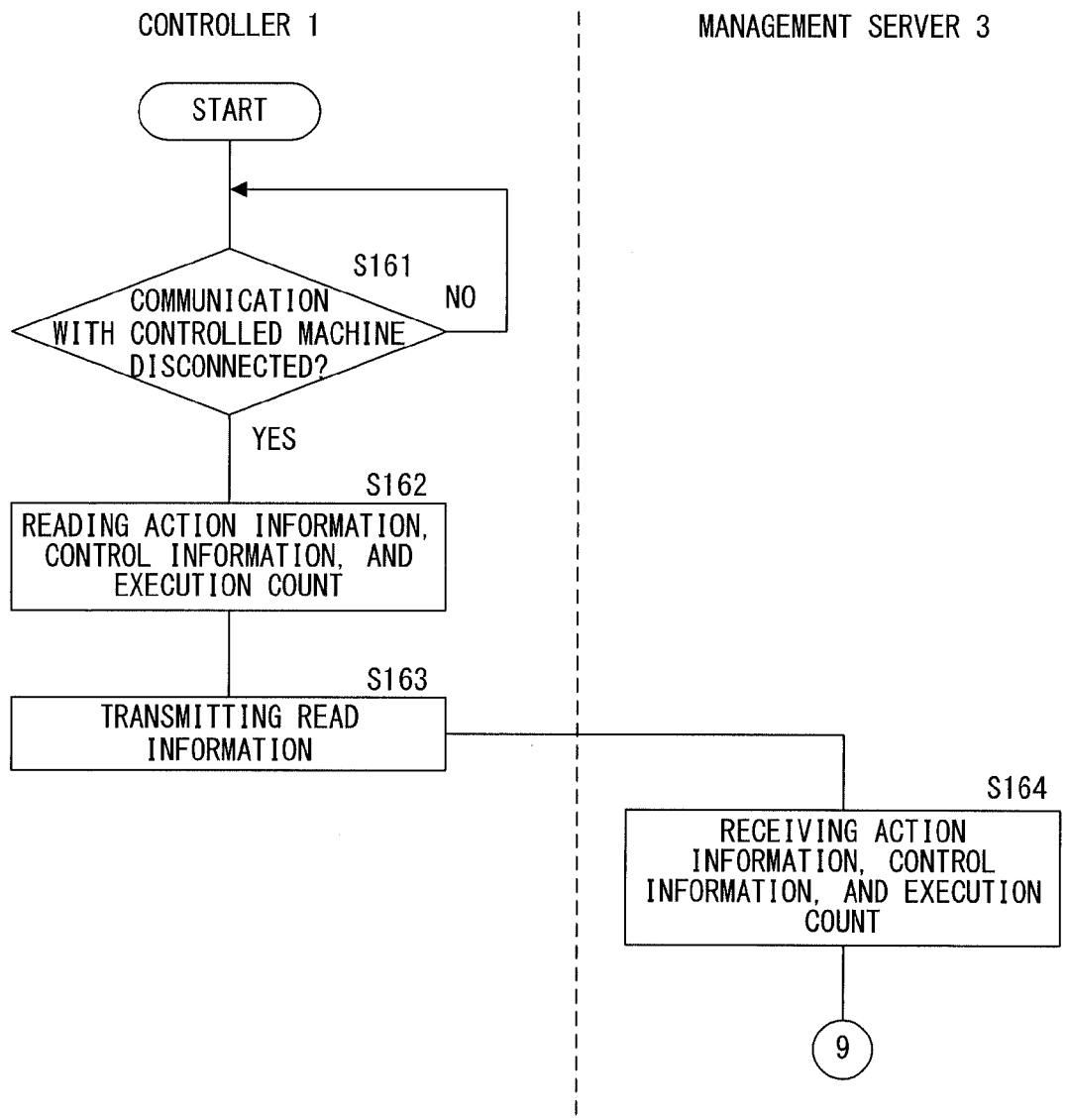
FIG. 41 is a flowchart of the procedure of the process of updating a recommended information table.
Figure 42:
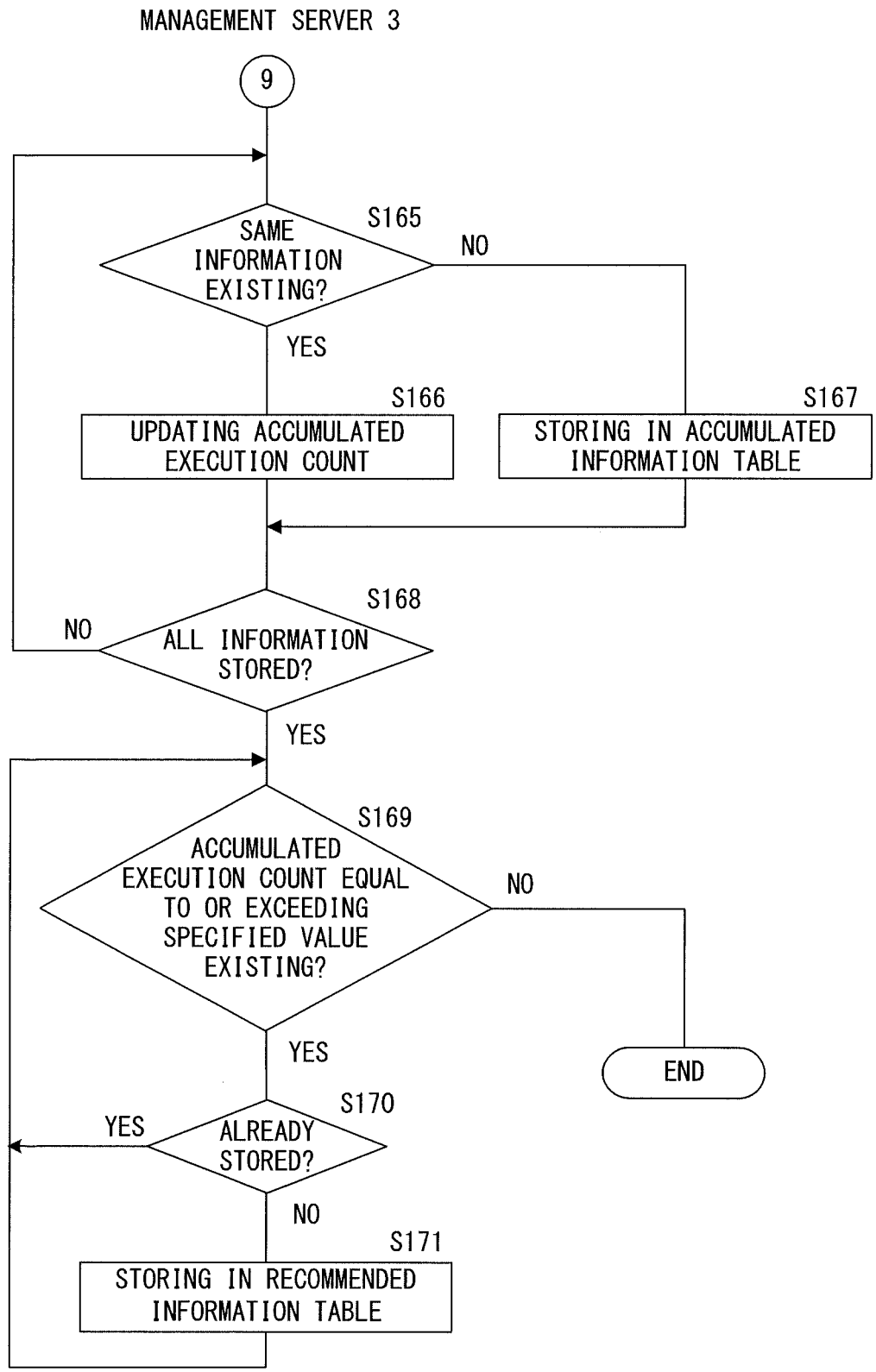
FIG. 42 is a flowchart of the procedure of the process of updating a recommended information table.

The process performed by the controller 1 and the management server 3 when the distance between the controller 1 and the controlled machine 2 becomes longer than a specified distance in the control system according to the embodiment 8 is described below with reference to a flowchart. FIG. 41 and FIG. 42 are flowcharts of the procedure of the process of updating the recommended information table 33*c*.

The following process is performed by the control unit 10 according to the control program stored in the memory unit 13 of the controller 1, and also performed by the control unit 30 according to the control program stored in the HDD 33 of the management server 3. In FIG. 41, in the two areas sectioned by the broken line, the left area indicates the process by the control unit 10 of the controller 1, and the right area indicates the process by the control unit 30 of the management server 3.

The control unit 10 of the controller 1 determines whether or not the communication with the controlled machine 2 has been disconnected (S161). When it is determined that the communication has not been disconnected (NO in S161), the control unit 10 performs other processes and enters a standby state. When the control unit 10 determines that the communication with the controlled machine 2 has been disconnected (YES in S161), then the control unit 10 reads each combination of action information, control information, and an execution count stored in the association map 13*b* whose execution count is not 0 (S162). The control unit 10 transmits to the management server 3 the read information together with the equipment profile and/or equipment name stored in the profile table 33*a* used when the association map 13*b* is generated (S163).

The control unit 30 of the management server 3 receives the action information, control information, and execution count transmitted from the controller 1 together with the equipment profile and/or equipment name (S164). The control unit 30 determines whether or not the accumulated information table 33*b* corresponding to the received equipment profile and/or equipment name stores the same information as the received action information and control information (S165). When it is determined that the same information is stored in the accumulated information table 33*b* (YES in S165), the control unit 30 adds the execution count received from the controller 1 to the accumulated execution count stored in the accumulated information table 33*b* as associated with the same information, and then updates the accumulated execution count (S166).

When it is determined that the same information is not stored in the accumulated information table 33*b* (NO in S165), the control unit 30 associates the action information, control information, and execution count received from the controller 1 and stores them in the accumulated information table 33*b* (S167). The control unit 30 determines whether or not all information received from the controller 1 is stored in the accumulated information table 33*b* (S168). When it is determined that all information is not stored (NO in S168), the control unit 30 returns control to step S165, and determines whether or not the same information as the received action information and control information are stored in the accumulated information table 33*b* (S165).

The control unit 30 repeats the processes in steps S165 through S168 until it determines that all information received from the controller 1 is stored in the accumulated information table 33*b*. When it is determined that all information has been stored (YES in S168), the control unit 30 determines whether or not the accumulated information table 33*b* stores the accumulated execution count equal to or exceeding a specified value (S169). When it is determined that the accumulated execution count equal to or exceeding the specified value is stored (YES in S169), the control unit 30 reads the action information and control information corresponding to the accumulated execution count from the accumulated information table 33*b*.

The control unit 30 determines whether or not a combination of the action information and the control information read from the accumulated information table 33*b* has already been stored in the recommended information table 33*c* (S170). When it is determined that the read combination has not been stored in the recommended information table 33*c* (NO in S170), the control unit 30 defines the read control information as recommended information, associates the information with the read action information, and stores them in the recommended information table 33*c* (S171).

When it is determined that the read combination has already been stored in the recommended information table 33*c* (YES in S170), the control unit 30 skips the process in step S171. The control unit 30 returns control to step S169, and determines whether or not the another accumulated execution count equal to or exceeding the specified value is stored (S169). The control unit 30 repeats the processes in steps S169 through S171 until it determines the accumulated execution count equal to or exceeding the specified value has not been additionally stored. When the control unit 30 determines that the accumulated execution count equal to or exceeding the specified value has not been additionally stored (NO in S169), the process of updating the recommended information table 33*c* is terminated.

As described above, in the embodiment 8, each combination of action information and control information whose execution count has reached a specified value by each user of the controller 1 is stored in the association map 13*b*. Thus, since the operation having an execution record equal to or exceeding a specified value by a plurality of users can be used as recommended information when the association map 13*b* is next generated, the operation of the controlled machine 2 can be controlled by an action generally recognized as easy.

The controller 1 according to the embodiment 8 stores in the association map 13*b* each combination of action information and recommended information stored in the recommended information table 33c if the recommended information table 33c is acquired from the management server 3 when the association map 13b is generated. The configuration of the controller 1 is not limited to the configuration above. For example, there is the possibility that the controller 1 may manage the accumulated information table 13c as illustrated in FIG. 20B. In this case, each combination of action information and control information whose accumulated execution count stored in the accumulated information table 13c is equal to or exceeding a specified value is first stored in the association map 13b, and then each combination of action information and recommended information stored in the recommended information table 33c acquired from the management server 3 may be stored in the association map 13b.

Upon receipt of action information, control information and an execution count from the controller 1, the management server 3 according to the embodiment 8 adds the execution count received from the controller 1 to the execution count stored in the accumulated information table 33b corresponding to the received action information and control information, thereby updating the accumulated information table 33b. In addition to the configuration, for example, when different control information and execution count are stored in the accumulated information table 33b for the same action information, only the control information having a high execution count and execution count may be stored in the accumulated information table 33b. In this case, storing different control information for the same action information in the accumulated information table 33b can be avoided.

The embodiment 8 is described above as a variation example of the embodiments 1 and 4, but can also be applied to the configuration according to the embodiments 5 and 6 above.

Embodiment 9

Figure 43:
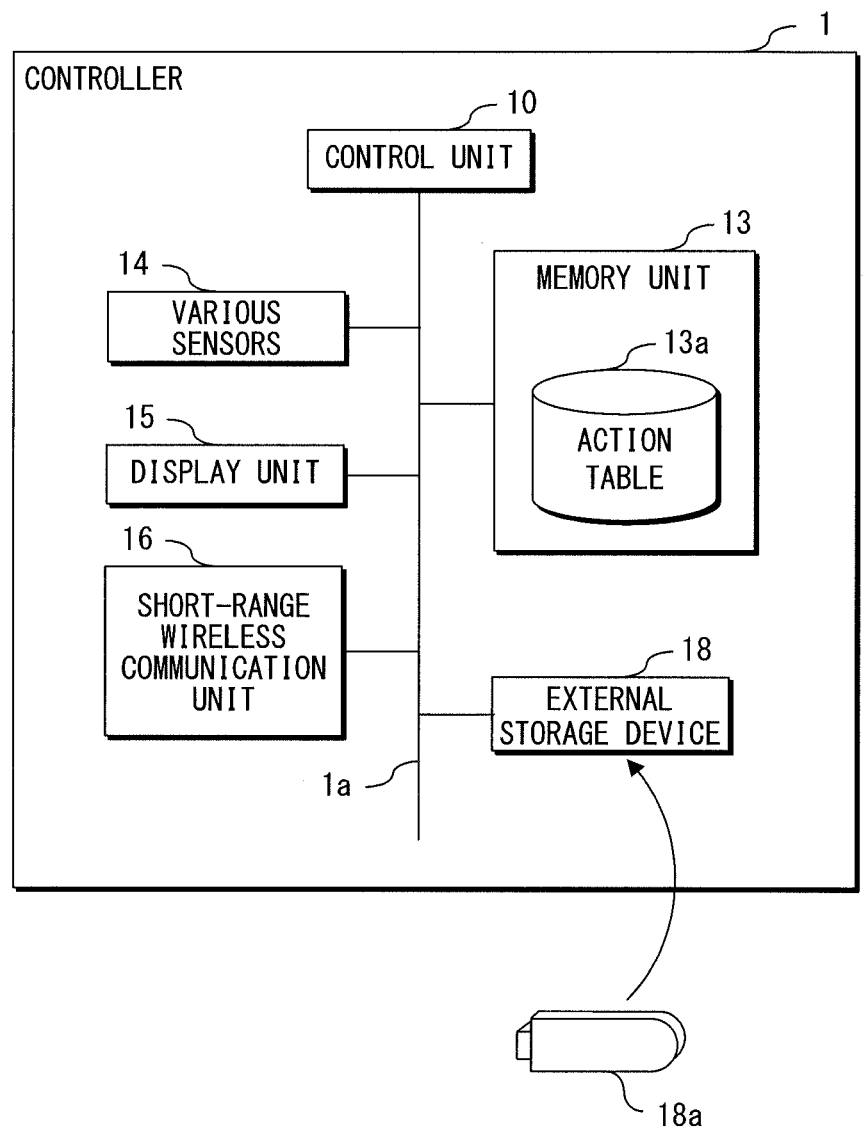
FIG. 43 is a block diagram of the configuration of the controller according to the embodiment 9.

Described below is the control system according to the embodiment 9. FIG. 43 is a block diagram of the configuration of the controller according to the embodiment 9. The controller 1 according to the embodiment 9 includes an external storage device 18 in addition to the hardware components illustrated in FIG. 2. The external storage device 18 is, for example, a memory card drive, a USB (universal serial bus) drive, etc., and reads data from a record medium 18a as a memory card, USB memory, etc.

The record medium 18a stores a control program necessary to operate as the controller 1 described above in each of the embodiments. The external storage device 18 reads a control program from the record medium 18a, and stores it in the memory unit 13. The control unit 10 sequentially executes the control program stored in the memory unit 13. Thus, the controller 1 according to the embodiment 9 performs an operation similar to that of the controller 1 described above in each embodiment.

The record medium 18a can be, in addition to a memory card and USB memory, various record media such as CD-ROM, DVD-ROM, a flexible disk, etc.

The controller 1 can also include a communication unit for connection to a network such as the Internet, a LAN (local area network), etc. In this case, the controller 1 may store in the memory unit 13 a control program necessary to operate as the controller 1 as described in each of the embodiments by downloading the program through a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. A control device that controls an operation of a controlled device, the control device comprising:
    an operation information storage unit that stores operation information and recommended control information, the operation information indicating how the control device is operated, the recommended control information indicating a content of control estimated from an operation corresponding to the operation information;
    a control information acquisition unit that acquires control information of the controlled device by using a wireless communication with the controlled device; and
    an association table generation unit that generates an association table that associates the control information acquired by the control information acquisition unit with the operation information in the operation information storage unit when the acquired control information is similar to the recommended control information, wherein
    the association table generation unit includes a similarity detection unit that detects, from the control information acquired by the control information acquisition unit, the control information similar to the recommended control information stored in the operation information storage unit, and
    the association table generation unit associates the control information detected by the similarity detection unit with the operation information corresponding to the recommended control information that is similar to the control information detected by the similarity detection unit, and stores the associated control information in the association table.

2. The control device according to claim 1, the control device further comprising:
    a recommended control information reception unit that receives recommended control information corresponding to the operation information; and
    a storage control unit that stores the received recommended control information associated with the operation information in the operation information storage unit when the recommended control information reception unit receives the recommended control information corresponding to the operation information.

3. The control device according to claim 1, the control device further comprising:
    a process order reception unit that receives a processing order corresponding to the operation information; and
    a process order storage control unit that stores the received processing order associated with the operation information in the operation information storage unit when the process order reception unit receives the processing order corresponding to the operation information, wherein
    the operation information storage unit stores the processing order associated with the operation information; and
    the association table generation unit stores in the association table the operation information associated with the control information acquired by the control information acquisition unit in a processing order stored in the operation information storage unit.

4. The control device according to claim 1, the control device further comprising
an identification information acquisition unit that acquires identification information for identification of a controlled device, wherein
the control information acquisition unit acquires control information of a controlled device identified by the identification information from a specified external device according to the identification information acquired by the identification information acquisition unit.

5. The control device according to claim 1, the control device further comprising
a report unit that reports association between operation information and control information stored in the association table.

6. The control device according to claim 1, the control device further comprising:
an operation detection unit that detects execution of an operation indicated by operation information stored in the operation information storage unit;
a designation unit that designates control information corresponding to the operation whose performance is detected by the operation detection unit based on the association table generated by the association table generation unit; and
a control unit that controls the operation of the controlled device according to the control information designated by the designation unit.

7. The control device according to claim 6, the control device further comprising:
a detection result notification unit that reports the operation whose performance is detected by the operation detection unit and the control information designated by the designation unit; and
a reception unit that receives whether or not the operation and the control information reported by the detection result notification unit are appropriate, wherein
the control unit controls the operation of the controlled device according to the control information designated by the designation unit when the reception unit receives that the operation and the control information are appropriate.

8. The control device according to claim 6, the control device further comprising
a detection count update unit that updates a detection count stored in the operation information storage unit corresponding to the operation information of the operation whose performance is detected by the operation detection unit when the operation detection unit detects the performance of the operation, wherein
the operation information storage unit stores the detection count of the performance of the operation indicated by the operation information being associated with the operation information; and
the association table generation unit stores the operation information associated with the control information acquired by the control information acquisition unit in the descending order of detection count stored in the operation information storage unit in the association table.

9. The control device according to claim 6, the control device further comprising:
a control count storage unit that stores a control count at which the control unit operates the operation of the controlled device according to the control information being associated with the operation information and the control information stored in the association table; and
a control count update unit that updates the control count stored in the control count storage unit being associated with the control information and the operation information of the operation whose performance is detected by the operation detection unit when the control unit controls the operation of the controlled device according to the control information designated by the designation unit, wherein
the association table generation unit associates the operation information with the control information for a combination of information having control count equal to or exceeding a specified value stored in the control count storage unit, and stores the combination of information in the association table.

10. The control device according to claim 9, the control device further comprising:
a control time period decision unit that determines a time period including a time point when the control unit controls the controlled device according to the control information designated by the designation unit; and
a generated time period decision unit that determines a time period including a time point when the association table generation unit generates the association table, wherein
the control count storage unit stores a control count at which the control unit controls the operation of the controlled device according to the control information in the time period being associated with the operation information and the control information stored in the association table and the time period determined by the control time period decision unit when the control unit controls the operation of the controlled device according to the control information;
the association table generation unit associates the operation information with the control information for a combination having control count equal to or exceeding a specified value and stored being associated with the time period determined by the generated time period decision unit in the control count storage unit, and stores the associated information in the association table.

11. The control device according to claim 9, the control device further comprising:
a control position detection unit that detects a position when the control unit controls the operation of the controlled device according to the control information designated by the designation unit; and
a generation position detection unit that detects a position when the association table generation unit generates the association table, wherein
the control count storage unit stores a control count at which the control unit controls the operation of the controlled device according to the control information being associated with the operation information and the control information stored in the association table and the position detected by the control position detection unit when the control unit controls the operation of the controlled device according to the control information;
the association table generation unit associates the operation information with the control information for a combination having control count equal to or exceeding a specified value and stored being associated with the position detected by the generation position detection unit in the control count storage unit, and stores the associated information in the association table.

12. A control system comprising:
a control device that controls an operation of a controlled device; and
the controlled device whose operation is controlled by the control device, wherein
the control device includes:
- an operation information storage unit that stores operation information and recommended control information, the operation information indicating how the control device is operated, the recommended control information indicating a content of control estimated from an operation corresponding to the operation information;
- a request unit that requests the controlled device to transmit control information of the controlled device;
- a control information acquisition unit that acquires the control information of the controlled device by using a wireless communication with the controlled device; and
- an association table generation unit that generates an association table that associates the control information acquired by the control information acquisition unit with the operation information in the operation information storage unit when the acquired control information is similar to the recommended control information;

the controlled device includes:
- a control information storage unit that stores the control information of the controlled device; and
- a transmission unit that transmits the control information stored in the control information storage unit to the control device when the control device requests the control information, wherein the association table generation unit includes a similarity detection unit that detects, from the control information acquired by the control information acquisition unit, the control information similar to the recommended control information stored in the operation information storage unit, and the association table generation unit associates the control information detected by the similarity detection unit with the operation information corresponding to the recommended control information that is similar to the control information detected by the similarity detection unit, and stores the associated control information in the association table.

13. A control system comprising
a control device for controlling an operation of a controlled device;
the controlled device whose operation is controlled by the control device; and
a management device for managing the controlled device, wherein
the control device includes:
- an operation information storage unit that stores operation information and recommended control information, the operation information indicating how the control device is operated, the recommended control information indicating a content of control estimated from an operation corresponding to the operation information;
- an identification information request unit that requests the controlled device for identification information of the controlled device;
- an identification information acquisition unit that acquires from the controlled device the identification information requested by the identification information request unit;
- a request unit that requests the management device to transmit control information of the controlled device which is identified by the identification information according to the identification information acquired by the identification information acquisition unit;
- a control information acquisition unit that acquires the control information of the controlled device by using a wireless communication with the management device; and
- an association table generation unit that generates an association table that associates the control information acquired by the control information acquisition unit with the operation information in the operation information storage unit when the acquired control information is similar to the recommended control information;

the controlled device includes:
- an identification information storage unit that stores identification information for identifying the controlled device; and
- an identification information transmission unit that transmits the identification information stored in the identification information storage unit to the control device when the control device requests the identification information;

the management device includes:
- a control information storage unit that stores the control information of the controlled device being associated with the identification information of the controlled device; and
- a transmission unit that transmits the control information stored in the control information storage unit to the control device when the control device requests the control information, wherein the association table generation unit includes a similarity detection unit that detects, from the control information acquired by the control information acquisition unit, the control information similar to the recommended control information stored in the operation information storage unit, and the association table generation unit associates the control information detected by the similarity detection unit with the operation information corresponding to the recommended control information that is similar to the control information detected by the similarity detection unit, and stores the associated control information in the association table.

14. The control system according to claim 13, wherein
the control device further includes:
- an operation detection unit that detects performance of an operation indicated by the operation information stored in the operation information storage unit;
- a designation unit that designates the control information corresponding to the operation whose performance is detected by the operation detection unit based on the association table generated by the association table generation unit; and
- a control information transmission unit that transmits the control information designated by the designation unit to the controlled device, the controlled device further comprises
  a processing unit that performs an operation according to the acquired control information when the controlled device acquires the control information from the control device.

15. The control system according to claim 14, wherein the control device further includes:
  a transmission count storage unit that stores a transmission count at which the control information transmission unit transmits the control information being associated with the operation information and the control information stored in the association table;
  a transmission count update unit that updates the transmission count stored in the transmission count storage unit corresponding to the control information and the operation information of the operation whose performance is detected by the operation detection unit when the control information transmission unit transmits the control information designated by the designation unit; and
  a transmission count sending unit that transmits the operation information, the control information, and the transmission count stored in the transmission count storage unit to the management device,
the management device further comprises:
  a summation unit that calculates a total transmission count acquired from the control device for each piece of control information and control information acquired from the control device; and
  a recommended information storage unit that stores operation information and control information having sum equal to or exceeding a specified value calculated by the summation unit as recommended information,
the transmission unit of the management device transmits the recommended information stored in the recommended information storage unit together with the control information stored in the control information storage unit to the control device,
the association table generation unit of the control device stores the operation information and the control information, which are the acquired recommended information, being associated with each other, in the association table when the control device acquires the recommended information from the management device.

16. A control method for controlling operation of a controlled device by using a control device, the control method comprising:
  acquiring, by using the control device, control information of the controlled device by using a wireless communication with the controlled device, the control device including an operation information storage unit storing operation information and recommended control information, the operation information indicating how the control device is operated, the recommended control information indicating a content of control estimated from an operation corresponding to the operation information; and
  generating, by using the control device, an association table that associates the acquired control information with the operation information in the operation information storage unit when the acquired control information is similar to the recommended control information, wherein
  the generating includes detecting, from the acquired control information, the control information similar to the recommended control information stored in the operation information storage unit, and
  the generating associates the detected control information with the operation information corresponding to the recommended control information that is similar to the detected control information, and stores the associated control information in the association table.

17. A non-transitory computer readable medium having stored therein a program for causing a computer to execute a control process, the control process comprising:
  acquiring control information of a controlled device by using a wireless communication by which the computer communicates with the controlled device, the computer including an operation information storage unit storing operation information and recommended control information, the operation information indicating how the control device is operated, the recommended control information indicating a content of control estimated from an operation corresponding to the operation information; and
  generating an association table that associates the acquired control information with the operation information in the operation information storage unit when the acquired control information is similar to the recommended control information, wherein
  the generating includes detecting, from the acquired control information, the control information similar to the recommended control information stored in the operation information storage unit, and
  the generating associates the detected control information with the operation information corresponding to the recommended control information that is similar to the detected control information, and stores the associated control information in the association table.

* * * * *